United States Patent
Zhang et al.

(10) Patent No.: US 11,747,879 B1
(45) Date of Patent: Sep. 5, 2023

(54) SYSTEMS FOR OPTIMIZING PERFORMANCE OF A WEARABLE DEVICE BASED ON A POSITION OF A PORTION OF THE WEARABLE DEVICE, AND METHODS OF USE THEREOF

(71) Applicant: META PLATFORMS TECHNOLOGIES, LLC, Menlo Park, CA (US)

(72) Inventors: Jie Zhang, Newark, CA (US); Yonghua Wei, San Diego, CA (US); Alkan Ozturk, San Diego, CA (US); Insoo Hwang, Sammamish, WA (US)

(73) Assignee: META PLATFORMS TECHNOLOGIES, LLC, Menlo Park, CA (US)

(*) Notice: Subject to any disclaimer, the term of this patent is extended or adjusted under 35 U.S.C. 154(b) by 0 days.

(21) Appl. No.: 17/677,874

(22) Filed: Feb. 22, 2022

Related U.S. Application Data

(60) Provisional application No. 63/242,419, filed on Sep. 9, 2021, provisional application No. 63/194,793, filed on May 28, 2021.

(51) Int. Cl.
  *G06F 1/3218* (2019.01)
  *G06F 1/16* (2006.01)
(52) U.S. Cl.
  CPC ............ *G06F 1/3218* (2013.01); *G06F 1/163* (2013.01)
(58) Field of Classification Search
  CPC ............................. G06F 1/3218; G06F 1/163
  See application file for complete search history.

(56) References Cited

U.S. PATENT DOCUMENTS

| | | | | |
|---|---|---|---|---|
| 9,939,784 | B1* | 4/2018 | Berardinelli | H04M 1/72412 |
| 2015/0022438 | A1* | 1/2015 | Hong | G06F 3/017 |
| | | | | 345/156 |
| 2015/0026647 | A1* | 1/2015 | Park | G06F 1/3231 |
| | | | | 715/863 |
| 2015/0135310 | A1* | 5/2015 | Lee | G06F 1/1684 |
| | | | | 726/20 |
| 2016/0026308 | A1* | 1/2016 | Wu | G06F 3/04842 |
| | | | | 345/173 |
| 2016/0223992 | A1* | 8/2016 | Seo | G04B 37/1486 |
| 2016/0267310 | A1* | 9/2016 | AlNasser | G06F 1/1698 |

(Continued)

*Primary Examiner* — Amit Chatly
(74) *Attorney, Agent, or Firm* — Morgan, Lewis & Bockius LLP

(57) ABSTRACT

Methods of optimizing performance for a wearable device are described herein, as are systems and wearable devices for performing the methods. One example method includes selecting, based on first and second sensor data, a current position of a portion of a wearable device donned by a user relative to the user's body from among at least three predefined positions of the portion. The method further includes, after selecting the current position of the portion based on the first and second sensor data, determining whether to modify an operating characteristic of the wearable device based on the current position. The method further includes, in accordance with a determination that an operating characteristic should be modified based on the current position, modifying a first operating characteristic for a display subsystem of the wearable device or a second operating characteristic for a communication subsystem of the wearable device.

51 Claims, 25 Drawing Sheets

(56) References Cited

U.S. PATENT DOCUMENTS

| | | | | |
|---|---|---|---|---|
| 2016/0378100 A1* | 12/2016 | Dow | ................... | A61F 2/70 700/275 |
| 2017/0094708 A1* | 3/2017 | Wang | ................ | H04W 4/80 |
| 2020/0342086 A1* | 10/2020 | Oung | ............... | H04L 63/0861 |

\* cited by examiner

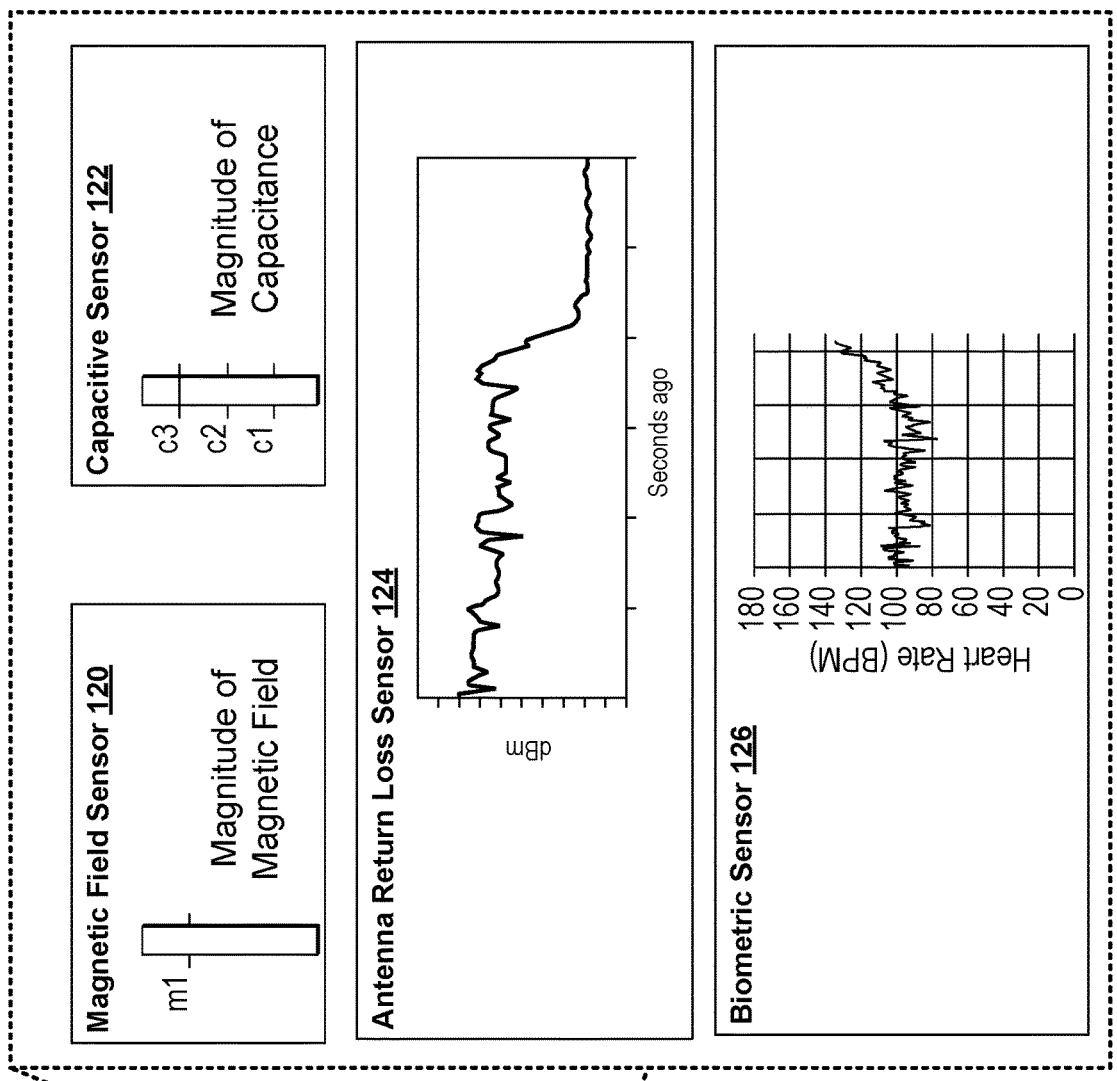
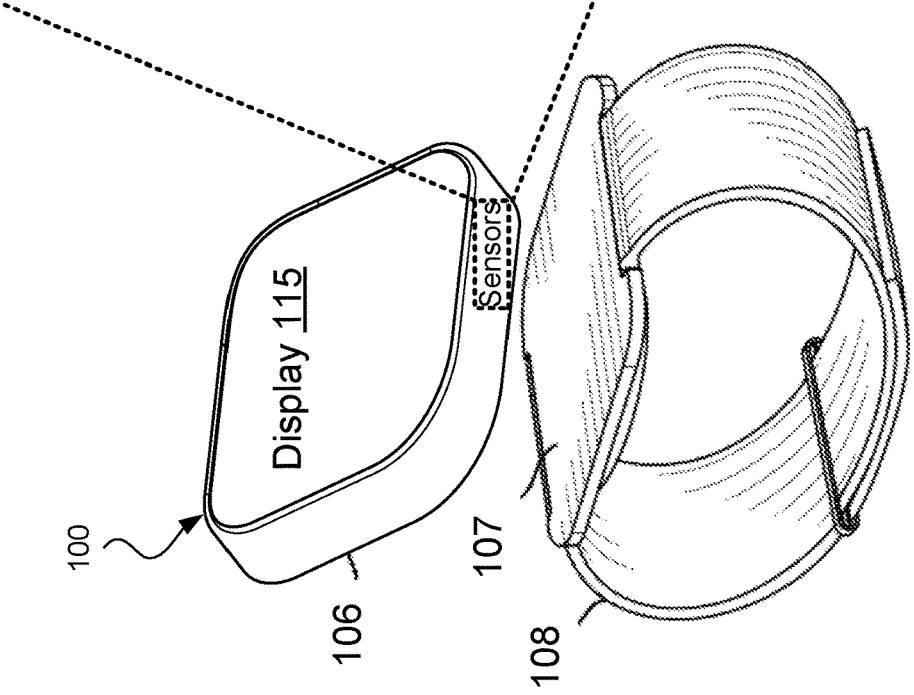
Figure 1A

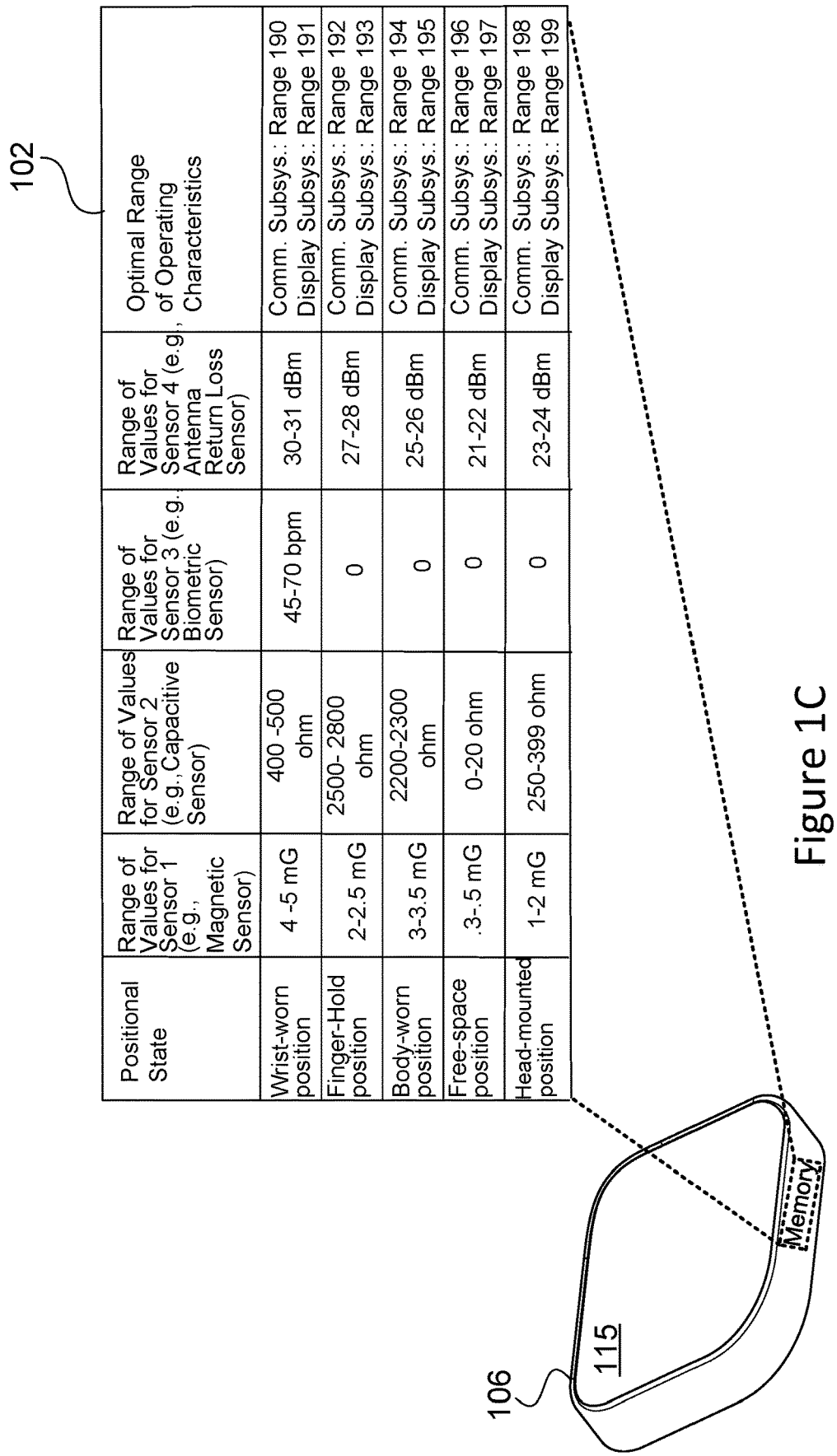

| Positional State | Range of Values for Sensor 1 (e.g., Magnetic Sensor) | Range of Values for Sensor 2 (e.g., Capacitive Sensor) | Range of Values for Sensor 3 (e.g., Biometric Sensor) | Range of Values for Sensor 4 (e.g., Antenna Return Loss Sensor) | Optimal Range of Operating Characteristics |
|---|---|---|---|---|---|
| Wrist-worn position | 4 -5 mG | 400 -500 ohm | 45-70 bpm | 30-31 dBm | Comm. Subsys.: Range 190 Display Subsys.: Range 191 |
| Finger-Hold position | 2-2.5 mG | 2500- 2800 ohm | 0 | 27-28 dBm | Comm. Subsys.: Range 192 Display Subsys.: Range 193 |
| Body-worn position | 3-3.5 mG | 2200-2300 ohm | 0 | 25-26 dBm | Comm. Subsys.: Range 194 Display Subsys.: Range 195 |
| Free-space position | .3-.5 mG | 0-20 ohm | 0 | 21-22 dBm | Comm. Subsys.: Range 196 Display Subsys.: Range 197 |
| Head-mounted position | 1-2 mG | 250-399 ohm | 0 | 23-24 dBm | Comm. Subsys.: Range 198 Display Subsys.: Range 199 |

Select (402) based on (i) first sensor data from a first sensor of a wearable device and (ii) second sensor data from a second sensor of a wearable device, a current position of a portion of the wearable device relative to a user's body, from among at least three predefined positions of the portion of the wearable device.

The portion of the wearable device is (406) a capsule portion of the wearable device that is removably coupled with a band portion of the wearable device, the capsule portion including a display and the first and second sensors of the wearable device.

The at least three predefined positions of the portion of the wearable device include (404): a wrist-worn position in which the portion of the wearable device is worn on the wrist of the user; a finger-hold position in which the portion of the wearable device is held by the user after being removed from a band portion of the wearable device; and a free-space position in which the portion of the wearable device is not in contact with the user's body.

The first sensor data is (407) a magnitude of a magnetic field at the portion of the wearable device; and the second sensor data is one of (i) a capacitance value at the portion of the wearable device, (ii) biometric data for the user, or (iii) an antenna return loss value for an antenna of the wearable device.

The wrist-worn position is (440) selected as the current position and the modifying includes using a stored value for the second operating characteristic for the communication subsystem of the wearable device and the method further comprises:

in response to detecting a change in the first sensor data or the second sensor data, selecting a new current position, other than the wrist-worn position, of the portion of the wearable device relative to the user's body from among the at least three predefined positions of the portion of the wearable device; and after selecting the new current position of the portion of the wearable device, modifying the second operating characteristic for the communication subsystem of the wearable device to use a different stored value for the second operating characteristic.

B

The free-space position is (442) selected as the current position and the modifying includes using a stored value for the first operating characteristic for the display subsystem of the wearable device and the method further comprises:

in response to detecting a change in the first sensor data or the second sensor data, selecting a new current position, other than the free-space position, of the portion of the wearable device relative to the user's body from among the at least three predefined positions of the portion of the wearable device; and after selecting the new current position of the portion of the wearable device, modifying the first operating characteristic for the display subsystem of the wearable device to use a different stored value for the first operating characteristic.

Figure 4F

SYSTEMS FOR OPTIMIZING PERFORMANCE OF A WEARABLE DEVICE BASED ON A POSITION OF A PORTION OF THE WEARABLE DEVICE, AND METHODS OF USE THEREOF

CROSS-REFERENCE TO RELATED APPLICATIONS

This application claims the benefit of U.S. Provisional Patent Application No. 63/242,419, filed Sep. 9, 2021, titled "Systems for Optimizing Performance of a Wearable Device Based on a Position of a Portion of the Wearable Device Relative to the User's Body, and Methods of Use Thereof," and U.S. Provisional Patent Application No. 63/194,793, filed May 28, 2021, titled "Systems for Optimizing Performance of a Wearable Device Based on a Position of a Portion of the Wearable Device Relative to the User's Body, and Methods of Use Thereof," each of which is incorporated by reference herein in its respective entirety (which includes incorporating the material from Appendices A and B in U.S. Provisional Patent Application No. 63/242,419).

TECHNICAL FIELD

This application relates generally to wearable devices, and, more particularly, to optimizing the performance (e.g., performance of either or both of a communication subsystem and a display subsystem) of a wearable device based on the position of a portion (e.g., a detachable capsule portion) of the wearable device relative to a user's body.

BACKGROUND

Conventional wearable devices often are either worn on a user's wrist or placed in a position for charging. Detecting whether the wearable device is in one of these two positions can be determined in a relatively straightforward fashion. For wearable devices that can be used while they are in a greater number of positions relative to a user's body, more sophisticated techniques for determining positions of those wearable devices are needed. Additionally, once a determination is made as to which position the wearable device is in, techniques are needed to understand appropriate performance adjustments to ensure proper operation of the wearable device, e.g., to ensure that cellular connectivity (e.g., long-term evolution (LTE)), user safety, and battery life are reliably maintained as the wearable device (or a portion thereof) shifts around to different positions.

SUMMARY

The disclosed embodiments provide systems, and methods of use thereof, for optimizing performance at a wearable device (e.g., a wrist-wearable device, such as a smartwatch) based on a position of a portion (e.g., a capsule portion 106 that is detachably coupled with a band portion 108, FIG. 1A) of the wearable device relative to a user's body. The embodiments discussed herein address one or more of the problems discussed above, for example, by making appropriate adjustments to operating characteristics of the wearable device (or at least the portion of the wearable device whose position relative to the user's body is monitored) to maintain a reliable subsystem performance (e.g., ensure a reliable cellular network connection, ensure user safety, and make adjustments to ensure adequate battery life) as the wearable device (or at least the portion of the wearable device) moves from one position to other positions. For example, a user may need to detach the capsule portion (e.g., capsule portion 106, FIGS. 1A and 1C) from a band portion (e.g., band portion 108 depicted in FIG. 1A) of the wearable device for a variety of different reasons. In doing so, maintaining a reliable network connection (e.g., cellular network connection) is necessary so that the user's use of the portion of the wearable device is not interrupted or impaired in a way that would create an inefficient man-machine interface and a frustrating user experience overall. Different specific-absorption rate (SAR) requirements can also apply when the wearable device (or a portion thereof) is used near different parts of a user's body, so the techniques described herein also help to ensure safe and regulatory-compliant operation of the wearable device (or portion thereof) even as it moves around to being used near different parts of a user's body. Furthermore, the need to make adjustments to ensure adequate battery life is also important for wearable devices in particular (since these devices generally have smaller capacity batteries), so adjustments such as reducing a screen brightness can be made when the portion of the wearable deice is in positions relative to the user's body that indicate the user is no longer looking at the display of the wearable device, etc.

(A1) To that end, in accordance with some embodiments, a method of optimizing performance for a wearable device (or at least a portion of the wearable device) is performed based on a position of a portion of the wearable device relative to a user's body. The method includes selecting, based on (i) first sensor data from a first sensor of a wearable device and (ii) second sensor data from a second sensor of a wearable device, a current position of a portion of the wearable device relative to the user's body from among at least three predefined positions of the portion of the wearable device. The method further includes, after selecting the current position of the portion of the wearable device based on the first and second sensor data, determining whether to modify an operating characteristic of the wearable device based on the current position of the portion of the wearable device. The method additionally includes, in accordance with a determination that an operating characteristic should be modified based on the current position of the portion of the wearable device, modifying a first operating characteristic for a display subsystem of the wearable device or a second operating characteristic for a communication subsystem of the wearable device (e.g., to maintain or advance the subsystem performance goals discussed above). One example wrist-wearable device is shown in FIG. 1A, where wrist-wearable device 100 is shown as having a capsule portion 106, a band portion 108, and a cradle portion 107 that allows for removable coupling of the capsule portion 106 with the band portion 108. FIG. 1A also shows that the capsule portion can include a number of different sensors that can be used in conjunction with performance of the method of (A1) (and the other methods and techniques described herein), such as any two or more of a magnetic field sensor 120, a capacitive sensor 122, an antenna return loss sensor 124, and a biometric sensor 126, which sensor values are used to determine the various positional states of the capsule portion 106 relative to the user's body, as is described in more detail below.

(A2) In some embodiments of the method of (A1), modifying the first operating characteristic for the display subsystem of the wearable device includes reducing an amount of power consumed by the display of the wearable device.

(A3) In some embodiments of the method of any of (A1)-(A2), modifying the second operating characteristic for the communication subsystem of the wearable device includes adjusting operation of the communication subsystem to comply with applicable SAR requirements (e.g., performing a power back-off associated with any (or all) of a cellular subsystem, WiFi subsystem, and Bluetooth subsystem).

(A4) In some embodiments of the method of any of (A1)-(A3), modifying the second operating characteristic for the communication subsystem of the wearable device includes tuning an antenna of the communication subsystem to cause the antenna to operate using a different frequency (e.g., switching the antenna that was operating at a first frequency to instead operate at a different frequency, and the antenna can be associated with any of the cellular, WiFi, or Bluetooth subsystems).

(A5) In some embodiments of the method of any of (A1)-(A4), after selecting the current position of the wearable device based on the first sensor data and the second sensor data, the modifying includes modifying both the first operating characteristic for the display subsystem of the wearable device and the second operating characteristic for the communication subsystem of the wearable device. In some embodiments, the communication subsystem includes multiple communication subsystems, such as short-range communication subsystems (e.g., Bluetooth, Bluetooth low energy, zigbee, NFC, WiFi, etc.) and long-range communication systems (e.g., cellular subsystem), and such respective second operating characteristics for each of the multiple communication subsystems can be adjusted when the portion of the wearable device is determined to be in certain positions relative to the user's body.

(A6) In some embodiments of the method of any of (A1)-(A5), the at least three predefined positions of the portion of the wearable device include a wrist-worn position in which the portion of the wearable device is worn on the wrist (or another part of the forearm) of the user, a fingerhold position in which the portion of the wearable device is held by the user after being removed from a band portion of the wearable device, and a free-space position in which the portion of the wearable device is not in contact with the user's body. In some embodiments, the portion of the wearable device is determined to be in one of the at least three predefined positions by taking sensed values from the sensors of the portion of the wearable device (and/or also based on sensed values from sensors associated with the band or cradle portions of the wearable device) and performing a lookup in a table using each of the sensed ranges of values to then determine the positional state of the portion of the wearable device (e.g., example ranges of values for various sensed values are shown in columns 2 through 4 for table 102 in FIG. 1C, and there are sets of ranges associated with the positional state of column 1) while also retrieving optimal ranges of operating characteristics values to allow for determining any necessary adjustments to the various subsystems as the portion of the wearable device is moved to different positions (e.g., one example column of optimal ranges of operating characteristics is shown in table 102 in FIG. 1C).

(A7) In some embodiments of the method of (A6), the wrist-worn position is selected as the current position (e.g., an example of the portion of the wearable device in the wrist-worn position is shown in FIG. 2A as the capsule portion 106 remains coupled with band portion 108) and the modifying includes using a stored value for the second operating characteristic for the communication subsystem of the wearable device, and the method further comprises, in response to detecting a change in the first sensor data or the second sensor data, selecting a new current position, other than the wrist-worn position, of the portion of the wearable device relative to the user's body from among the at least three predefined positions of the portion of the wearable device; and, after selecting the new current position of the portion of the wearable device, modifying the second operating characteristic for the communication subsystem of the wearable device to use a different stored value for the second operating characteristic (e.g., switching from values within one of the optimal ranges shown in FIG. 1C to make adjustments to instead use values from a different one of the optimal ranges shown in FIG. 1C).

(A8) In some embodiments of the method of (A6), the free-space position is selected as the current position (e.g., an example of the portion of the wearable device in the free-space position is shown in FIG. 2D, as the capsule portion 106 is no longer coupled with band portion 108 since capsule portion 106 has been placed on a table) and the modifying includes using a stored value for the first operating characteristic for the display subsystem of the wearable device, and the method further comprises, in response to detecting a change in the first sensor data or the second sensor data, selecting a new current position, other than the free-space position, of the portion of the wearable device relative to the user's body from among the at least three predefined positions of the portion of the wearable device; and, after selecting the new current position of the portion of the wearable device, modifying the first operating characteristic for the display subsystem of the wearable device to use a different stored value for the first operating characteristic.

(A9) In some embodiments of the method of any of (A6)-(A8), the first sensor data is a magnitude of a magnetic field at the portion of the wearable device, and the second sensor data is one of (i) a capacitance value at the portion of the wearable device, (ii) biometric data for the user, or (iii) an antenna return loss value for an antenna of the wearable device.

(A10) In some embodiments of the method of (A9), the second sensor data is the biometric data for the user, and the wrist-worn position is selected as the current position based on the magnitude of the magnetic field at the portion of the wearable device indicating that the portion remains coupled with the band portion of the wearable device, and the biometric data for the user being above a non-zero threshold biometric value (e.g., the non-zero threshold biometric value can be a value indicating that a user is wearing the wearable device such that a recognizable biometric signal (e.g., a heart rate of 45 bpm or higher) is detected, such as a heart rate of the user).

(A11) In some embodiments of the method of (A10), the portion of the wearable device is a capsule portion (e.g., capsule portion 106, FIG. 1A) of the wearable device that includes a display and the first and second sensors; the selecting of the current position of the wearable device relative to the user's body from among the at least three predefined positions of the wearable device is further based on third sensor data from a third sensor of the wearable device, the third sensor data being a capacitance value at the capsule portion of the wearable device; and the free-space position is selected as the current position based on the magnitude of the magnetic field at the capsule portion of the wearable device indicating that the capsule portion remains coupled with the band portion of the wearable device, the biometric data for the user being below the non-zero threshold biometric value, and the capacitance value being below a threshold capacitance value.

(A12) In some embodiments of the method of (A11), selecting of the current position of the wearable device relative to the user's body from among the at least three predefined positions of the portion of the wearable device is further based on fourth sensor data from a fourth sensor of the wearable device, the fourth sensor data being configured to sense an antenna return loss value for an antenna of the wearable device; a finger-hold position is selected as the current position (e.g., an example of the portion of the wearable device in the finger-hold position is shown in FIG. 2B, as the capsule portion 106 is no longer coupled with band portion 108 since capsule portion 106 is now being held by the user's fingers) based on the magnitude of the magnetic field at the capsule portion of the wearable device indicating that the capsule portion has been removed from the band portion of the wearable device, the biometric data for the user being below a non-zero threshold biometric value, and the antenna return loss value indicating that the user is holding the capsule portion of the wearable device with at least two fingers.

(A13) In some embodiments of the method of (A12), the at least three predefined positions of the portion of the wearable device further include a head-mounted position in which the capsule portion of the wearable device is coupled with another electronic device worn on the user's head. An example of the portion of the wearable device in the head-mounted position is shown in FIG. 2H as the capsule portion 106 is no longer coupled with band portion 108 since capsule portion 106 is now instead coupled with glasses worn by the user.

(A14) In some embodiments of the method of (A13), the at least three predefined positions of the portion of the wearable device further include a body-worn position in which the capsule portion of the wearable device is worn on the user's body at a location other than the user's head or the user's wrist. An example of the portion of the wearable device in the body-worn position is shown in FIG. 2D, as the capsule portion 106 is no longer coupled with band portion 108 since capsule portion 106 has been placed in the user's shirt pocket.

(A15) In some embodiments of the method of (A14), the free-space position is selected as the current position based on the magnitude of the magnetic field at the capsule portion of the wearable device indicating that the capsule portion has been removed from the band portion of the wearable device, the biometric data for the user being below a non-zero threshold biometric value, and the capacitance value being below a first threshold capacitance value that is less than a second threshold capacitance value associated with the head-mounted position, and the first and second threshold capacitance values are both less than a third threshold capacitance value associated with the body-worn position.

(A16) In some embodiments of the method of (A15), the head-mounted position is selected as the current position based on the magnitude of the magnetic field at the capsule portion of the wearable device indicating that the capsule portion has been removed from the band portion of the wearable device, the biometric data for the user being at or below the non-zero threshold biometric value, and the capacitance value being between greater than the first threshold capacitance value and less than or equal to the second threshold capacitance value associated with the head-mounted position.

(A17) In some embodiments of the method of any of (A15) or (A16), the body-worn position is selected as the current position based on the magnitude of the magnetic field at the capsule portion of the wearable device indicating that the capsule portion has been removed from the band portion of the wearable device, the biometric data for the user being below the non-zero threshold biometric value, and the capacitance value being greater than the second threshold capacitance value associated with the head-mounted position and less than or equal to the third threshold capacitance value associated with the body-worn position.

(A17.5) In some embodiments of the method of any of (A14)-(A17), the wearable device is configured to maintain a reliable cellular connection (e.g., a cellular connection with bandwidth sufficient to allow for at least the downloading and uploading of audio data associated with an audio call) when it is in each of the wrist-worn, finger-hold, free-space, head-worn, and body-worn positions. The wearable device can also be configured to make adjustments to maintain reliable short-range communication connections (e.g., WiFi and Bluetooth connections).

(A18) In some embodiments of the method of any of (A1)-(A17.5), the portion of the wearable device is a capsule portion of the wearable device that is removably coupled with a band portion of the wearable device, the capsule portion including a display and the first and second sensors of the wearable device.

(B1) Another aspect includes a wrist-wearable device for optimizing subsystem performance. The wrist-wearable device is configured to perform or cause performance of the method of any of (A1)-(A17.5).

(B2) One more aspect includes a capsule portion of a wrist-wearable device for optimizing subsystem performance. The capsule portion of the wrist-wearable device includes one or more processors configured to perform or cause performance of the method of any of (A1)-(A17.5).

(B3) One additional aspect includes a non-transitory, computer-readable storage medium including instructions that, when executed by a wearable device (or a capsule portion of the wearable device), causes the wearable device (or the capsule portion) to perform or cause performance of the method of any of (A1)-(A17.5).

(B4) One further aspect includes means for performing or causing performance of the method of any of (A1)-(A17.5).

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIG. 1A illustrates a wearable device with various detachable components, along with a schematic representation of certain sensors of the wearable device and measured quantities from those sensors, in accordance with some embodiments.

FIG. 1C illustrates a data structure that can be used in conjunction with determining positional states of a portion of a wearable device based on measured sensor values from two or more different sensors, in accordance with some embodiments.

FIG. 2I illustrates display adjustments made while the wearable device is in the head-mounted position, in accordance with some embodiments.

FIGS. 4A-4F show a flow diagram of operations associated with a method of optimizing performance for a wearable device based on a position of a portion of the wearable device relative to a user's body, in accordance with some embodiments.

Figure 1B:
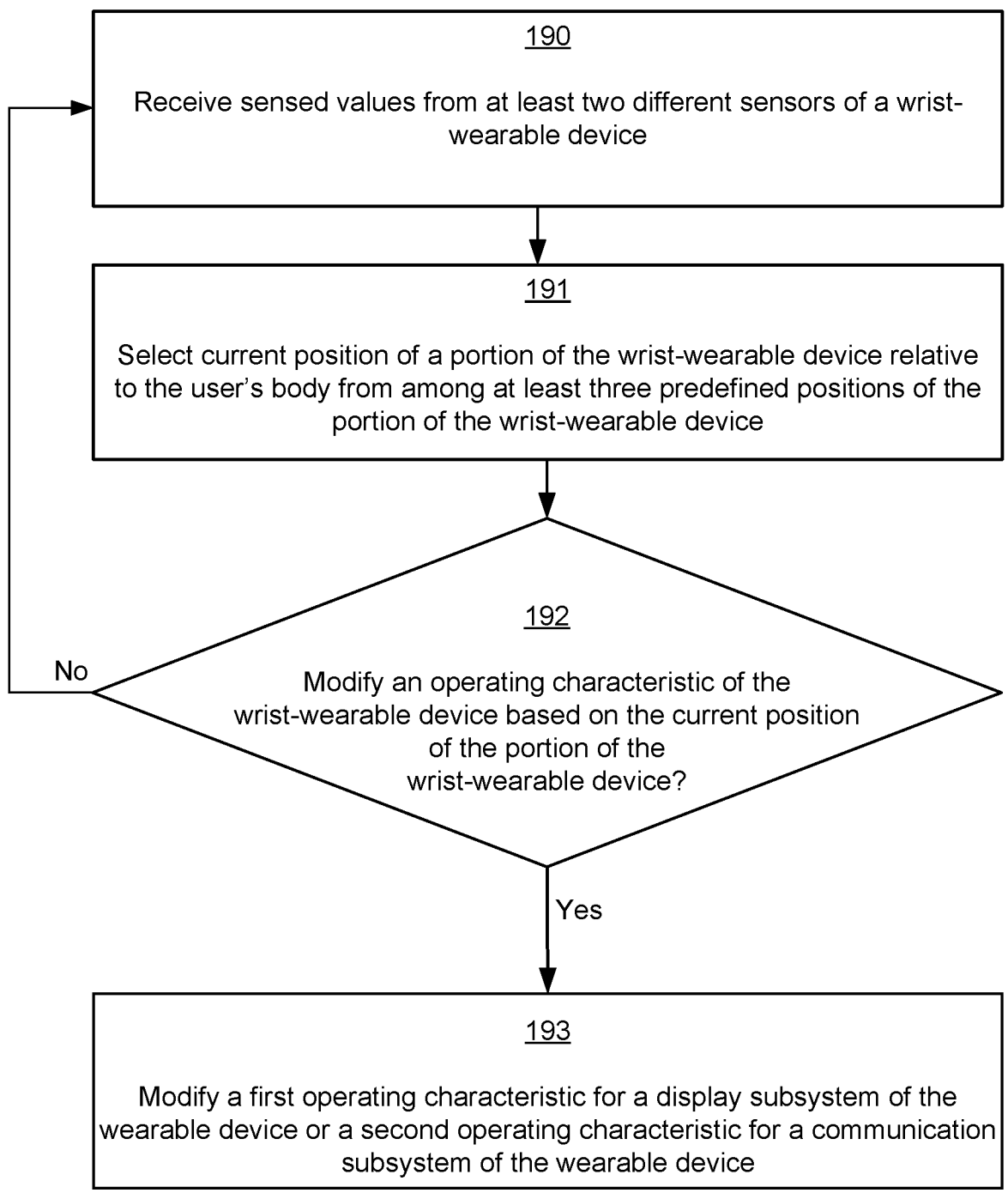
FIG. 1B is a simplified flow diagram showing a method for optimizing subsystem performance at a wearable device based on a current position of a portion of the wearable device, in accordance with some embodiments.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. It will be apparent to one of ordinary skill in the art that the various described embodiments may be practiced without these specific details. In some instances, well-known methods, procedures, components, circuits, and networks have not been described in detail so as not to unnecessarily obscure aspects of the embodiments.

As will become apparent to a person of skill in this art upon reading this disclosure, the various embodiments provide systems and methods of providing optimized performance (e.g., optimized display subsystem and communication subsystem(s) performance) for a wearable device, based on a position of at least a portion of the wearable device relative to a user's body. An example method uses data from at least two different sensors (e.g., first and second sensors) to select, from among at least three different predefined positions, a current position of at least a portion of the wearable device relative to the user's body. After determining the real-time or current position of the portion of the wearable device relative to a user's body, a determination is made whether a modification is needed to an operating characteristic (e.g., for a display subsystem and/or for one or more communication subsystems of the wearable device; example modifications are also described in reference to FIGS. 8-10, and these example modifications can be made once it is determined that a modification is needed to an operating characteristic) in order to ensure that the wearable device is able to maintain adequate operational performance (e.g., maintain cellular connectivity and/or also maintain short-range communication functions, such as Bluetooth and WiFi) even as the portion of the wearable device shifts around to different positions relative to the user's body. While the primary example described herein makes use of a capsule portion (e.g., capsule portion 106, FIG. 1A, which is equivalent to, and includes all the hardware and functions of, capsule portion 954 in FIGS. 6A-6C and capsule portion 1004 in FIG. 7) as the portion of the wearable device (for which a position relative to the user's body is determined), one of skill in the art will appreciate that other portions of the wearable device can also be utilized as this portion, such as one or both of cradle portion 980 and band portion 962 (FIG. 6C) for certain embodiments (e.g., ones in which these other portions include the sensors necessary to perform the positional-state determinations described herein). One of skill in the art will also appreciate that sensors at different portions of the wrist-wearable device can be used in combination with one another, such that any or all of the sensors shown in FIG. 7 for the capsule portion 1004 and band portion 1012 can be used together or individually in conjunction with the positional-state determinations described herein (e.g., in conjunction with the method of FIG. 1B and/or the method of FIGS. 4A-4F).

FIG. 1A illustrates a wearable device with various detachable components, along with a schematic representation of certain sensors of the wearable device and measured quantities from those sensors, in accordance with some embodiments. While the sensors are depicted as being components of the capsule portion of the wearable device in FIG. 1A, sensors from other components of the wrist-wearable device can also be utilized (such as sensors associated with the band portion 108 (e.g., sensors for band portion 1012 shown in FIG. 7, which band portion 1012 is equivalent to band portion 108).

The wearable device 100 may include a capsule portion 106 (also referred to herein as capsule 106, detachable portion 106, or detachable capsule 106, and which is equivalent to the capsules of FIGS. 6A-6C and FIG. 7), cradle 107, and band portion 108. In some embodiments, capsule portion 106 may be disconnected, decoupled, or detached from the band portion 108 (e.g., lifting off with a force sufficient to overcome a magnetic attractive force between the capsule portion 106 and the cradle portion 107, twisting capsule portion 106 off from the cradle portion 107, snapping capsule portion 106 off of cradle portion 107, snap-and-slide off capsule portion 106 from cradle portion 107). In some embodiments, the capsule portion 106 reattaches to the cradle portion 107 using a magnetic force between the capsule portion 106 which secures the capsule portion into the cradle portion 107. A user (e.g., user 104, FIG. 2A) may then twist and lock the capsule portion 106 onto the cradle portion 107. Performance of the wearable device 100 may be optimized by selecting (or determining) a position of the capsule portion 106 of the wearable device relative to a user's 104 body, based on two or more of first sensor data of a first sensor, second sensor data of a second sensor, third sensor data of a third sensor, and fourth sensor data of a fourth sensor of the wearable device (e.g., sensors that can be coupled with one or more of the capsule, band, and cradle portions mentioned above). In some embodiments, only two sensors are utilized, while other embodiments can make use of five, six, or even sensor different types of sensors (e.g., more of the sensors in FIGS. 6A-7) in conjunction with the positional-state determinations for the portion of the wearable device that are described herein.

For example, capsule 106 may have at least four different sensors, including a first sensor being a magnetic field sensor 120, a second sensor being a capacitive sensor 122, a third sensor being a biometric sensor 126, and a fourth sensor being an antenna return loss sensor 124. The data for these sensors may fluctuate as the device moves between a wrist-worn position (example shown in FIG. 2A), finger-hold position (example shown in FIG. 2B), body-worn position (example shown in FIG. 2D), free-space position (example shown in FIG. 2F), head-mounted position (example shown in FIG. 2H), and any other position relative to a user's body.

Figure 5:
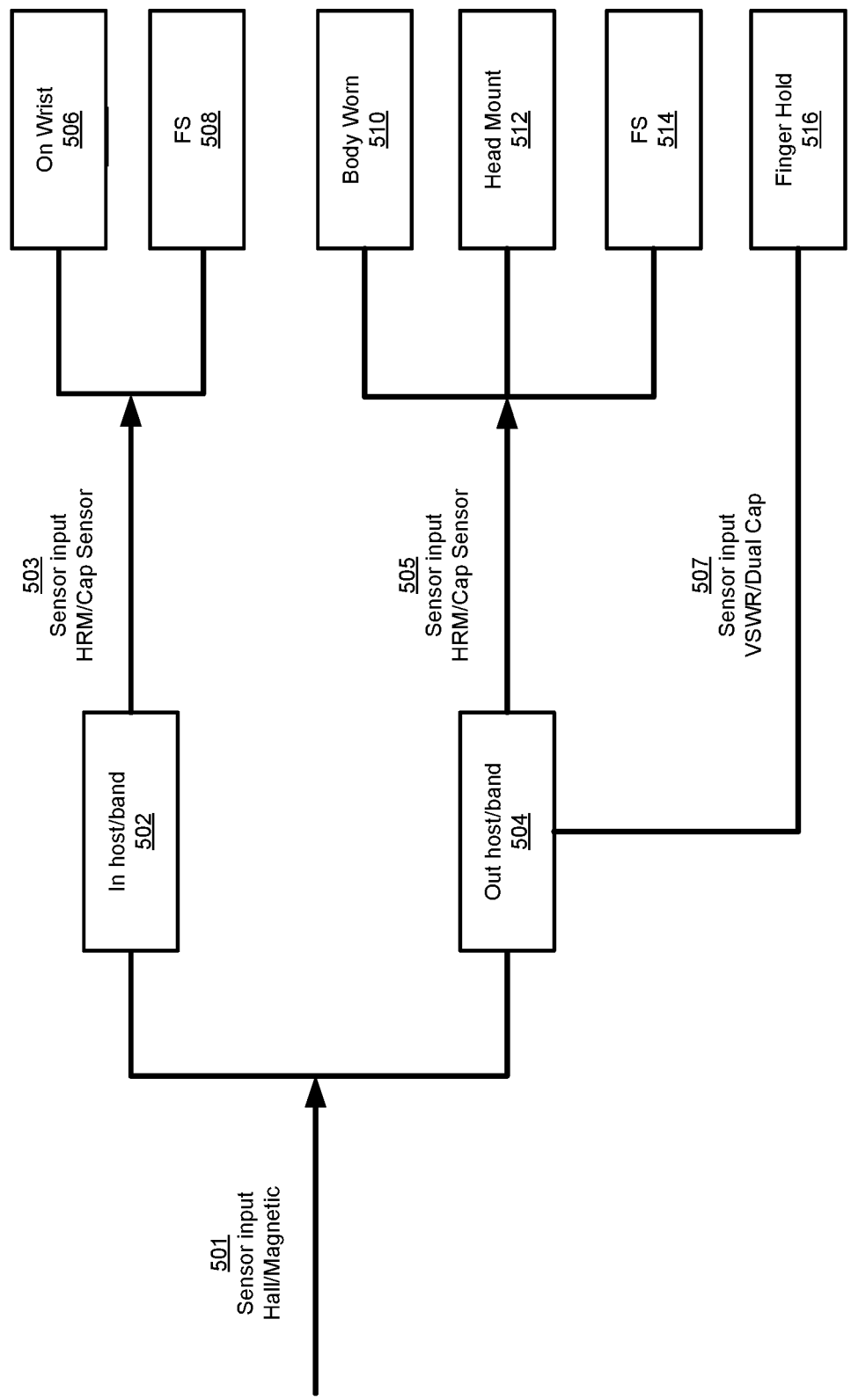
FIG. 5 is a diagram showing use of different sensors to categorize a current position of a portion of a wearable device relative to a user's body as falling into one of the predefined positions for the portion of the wearable device, in accordance with some embodiments.

Threshold m1 associated with magnetic field sensor 120 can indicate a high enough value to detect a magnetic coupling of capsule 106 with cradle 107 of the band portion 108 (e.g., in the wrist-worn position, the magnetic field sensor 120 may sense a magnetic field value that reaches or exceeds threshold m1). In some embodiments, the magnetic field sensor 120 is a hall-effect sensor, an example of which is shown being used in conjunction with operation 501 in FIG. 5, in which the hall/magnetic sensor is used to assist in a determination as to whether capsule 107 is in host/band (determination 502, FIG. 5) or out host/band (determination 504, FIG. 5). FIG. 5 shows that, in accordance with a determination that a sensed magnetic field value from the magnetic field sensor 120 is at or above a threshold magnetic-field value (e.g., threshold m1 depicted in FIG. 1A), then a determination is made at 502 that the capsule is currently coupled with the cradle of the band portion (in other words, the capsule 107 is currently in host and coupled with the band). FIG. 5 also shows that, in accordance with a determination that a sensed magnetic field value from the magnetic field sensor 120 is below a threshold magnetic-field value (e.g., threshold m1 depicted in FIG. 1A), then a determination is made at 504 that the capsule is currently not coupled with the cradle of the band portion (in other words, the capsule 107 is currently out of its host (out of host) and also out of the band). While the example of FIG. 1A depicts a single threshold magnetic-field value, other embodiments can make use of an additional threshold magnetic-field value, such as a value associated with a magnetic field value when the capsule portion 106 is coupled with a user's glasses in the head-mounted position (an example of the head-mounted position is shown in FIGS. 2H and 2I). This additional threshold magnetic-field value can be greater or less than m1 shown in FIG. 1A depending on a strength of magnetic attractive force necessary to magnetically coupled the capsule 106 with a user's glasses (e.g., in the example of FIG. 2I, the additional threshold magnetic-field value (m0) can be less than m1, such that the additional threshold magnetic-field value is satisfied when a magnetic field at the capsule portion is equal to or above m0 but still less than m1).

Figure 7:
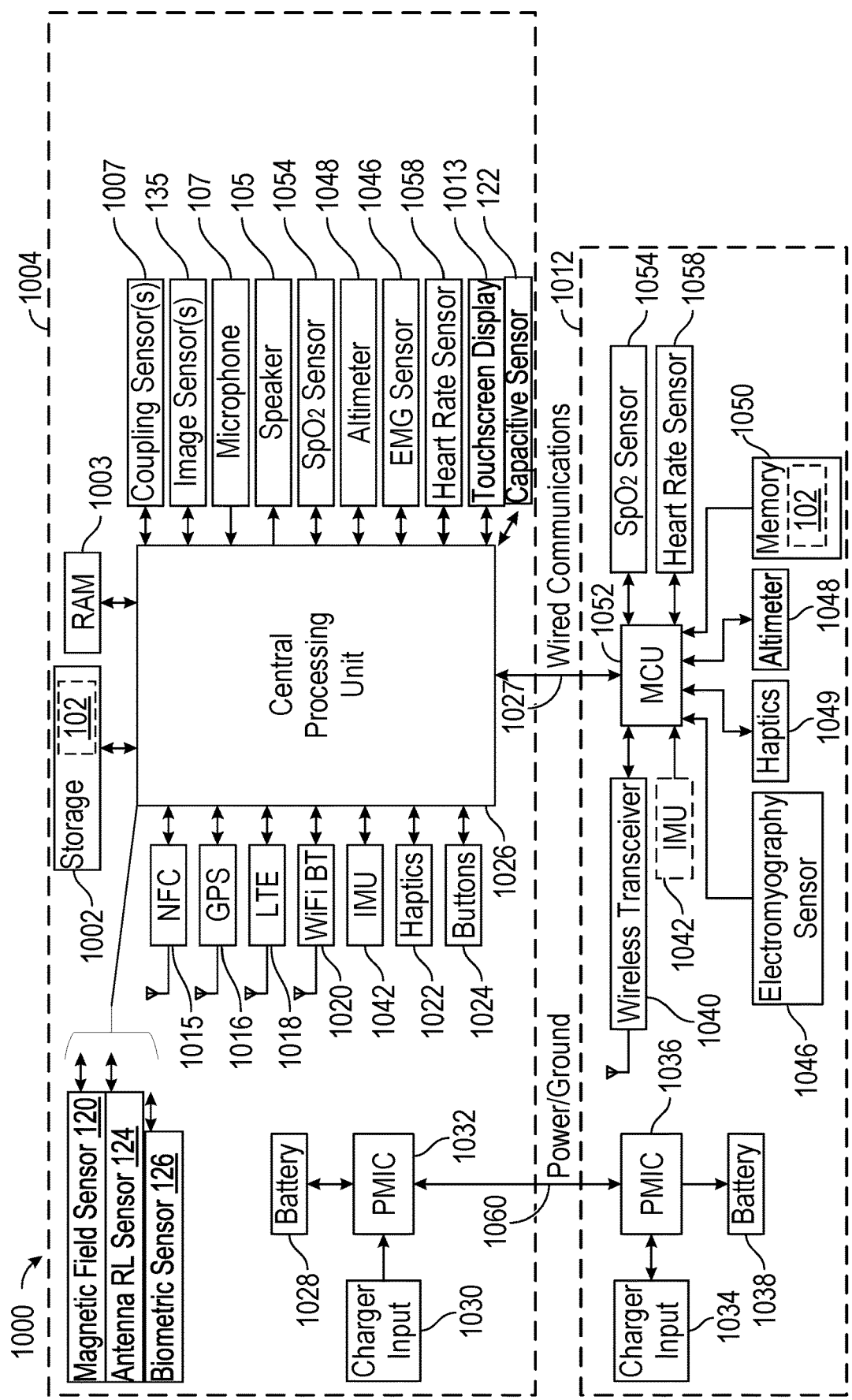
FIG. 7 is a block diagram of a wrist-wearable device system, in accordance with some embodiments.

Capacitive sensor 122 can be associated with multiple distinct capacitance threshold values (e.g., these thresholds can be stored with storage 1002 and/or memory 1050, shown in FIG. 7, of the wrist-wearable device 100), each of which can be used to help discriminate between different positional states of the capsule portion 106 of the wrist-wearable device 100. In the illustrated example of FIG. 1A, the capacitive sensor 122 is associated with three different capacitance threshold values, example uses of which are described as follows. Capacitance value threshold c1 is used in conjunction with discriminating between whether capsule 106 is in the free-space position rather than any of the other positional states for the capsule portion 106 of the wearable device when the capsule portion 106 is known to be out of the band (in other words, if it is first determined (e.g., after operation 501 of FIG. 5 and after determination 504 deciding that the capsule 106 is out of the band), then a sensed capacitance value measured to be below capacitance value threshold c1 allows for a second determination to be made that the positional state of the capsule 106 is the free-space position, rather than the body-worn or head-mounted positions in which some capacitance is expected to be sensed). After the same first determination of this example (e.g., that the capsule 106 is out of band at operation 504 of FIG. 5), capacitance value threshold c2 is used in conjunction with discriminating between whether the capsule 106 is in the head-mounted position or the body-worn position (e.g., a sensed capacitance value measured to be below capacitance value threshold c2 and equal to or above capacitance value threshold c1 allows for a second determination to be made that the positional state of the capsule 106 is the head-mounted position rather than the body-worn position, in which a higher capacitance is expected to be sensed). Also, after the same first determination of this example (e.g., that the capsule 106 is out of band at operation 504 of FIG. 5), capacitance value threshold c3 is used in conjunction with discriminating between whether the capsule 106 is in the body-worn position or the finger-hold position (e.g., a sensed capacitance value measured to be below capacitance value threshold c3 and equal to or above capacitance value threshold c2 allows for a second determination to be made that the positional state of the capsule 106 is the body-worn position rather than the finger-hold position, in which a higher capacitance is expected to be sensed). Sensed capacitances at or above capacitance value threshold c3 can be used to assist in a determination that the positional state of the capsule 106 is in the finger-hold position, but other embodiments can additionally or alternatively use an antenna return loss sensor (e.g., a voltage standing wave ratio (VSWR) sensor) for this purpose (as is shown for the example logic depicted in FIG. 5 to assist in making positional-state determinations for the portion of the wearable device).

The third sensor (e.g., biometric sensor 126) is configured to detect biometric data for the user (e.g., heart rate in the illustrated examples, but other examples of biometric data that can be used additionally or alternatively include $SpO_2$ measurements (e.g., via $SpO_2$ sensor 1054, FIG. 7) electrocardiogram (ECG) measurements (e.g., via an ECG sensor of the wearable device, which can also be the heart rate sensor 1058 in some embodiments, or can be an additional sensor used for sensing ECG data (the ECG sensor can be in the capsule portion 106 of the wearable device or in the band portion), among types of biometric data that can be sensed and used in conjunction with the positional-state determinations described herein)). As shown in the example of FIG. 5, data from the biometric sensor (which is a heart rate sensor, such as heart rate sensor 1058, FIG. 7, in this example) is used to determine if a heart rate from the user is detected at the portion of the wearable device or not. In the illustrated example of FIG. 1A, the biometric sensor 122 reflects a detected heart rate of roughly between 78 beats per minute (bpm) and 140 bpm, which can be used as an indication that the portion of the wearable device is in the wrist-worn position. For example, as shown in FIG. 5, after it is first determined that the capsule is in host/band (after operation 501 and determination 502), then the device can proceed to analyze biometric data (e.g., heartrate measurements) to assess whether the portion of the wearable device is in the wrist-worn position (on wrist at operation 506) or the free-space position (free space (FS) at operation 508). For example, if a heart rate is detected that is above a non-zero threshold value (e.g., above 50 bpm), then a determination can be made at 503 (FIG. 5) that the portion of the wearable device is in the wrist-worn position (at 506), as otherwise it would be expected that no heart rate data would be detected (current heart rate measurement would be below the non-zero threshold value if this were the case, such that a determination could be made that the portion of the wearable device is in the free-state position (at 508, FIG. 5).

Thus, sensed biometric data (e.g., heartrate values) can be used to assist in a determination that the positional state of the capsule 106 is in the wrist-worn position, but other embodiments can additionally or alternatively use a capacitive (cap) sensor for this purpose (as is shown for the example embodiment of FIG. 5). In some embodiments, the capacitance values from the capacitive sensor can be used to double-check that data from the biometric sensor can be trusted. For instance, a loosely worn wearable device or misaligned wearable device might cause a lack of biometric data to be detected (e.g., at operation 503, FIG. 5), such that use of the capacitance values can then be used (also at operation 503) in addition to the biometric data to further assure an accurate positional-state determination (e.g., if it is first determined at operation 502 that the portion of the wearable device is in host/band, and then no heart rate is detected (at operation 503) even though a capacitance value is still detected (also at operation 503), such as one above capacitance threshold c1, or even below c1 but still above a value of zero (FIG. 1A), then a determination can be made that the portion of the wearable device is in the wrist-worn position and not the free-space position (in which no capacitance value is expected to be detected since the portion of the wearable device is away from the user's body entirely).

The fourth sensor, antenna return loss sensor 124, is configured to detect an antenna return loss value for an antenna (e.g., one or more of the antennas associated with NFC 1015, GPS 1016, LTE 1018, or WiFi 1020, depicted in FIG. 7) of the capsule 106. As shown in the example of FIG. 5, this sensor (reflected as VSWR in FIG. 5) is used to help discriminate between the finger-hold position and other positions of the portion of the wearable device after it has already been determined (at 504) that the portion of the wearable device is out host/band. In some embodiments, operation of the antennas of the portion of the wearable device can be impacted by contact of the user's fingers with the capsule portion of the wearable device, and a VSWR sensor can help to quantify this impact. For example, the VSWR sensor can quantify a portion of standing waves that are returned (not transmitted externally outside of the capsule portion) by any of the antennas of FIG. 7 (e.g., NFW 1015, GPS 1016, LTE 1018, WiFi BT 1020).

FIG. 1B is a simplified flow diagram showing a method for optimizing subsystem performance at a wearable device based a current position of a portion of the wearable device, in accordance with some embodiments.

The method for optimizing subsystem performance at a wearable device may include steps 190-193, which can be used in conjunction with the methods described herein, such as those shown and described with respect to FIGS. 4A-4F and FIG. 5. Software responsible for execution of the steps/operations 190-193 can be stored in a memory of the portion of the wearable device (e.g., storage 1002 and/or memory 1050, FIG. 7). First, in step 190, sensed values from at least two different sensors (e.g., magnetic field sensor 120 and capacitive sensor 122) of a wrist-wearable device can be received. In some embodiments, step 190 is continuously performed by a processor of the wrist-wearable device (e.g., central processing unit (CPU) 1026 and/or microcontroller unit (MCU) 1052, FIG. 7), while other embodiments perform step 190 in periodic fashion (e.g., poll sensor values at predefined time intervals, such as one every second or two seconds).

Figure 2A:
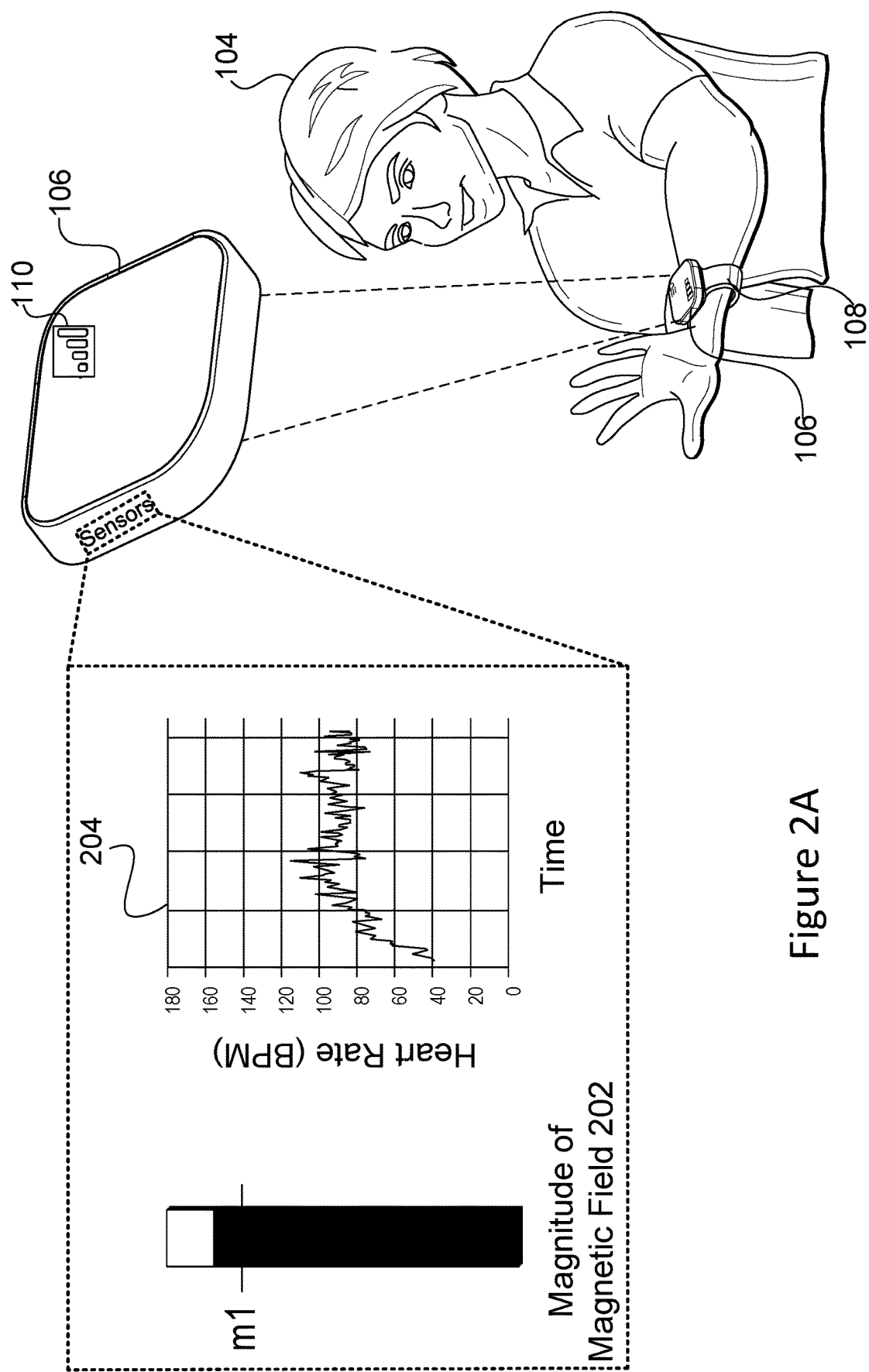
FIG. 2A illustrates a wrist-worn position of a portion of a wearable device and example sensor measurements associated therewith, in accordance with some embodiments.
Figure 2B:
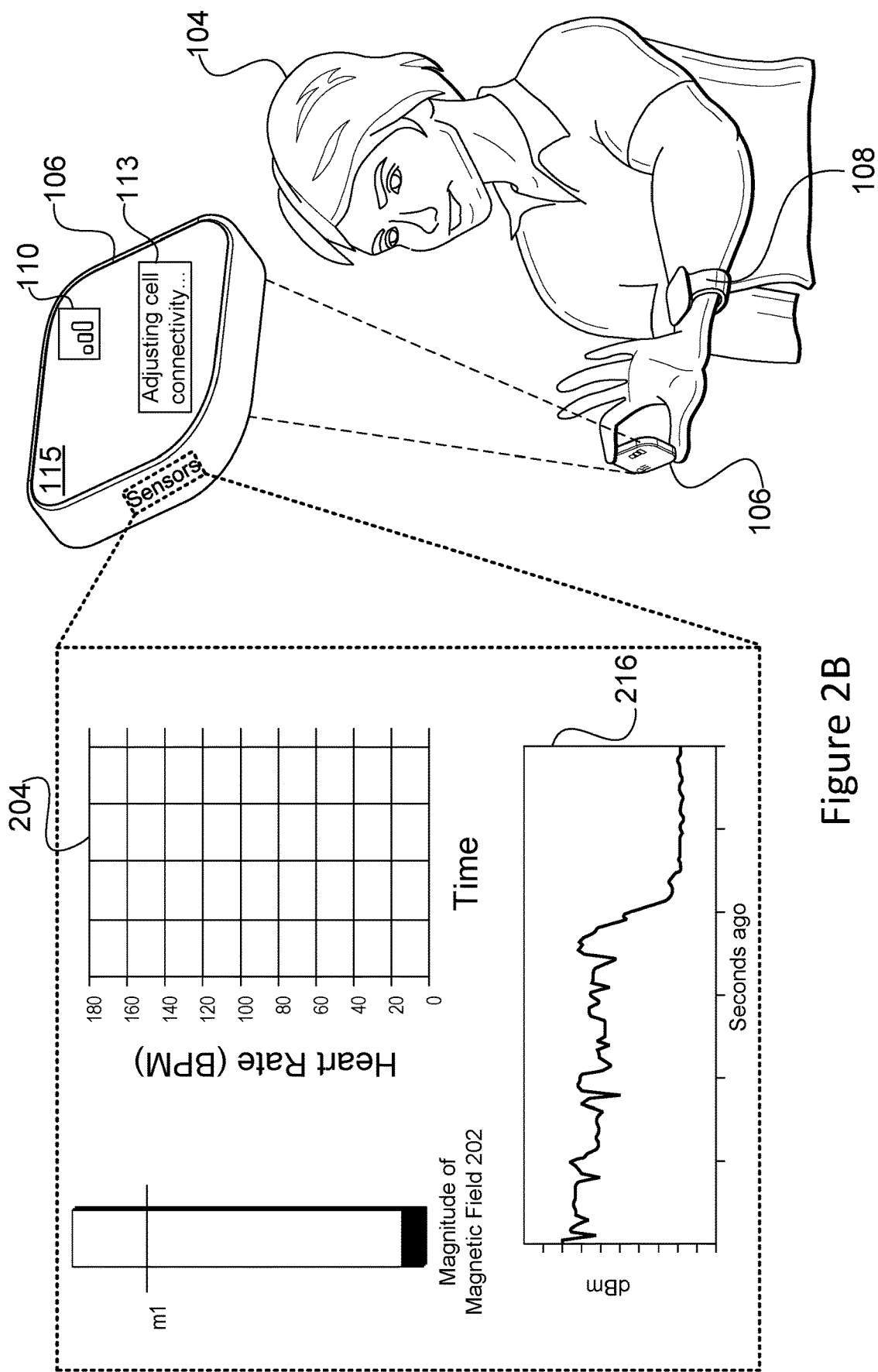
FIG. 2B illustrates a finger-hold position of a portion of a wearable device and example sensor measurements associated therewith, in accordance with some embodiments.
Figure 2C:
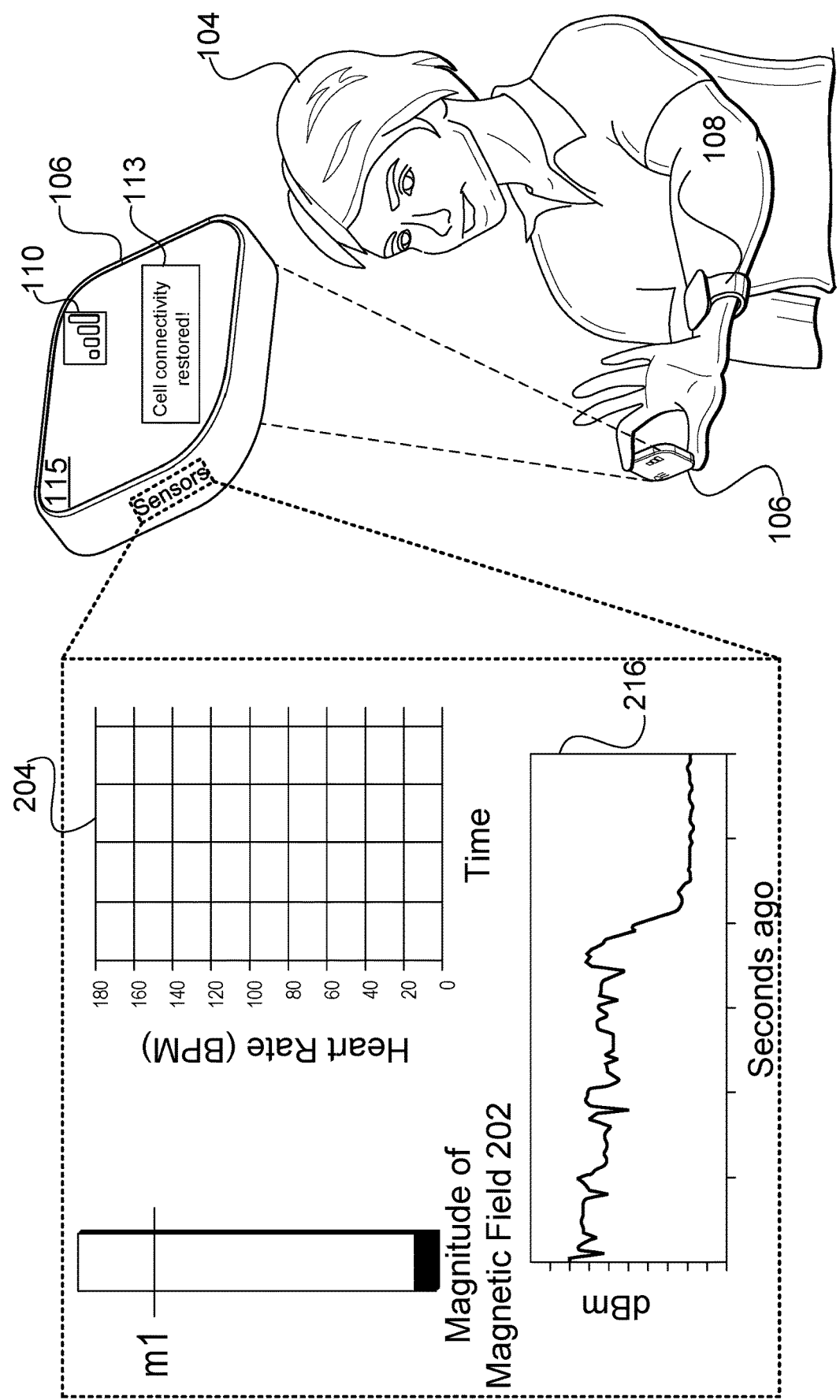
FIG. 2C illustrates the restoration of cellular connectivity while the wearable device is in the finger-hold position, in accordance with some embodiments.

Next, in step 191, using these sensed values from at least two different sensors, a current position (also referred to herein as a positional state) of a portion of the wrist-wearable device relative to the user's body from among at least three predefined positions of the portion of the wrist-wearable device is selected. In some embodiments, step 191 occurs after detection of a predefined positional-state-change event, such as an indication that the capsule 106 has been removed from cradle of the band portion of the wrist-wearable device (e.g., the magnetic field values from magnetic field sensor 120 fall below the threshold m1, FIG. 1A) or the capsule 106 has been reconnected with the cradle of the band portion of the wrist-wearable device (e.g., the magnetic field values from magnetic field sensor 120 reach above or equal to the threshold m1, FIG. 1A). The depicted sequence between FIGS. 2A-2C show one example of such a positional-state-change event, in which the capsule 106 is moved from the wrist-worn position (FIG. 2A), during which a magnitude or value of the magnetic field is at or above the threshold m1, and to the finger-hold position (FIGS. 2B-2C), during which a magnitude or value of the magnetic field is falls below the threshold m1, which can then cause performance of the step 191. Use of a positional-state-change event can help ensure that the device 100 need not continuously determine its current state but does so only after detection of the positional-state-change event, thereby helping to preserve limited computing resources and extend battery life and operational performance of the device 100.

Figure 8:
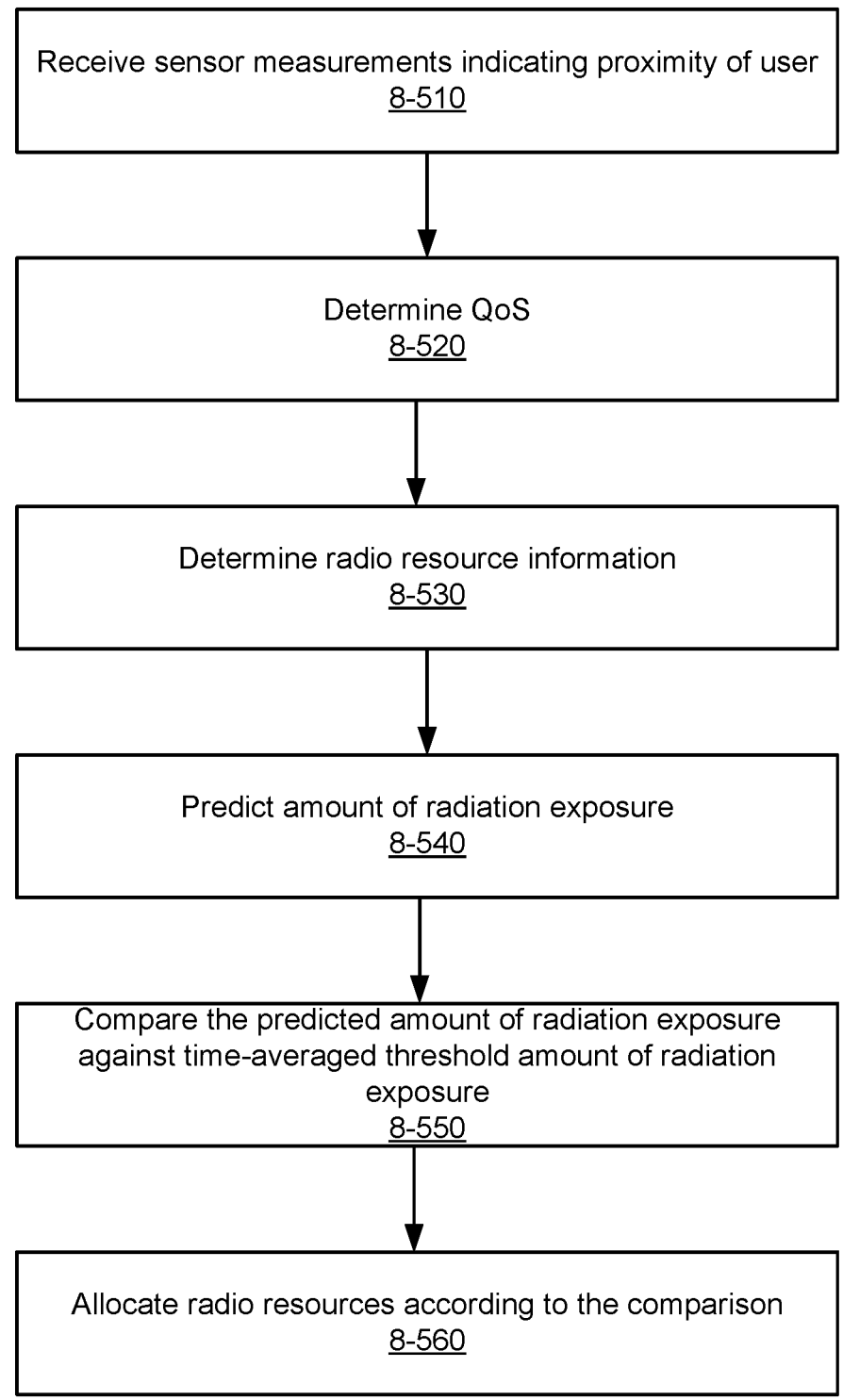
FIG. 8 is a flowchart showing a process of a device establishing a communication link according to a time-averaged specific-absorption rate (SAR) and quality of service, in accordance with some embodiments.
Figure 9:
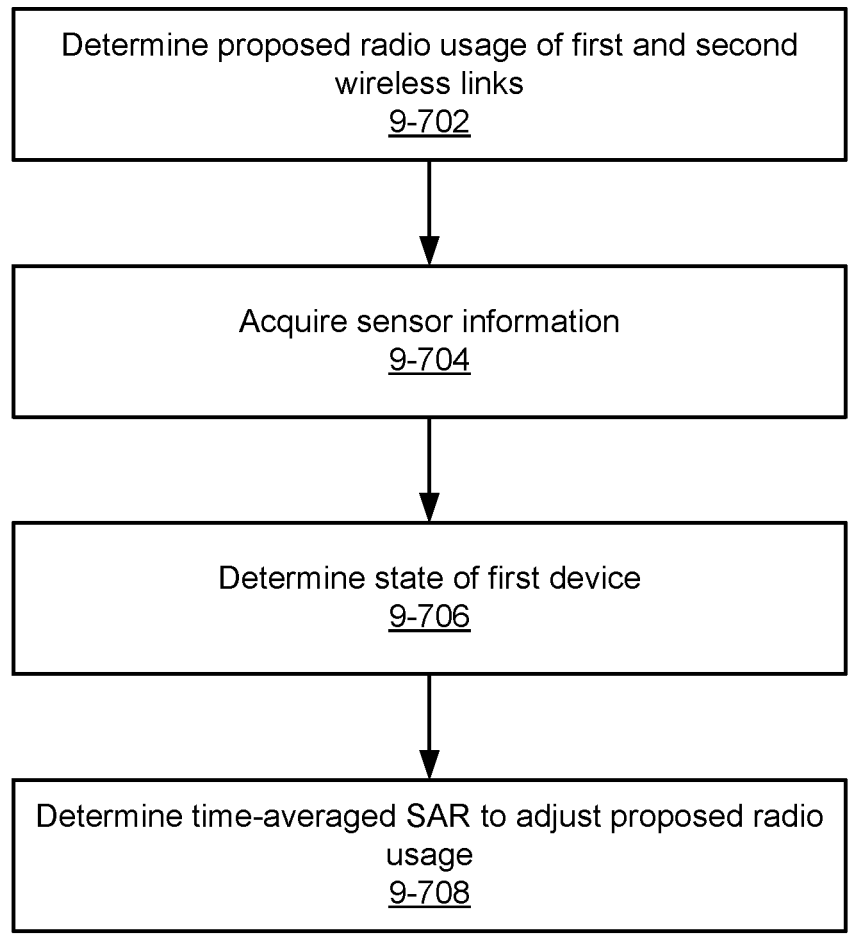
FIGS. 9 and 10 provide examples and descriptions related to approaches for adapting, adjusting, controlling, updating, and/or modifying a proposed radio usage (e.g., a radio frequency (RF) emission level, a transmission power, and/or a transmission schedule) of one or more wireless links (e.g., intralinks and/or interlinks) of a device (e.g., the wrist-wearable devices described herein that are able to detect various positions of at least a portion of the wrist-wearable device relative to a user's body), in accordance with some embodiments.

Next, in step 192, based on the current position of the portion of the wearable device determined at step 191, a determination is made whether to modify an operating characteristic (e.g., an operating characteristic of one or more communication subsystems and a display subsystem of the device 100) of the wrist-wearable device. If a determination to modify is made in step 192 (the path shown as 192-Yes in FIG. 1B), a first operating characteristic for a display subsystem of the wearable device or a second operating characteristic for one or more of communication subsystems of the wearable device is modified in step 193. If a determination is made to not modify in step 192 (the path shown as 192-No in FIG. 1B), the method may loop back to step 190. As is described in more detail below, the determination at step 192 can be based on whether a change in the positional state of the portion of the wrist-wearable device (e.g., change between a first positional state before step 191 and a second positional state after step 191) indicates that a modification to one or both of the display and communication subsystems is required to maintain operational performance of the device (e.g., the modifications can include one or more of ensuring a reliable cellular network connection, avoiding draining battery life by keep display on when it is not needed, and ensuring safe operation of the device by adjusting compliance with specific-absorption rates (SARs) applicable while the device is in different positions relative to the user's body). Example approaches and techniques for making these modifications to operating characteristics are further described in references to FIG. 8-10. For example, Step 8-560 in FIG. 8 describes allocating radio resources according to the comparison result of step 8-550 (further descriptions of FIG. 8 are provided below). As another example, step 708 of FIG. 9 describes determining time-averaged SAR to adjust proposed radio usage (further descriptions of FIG. 9 are provided below).

FIG. 1C illustrates a data structure (e.g., a table) 102 that can be stored in a memory of the device (such as storage 1002, FIG. 7, and/or memory 1050, FIG. 7), and the table 102 can be used in conjunction with making device-state (also referred to as positional-state) determinations based on ranges of sensor values, e.g., the data structure 102 can include information used for performing lookups based on sensed ranges of sensor values to determine a current positional state and/or any necessary changes/adjustments to operating parameters based on the current positional state. In some embodiments, the possible current positional states are all predefined positions relative to a user's body, including a wrist-worn position, a finger-hold position, a body-worn position, a head-mounted position, and a free-space position. The ranges of values shown as being associated with the different predefined positional states are merely non-limiting examples provided as rough approximations. These ranges of values can be determined during a setup process in which the user is instructed to place the capsule portion 106 of the device 100 in different positions over a variety of different days so that the device 100 can then set appropriate ranges of sensor values to discriminate between each of the predefined positional states, and these ranges can be defined in a way that is specific to different users. Alternatively, or in addition, the device 100 can also be configured to include predetermined ranges of values that are configured in the process of manufacturing the device 100 (e.g., these predetermined ranges, or at least initial default ranges, can be stored in a memory of the device 100 before it is shipped to a consumer user). While one row is shown in the example table 102 of FIG. 1C for each of the predefined positions, one of skill in the art will understand that multiple different rows can also be used for one or more of the positional states (such that different ranges of values for the sensor data can be associated with one predefined positional state in certain embodiments). Also, while a table 102 is shown in the example of FIG. 1C, one of skill in the art will also appreciate that other data structures can also be utilized, including a trained machine-learning model. The capacitance ranges shown in table 102 are for when the user is not currently touching the front of touchscreen 115 with his or her finger(s).

Figure 3C:
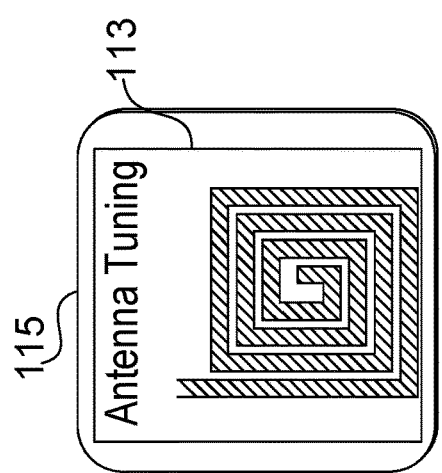
FIGS. 3A-3D illustrate example indications presented on a display of a wrist-wearable device while adjustments to one or both the communication subsystem(s) and display subsystem are in progress, in accordance with some embodiments.

Device state table 102 can also be used to, after a position of the capsule 106 is selected based on detected ranges of sensor values, assist with a determination as to whether to modify operating characteristics of the wearable device. A modification to the first operating characteristic may refer to a modification to the display subsystem by, e.g., decreasing the brightness level of the display screen of the wearable device (e.g., FIG. 3A shows a modification to a display subsystem of the wearable device). A modification to the second operating characteristic may refer to adjusting operation of one or more communication subsystems to comply with SAR requirements and/or tuning an antenna of the communication subsystem to cause the antenna to operate at a different frequency, or other adjustments to assist with restoring a strong cellular network connection. If a determination is made to modify operating characteristics, then appropriate modifications can be determined by comparing the optimal ranges of operating characteristics (last column of table 102, FIG. 1C) between a prior positional state of the portion of the wearable device and its current positional state. In some embodiments, only a first operating characteristic is modified. In other embodiments, only a second operating characteristic is modified. In some embodiments, both the first and second operating characteristics are modified (and the second operating characteristic can also be modified for multiple different communication subsystems). Examples of approaches and techniques for making these modifications to multiple operating characteristics (e.g., which can include quality of service operating characteristics/metrics and SAR metrics) are further shown and described in reference to FIGS. 8-10.

Figure 2D:
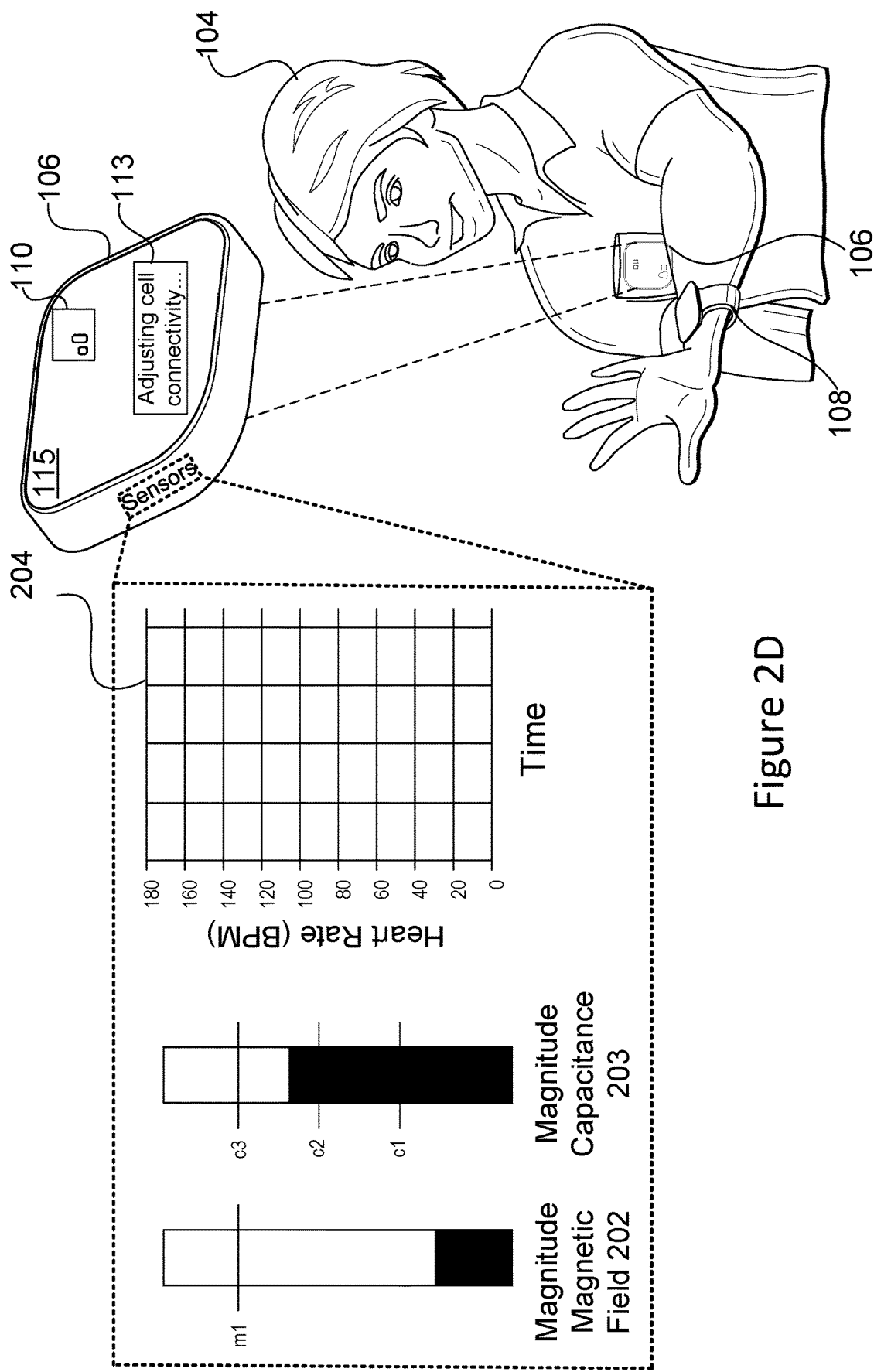
FIG. 2D illustrates a body-worn position of a portion of a wearable device and example sensor measurements associated therewith, in accordance with some embodiments.
Figure 2E:
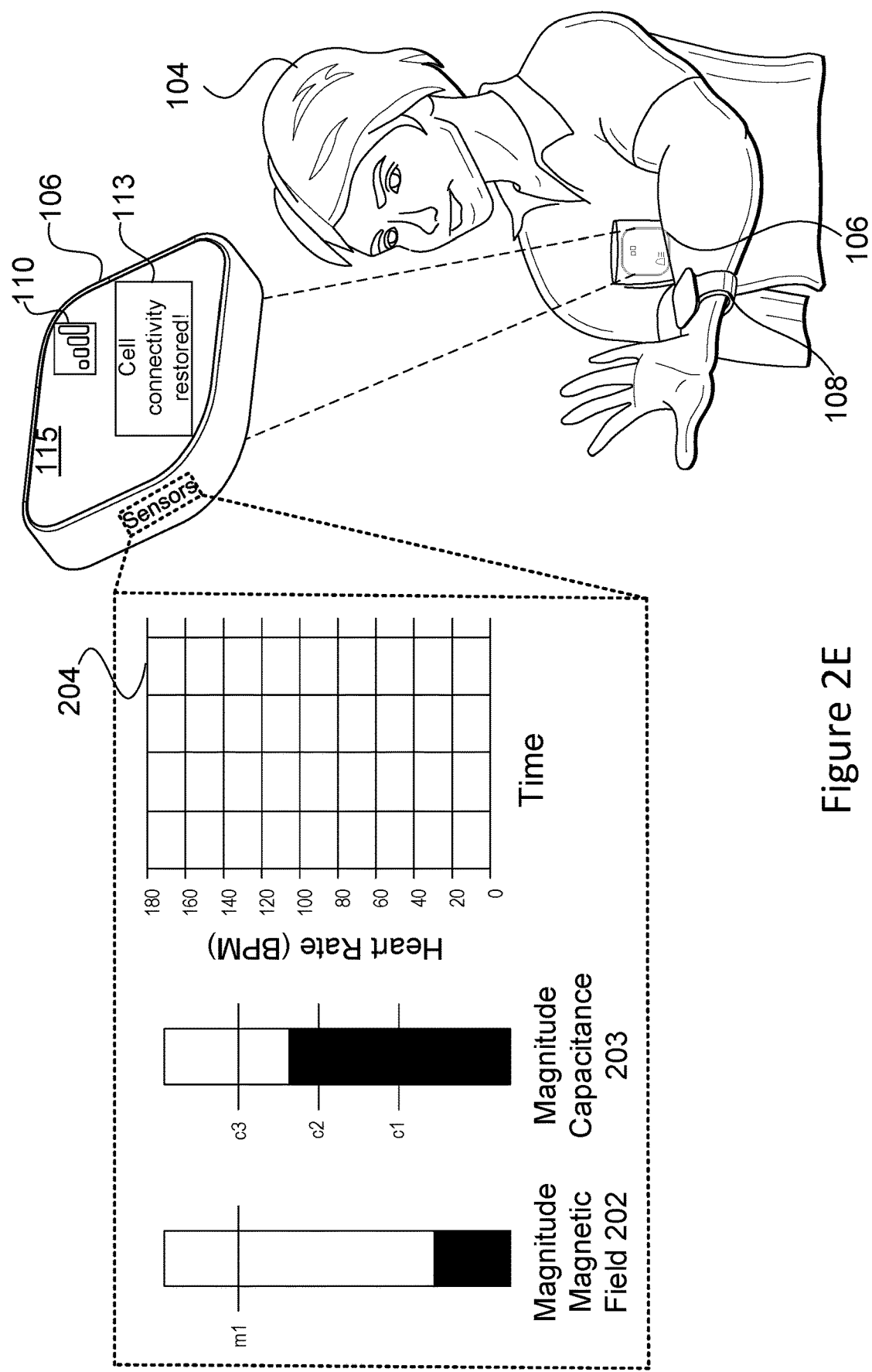
FIG. 2E illustrates the restoration of cellular connectivity while the wearable device is in the body-worn position, in accordance with some embodiments.
Figure 2F:
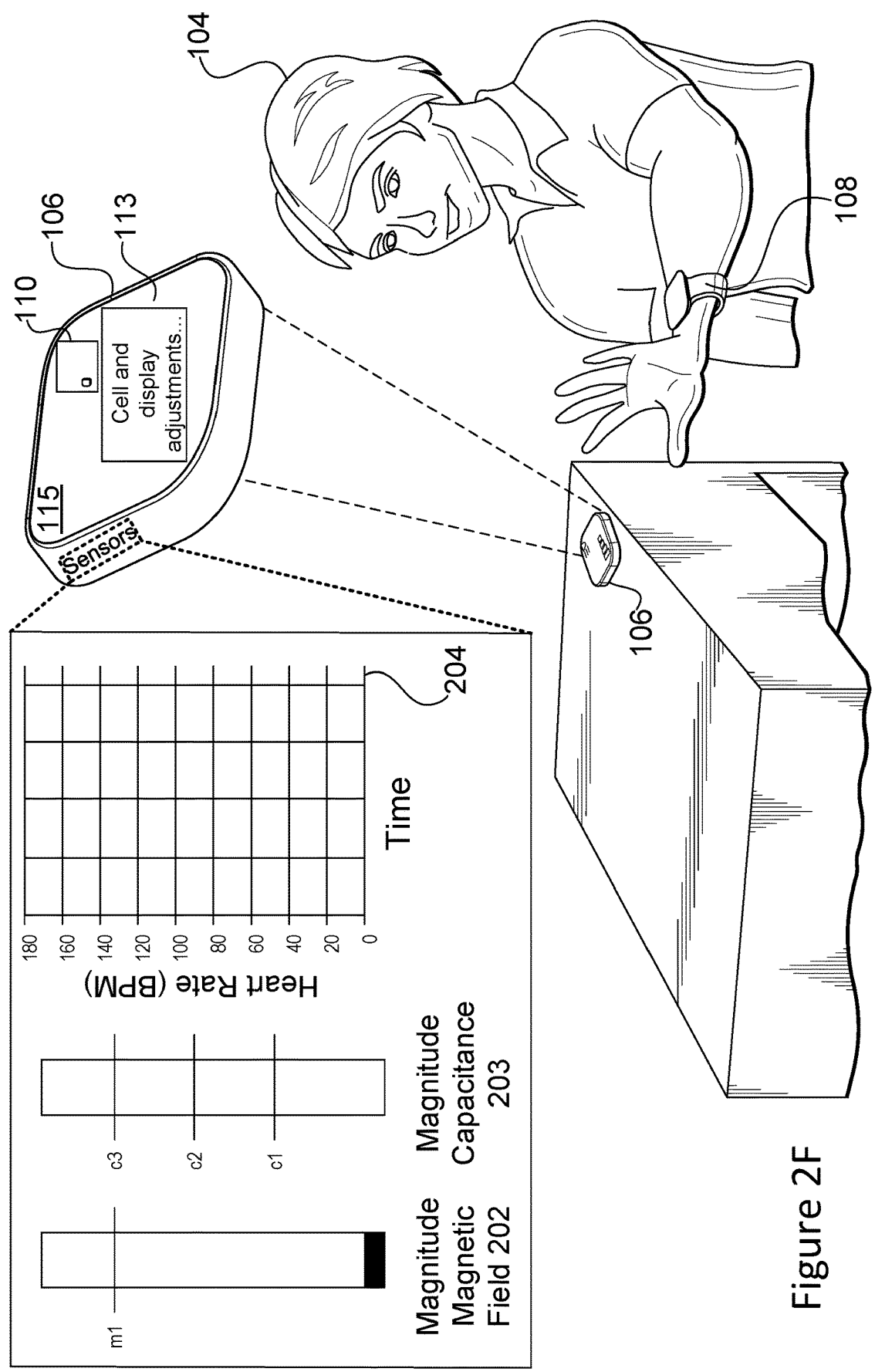
FIG. 2F illustrates a free-space position of a portion of a wearable device and example sensor measurements associated therewith, in accordance with some embodiments.

The different predefined positions of the capsule 106 may be any possible positions in which the user can hold or place the capsule 106. In some embodiments, the different positions of the capsule 106 include wrist-worn position (as shown in FIG. 2A), finger-hold position (as shown in FIG. 2B), body-worn position (as shown in FIG. 2D), free-space position (as shown in FIG. 2F) and head-mounted position (as shown in FIG. 2H). In the wrist-worn position, the capsule 106 may be positioned in band 108. In the finger-hold position, the capsule 106 may be held by the user in his or her fingers. In the body-worn position, the capsule 106 may be placed in the user's pocket. In the free-space position, capsule 106 may not be physically touching user 104's body at all (e.g., the capsule 106 is placed on a table away from the user in the free-space position). In the head-mounted position, capsule 106 may be coupled with a head-mounted device worn by the user (as shown in FIG. 2H, the capsule 106 can be coupled with a user's traditional or artificial reality glasses). Each of these example positions for the portion of the wearable device will now be described in turn with references made to the illustrated examples of FIGS. 2A-21, which show a sequence in which the capsule portion 106 of the wearable device is moved around to different positions relative to the body of user 104.

Turning first to FIG. 2A, an illustration of a wrist-worn position of a portion of a wearable device and example sensor measurements associated therewith (measurements of magnitude of magnetic field 202 and heartrate 204) is shown in accordance with some embodiments. As depicted, user 104 is wearing the wearable device on the wrist and the capsule 106 is currently coupled with the band portion 108 (e.g., by way of a cradle portion 107, FIG. 1A). In this wrist-worn position, various sensors can provide sensor data that is used to make determinations concerning a positional state of the wearable device relative to the body of user 104.

In the illustrated example of FIG. 2A, sensor data from two different sensors can be utilized to determine that the portion of the wearable device is in the wrist-worn position. The first sensor data, magnitude of magnetic field sensor 120, may be at or above a threshold magnetic-field value (m1) while in the wrist-worn position (when compared to the finger-hold position, body-worn position and free-space position). The magnitude of magnetic field 202 being the highest in the wrist-worn position is also reflected in device-state table 102 of FIG. 1C, as well as the magnitude of magnetic field graph 202 in FIG. 2A, indicating a currently sensed magnetic-field value above m1.

The second sensor data (e.g., data from sensor 2, capacitive sensor data) for the capacitive sensor may indicate a value of 400-500 ohm.

The third sensor data (e.g., data from sensor 3, biometric sensor data) may indicate a normal heart rate, as shown in heart rate graph 204 of FIG. 2A, because the capsule portion is able to detect a heart rate in the wrist-worn position.

The fourth sensor data (e.g., data from sensor 4, antenna return loss sensor) can indicate a strong cellular connection in the wrist-worn position, such that a high value for antenna return loss would be detected for the cellular antenna. This may also be indicated by cellular network connection 110 reflecting four bars (e.g., a strong cellular connection). While this one example (and others below in connection with FIGS. 2A-21) refer(s) to a cellular antenna and cellular connection, one of skill in the art will appreciate that an antenna return loss sensor can also be used with other antennas for other communication subsystems, e.g., for short-range communication subsystems (such as Bluetooth, zigbee, WiFi, and NFC).

As was discussed previously, determining that the portion of the wearable device is in the wrist-worn position can be made by performing a lookup in a data structure (e.g., table 102, FIG. 1C) using each of the first, second, third, and fourth sensor values discussed above. In some embodiments, only two sensors are necessary to determine that the portion is in the wrist-worn position, such that the lookup can be conducted using, e.g., just the first and third sensor data (FIG. 2A also depicts just these two sensor measurements). As mentioned previously, rather than using a lookup table, the two or more sensor values can instead be provided to a machine-learning model that then outputs a positional state for the portion of the wearable device based on the detected sensor values that were provided to the model.

Turning next to FIG. 2B, an illustration is shown in which the user has moved the portion of the wearable device from the wrist-worn position of FIG. 2A to a finger-hold position. Thus, FIG. 2B illustrates a finger-hold position of the portion of the wearable device and example sensor measurements associated therewith (measurements of magnitude of magnetic field 202, heart rate 204, and antenna return loss 216), in accordance with some embodiments. As the user 104 moves the capsule 106 from the wrist (as shown in FIG. 2A) to a finger-hold position, various sensors may provide data that can be used to determine the current position of the portion of the wearable device 108. In the finger-hold position, the capsule portion 106 of the wearable device may held by the user's index finger and thumb. In some embodiments in the finger-hold position, the capsule portion 106 is grasped by user 104 using more than two fingers.

In the finger-hold position, the magnitude of magnetic field 202 of capsule 106 (e.g., as sensed by sensor 1) decreases as compared to magnitude of magnetic field 202 in the wrist-worn position (due to the growing distance of capsule portion 106 from band portion 108 and its cradle 107, as there is then a weak or no magnetic attractive force between the capsule portion 106 and the cradle portion 107 as the distance increases). This is reflected in the magnitude of magnetic field 202 in FIG. 2B being significantly lower than the magnitude of magnetic field in FIG. 2A, which also shows that the magnitude of magnetic field 202 in FIG. 2B also moves well below the threshold magnetic-field value m1 while the portion of the wearable device is in the finger-hold position.

Additionally, in the finger-hold position, the magnitude of capacitance sensed (e.g., as sensed by sensor 2, device-state table 102) may be the highest (as compared to capacitance values while the portion is in any of the other predefined positions relative to the body of user 104), reaching a capacitance value at or above capacitance threshold value c3 (not shown in FIG. 2B for brevity). This high capacitance value can be due to the close proximity of the user's fingers to touchscreen of the capsule 106 or to any other capacitance-sensing elements.

Further, in the finger-hold position, biometric sensor (e.g., as sensed by sensor 3) may indicate no heart rate detected (as shown in heart rate graph 204 in FIG. 2B) since the capsule 106 is no longer able to detect a heart rate while it is no longer coupled to the band 108 by way of the cradle 107. In some embodiments, a rapidly decreasing heart rate average (e.g., decreasing at a rate of 20 or more bpm/second) can also indicate that the capsule is no longer detecting a heart rate (even if the heart rate has not yet reached a zero value).

In the finger-hold position, cellular network connection 110 can initially decrease as compared to a cellular network connection in the wrist-worn position (e.g., in FIG. 2B, three bars of cellular connectivity are present as compared to the four bars in FIG. 2A). The fourth sensor data (e.g., data from sensor 4, antenna return loss sensor) can indicate a lower antenna return loss value relative to the return loss value when the portion was in the wrist-worn position (e.g., as depicted in FIG. 2B, the antenna return loss graph 216 starts to dip down to a lower return loss value).

In response to detecting a change in the sensors 115, including magnitude of magnetic field 202 (e.g., by sensor 1), magnitude of capacitive/capacitance sensed (e.g., by sensor 2), and the return loss detected by antenna return loss sensor (e.g., sensor 4, device state table 102) from the wrist-worn position of FIG. 2A to the finger-hold position of FIG. 2B, a first operating characteristic or second operating characteristic may be modified for adjusting subsystem performance (an indication 113 can also be presented on the display 115 to inform the user that an adjusted connectivity to the cellular is being made, as is shown in FIG. 2B). For example, the sensed values for the portion of the wearable device while it is in the finger-hold position of FIG. 2B are used to perform a lookup in a data structure (e.g., table 102, FIG. 1C, but a machine-learning model can also be used instead or in addition to a table-based data structure) to then determine (e.g., using one or more processors of the wrist-wearable device or more one or more processors of a device that is in communication with the wrist-wearable device) that the portion is in the finger-hold position. After making this determination, comparisons of the optimal ranges of operating characteristics for the finger-hold position as compared to the prior position of the portion (which is wrist-worn position in this example) can be made to assess which adjustments are necessary to arrive at the optimal ranges for the finger-hold position (e.g., to move from one or both of ranges 190 and 191 (FIG. 1C) to one or both of ranges 192 and 193 (FIG. 1C)). As a result of the appropriate modifications to the first or second operating characteristics, cellular connectivity can be restored as shown by the indication 113 provided to the user in FIG. 2C, and by the cellular network connection 110 again having four bars, instead of the three bars from FIG. 2B, which reflects a restoration of full cellular network connectivity.

Moving on to FIG. 2D, an illustration is provided showing that the user 104 has now moved the portion of the wearable device to a body-worn position by placing the capsule in a shirt pocket, and example sensor measurements associated with the body-worn position are also shown (measurements of magnitude of magnetic field 202, heart rate 204, and magnitude of capacitance 203). As the user 104 places the capsule 106 in his or her pocket, the various sensors provide data that can be used to determine a positional state of the portion of the wearable device.

In the body-worn position, the distance of the capsule 106 from band portion 108 (and its associated cradle 107 that can be magnetically coupled with the capsule 106) may be larger than in the wrist-worn position but closer than in the finger-hold position. As a result, the magnitude of magnetic field 202 of capsule 106 (e.g., as sensed by sensor 1) may be lower when compared to the sensed magnitude of magnetic field 202 while the portion was in the wrist-worn position (FIG. 2A), but higher than the sense magnitude of magnetic field 202 while the portion was in the finger-hold position (FIGS. 2B-2C).

This also reflected in device-state table 102 (e.g., a magnitude of magnetic field range of 3-3.5 mG for the body-worn position, which is between the respective ranges for the finger-hold and wrist-worn positions).

In the body-worn position, the magnitude of capacitance 203 (e.g., as sensed by sensor 2) may be the second highest (in comparison to the other positional states of the wearable device, the highest being the finger-hold position illustrated in FIG. 2B), and that magnitude of capacitance can be at or above threshold c3. This is also reflected in device-state table 102, where the capacitive sensor reflects a range between 2200 ohm and 2300 ohm for the body-worn position. This may be due to the close proximity of the user's body to the capsule 106 touchscreen, which can cause come capacitance to be present at the touchscreen.

Further, in the body-worn position of FIG. 2D, biometric sensor (e.g., sensor 3) may indicate no sensed data (or can indicate a rapidly decreasing measurement of biometric data, as was mentioned above), indicating that, e.g., no heart rate (or other biometric data) is detected. This is reflected in the heart rate graph 204 of FIG. 2D.

As the portion moves from the finger-hold position (FIGS. 2B-2C) and to the body-worn position (FIG. 2D), cellular network connectivity strength can be negatively impacted, such that the restored four-bar cellular network connection 110 of FIG. 2C can be reduced to a two-bar cellular network connection 110 in FIG. 2D (and an indication 113 can be provided to the user on the display 115 as depicted in FIG. 2D to inform the user that adjustments to device operations are ongoing).

The changes in the sensor data (changes between FIGS. 2B-2C and the sensor data in FIG. 2D) can cause the device to determine a new positional state of the portion of the wearable device (e.g., by performing a lookup in the table 102, FIG. 1C, using the new sensor data depicted in FIG. 2D). They can be referred to as detecting a positional-state-change event (as was mentioned above in conjunction with FIG. 1B), where detecting of a positional-state-change event can cause the determination of a new positional state of the portion of the wearable device. When a new positional state is determined (the body-worn position in this example), the information stored in the optimal range column of table 102 can be used to allow for determinations as to appropriate adjustments to be made to operating characteristics while in the new positional state as compared to the prior positional state (the finger-hold position in this example). For example, comparisons of the optimal ranges of operating characteristics for the body-worn position as compared to the finger-hold position can be made to assess which adjustments are necessary to arrive at the optimal ranges for the body-worn position (e.g., to move from one or both of ranges 192 and 193 (FIG. 1C) to one or both of ranges 194 and 195 (FIG. 1C)). As a result of the appropriate modifications to the first or second operating characteristics, cellular connectivity can be restored as shown by the indication 113 provided to the user in FIG. 2E and by the cellular network connection 110 again having four bars, instead of the three bars from FIG. 2D, which reflects a restoration of full cellular network connectivity.

Turning next to FIG. 2F, the user 104 has now moved the capsule portion 106 to the free-space position, so FIG. 2D illustrates the free-space position of the portion of the wearable device and associated measurements of sensor data while in the free-space position (measurements of magnitude of magnetic field 202, magnitude of capacitance 203, and heart rate 204). In the free-space position, the capsule 106 may be placed a specific distance away from user 104 (such as on a table in the depicted example of FIG. 2F) without user 104 physically touching capsule portion 106.

In the free-space position, the distance of capsule 106 from band portion 108 may be larger than in the wrist-worn position, finger-hold position, and body-worn position. As a result, the magnitude of magnetic field 202 of capsule 106 (e.g., as measured by sensor 1) may be lower when compared to the wrist-worn position, finger-hold position and body-worn position. This may be reflected in device-state table 102 as well as magnitude of magnetic field graph 202, which reflects the magnitude of magnetic field range as 0.3 mG-0.5 mG in the free-space position, which is below other ranges of magnetic field values for the other predefined positions and is also below the threshold magnetic-field value m1.

In the free-space position, the magnitude of capacitive sense 228 (e.g., detected by sensor 2) may be the lowest when compared to any of the positions, as reflected in device state table 102, magnitude of capacitance 203 indicating roughly 0-20 ohm, below threshold c1, for the body-worn position. This may be due to the large proximity of the user 104 from the touchscreen of the capsule portion 106, such that no capacitance is then detected at the touchscreen of the capsule 106.

Further, in the free-space position, biometric sensor (e.g., sensor 3, device-state table 102) may indicate no data, indicating that no heart rate is detected. This may also be reflected in heart rate graph 204, as shown in FIG. 2F.

In the free-space position, cellular network connection 110 (e.g., sensor 4, device state table 102) may again be negatively impacted, such that the cellular network connection 110 can drop to one cellular connection bar. Using the same process discussed above (e.g., detection of a positional-state-change event based on the changes in sensor data, which causes a new determination as to the current position of the portion of the wearable device), the device (or portion thereof) can then determine appropriate adjustments to restore the cellular network connection and/or to adjust operation of a display subsystem. In the example of FIG. 2F, adjustments are made to restore cellular network connection, and adjustments are also made to adjust the display subsystems (as is indicated to the user by the message provided in indication 113 on the display of capsule portion 106, FIG. 2F), and these adjustments can again be determined based on comparisons of the optimal range values (of table 102) for the new position of the portion of the wearable device relative to optimal range values for the prior position. For example, comparisons of the optimal ranges of operating characteristics for the body-worn position as compared to the free-space position can be made to assess which adjustments are necessary to arrive at the optimal ranges for the free-space position (e.g., to move from one or both of ranges 194 and 195 (FIG. 1C) to one or both of ranges 196 and 197 (FIG. 1C).

Figure 2G:
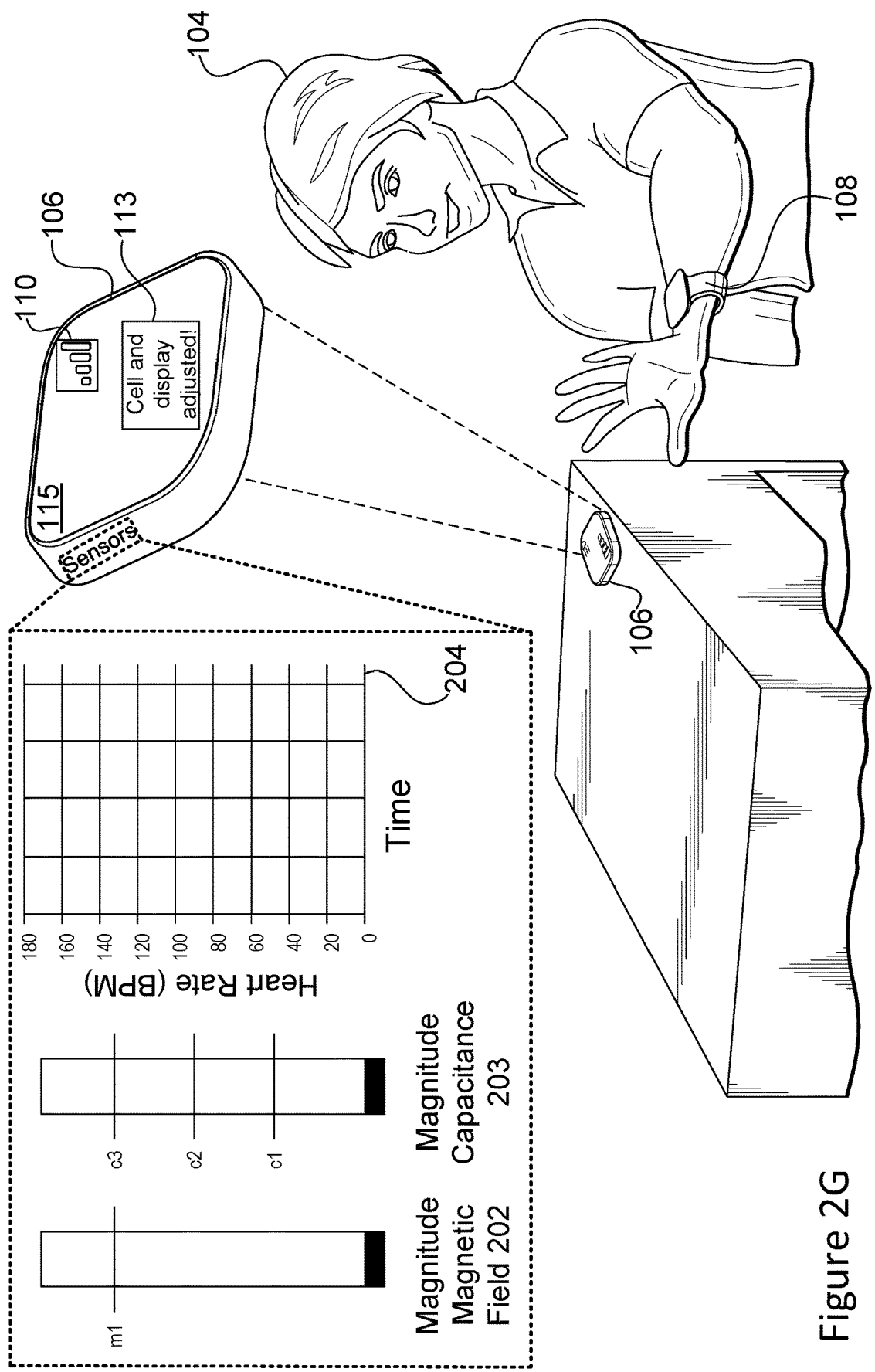
FIG. 2G illustrates the restoration of cellular connectivity and adjustments to the display while the wearable device is in the free-space position, in accordance with some embodiments.
Figure 2H:
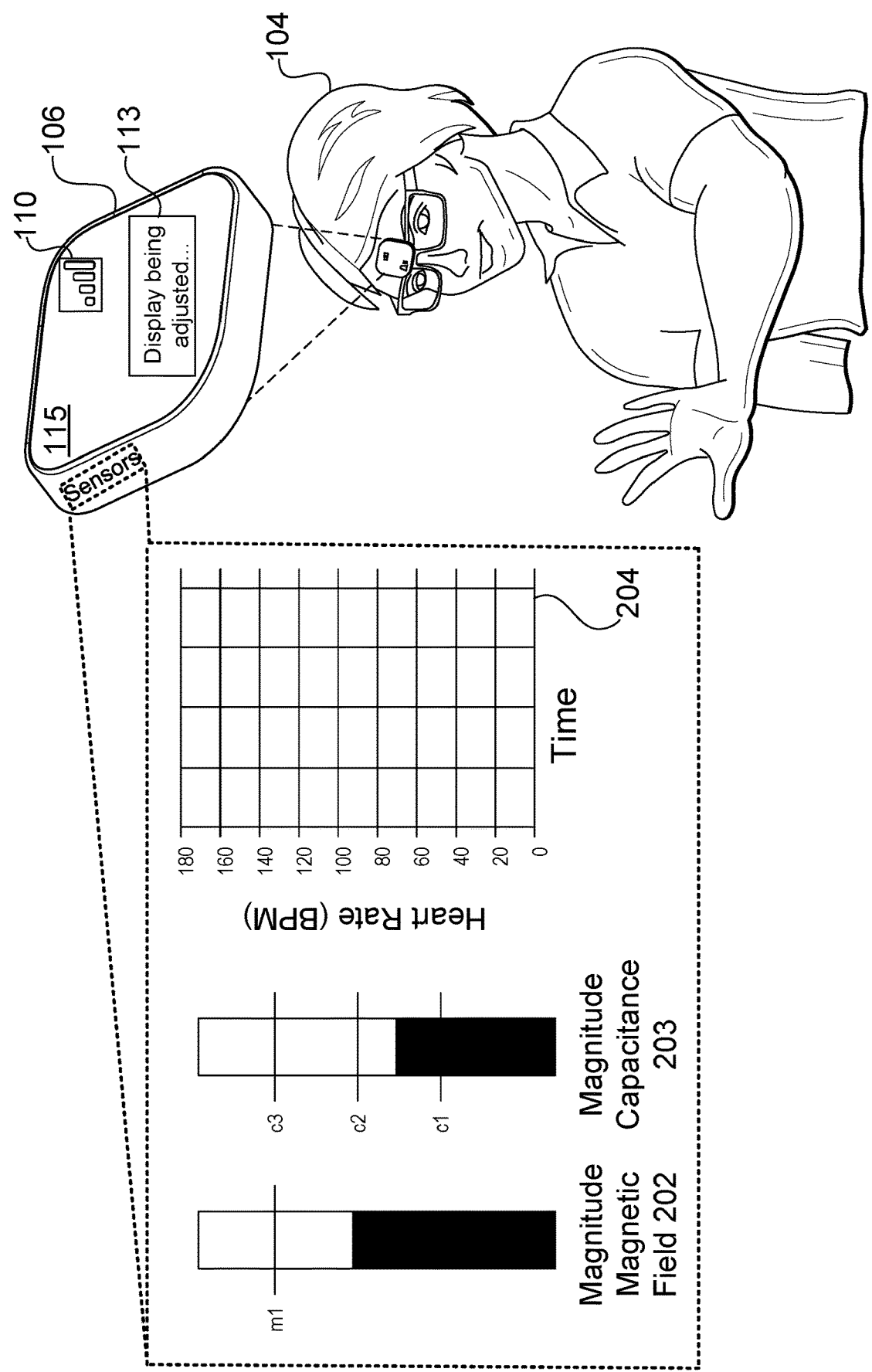
FIG. 2H illustrates a head-mounted position of a portion of a wearable device and example sensor measurements associated therewith, in accordance with some embodiments.
Figure 21:
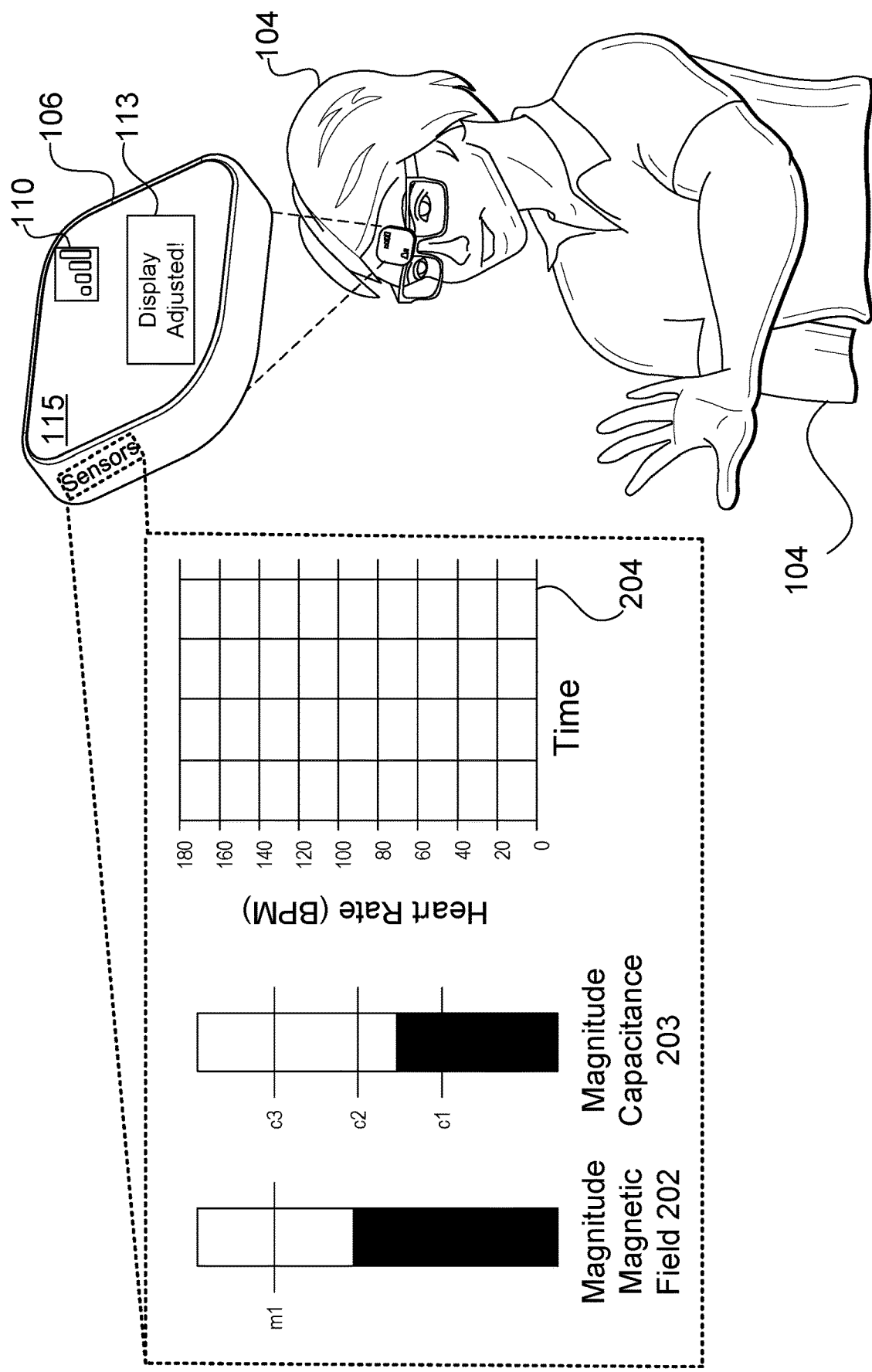

After these adjustments (which, again, can be determined using the optimal range data in table 102 (FIG. 1C) or data stored in some other data structure), then FIG. 2G illustrates that cellular network connectivity is again restored (as shown by the message in indication 113 and by the number of cellular connection bars increasing back to four in FIG. 2G).

Attention is next directed to FIG. 2H, which illustrates a head-mounted position of a portion of a wearable device and example sensor measurements associated therewith (measurements of magnetic of magnetic field 202, magnitude of capacitance 203, and heart rate 204), in accordance with some embodiments. After (or in conjunction with) the user 104 coupling the capsule 106 on his or her glasses (e.g., via a magnetic attachment mechanism on the glasses, which is shown by the magnitude of magnitude field 202 increasing above the value that was present previously in FIGS. 2F-2G), various sensors may provide data about the location of the wearable device 108. In the head-mounted position, the wearable device may be coupled to the user 104's glasses as shown. In some embodiments, the glasses worn by the user 104 can be artificial-reality glasses configured to present an artificial-reality environment to the user 104 (coupling of the capsule 106 to the glasses can further enhance the artificial-reality environment by, e.g., allowing use of a video camera on the capsule 106 to then further augment the artificial-reality environment with video data collected by the video camera on the capsule 106).

In the head-mounted position, the magnitude of capacitance 203 (e.g., detected by sensor 2) may be above threshold c1 but below the other two thresholds (c2 and c3), as reflected in magnitude of capacitance 204 in FIG. 2H. This may be due to the close proximity of the user's body to the capsule 106's touchscreen. This may be further reflected in device-state table 102, which reflects a range of 250 ohm-399 ohm for the capacitive sensor while the portion is in the head-mounted position.

Further, in the head-mounted position, biometric sensor (e.g., sensor 3) may indicate no data, indicating that no heart rate is detected. This may also be reflected in heart rate graph 204. In the head-mounted position, cellular network connection 110 can again be negatively impacted due to the device having changed its position relative to the user's body, which can affect certain performance characteristics of the cellular antennas.

Using the same process discussed above (e.g., detection of a positional-state-change event based on the changes in sensor data, which causes a new determination as to the current position of the portion of the wearable device), the device (or portion thereof) can then determine appropriate adjustments to restore the cellular network connection and/or to adjust operation of a display subsystem. In the example of FIG. 2H, adjustments are made to the display subsystem only (as cellular network connection remains strong even after the positional change from free-space to head-mounted position), as is indicated to the user by the message provided in indication 113 on the display of capsule portion 106, FIG. 2H. The appropriate adjustments can again be determined based on comparisons of the optimal range values (of table 102) for the new position of the portion of the wearable device relative to optimal range values for the prior position. For example, comparisons of the optimal ranges of operating characteristics for the free-space position as compared to the head-mounted position can be made to assess which adjustments are necessary to arrive at the optimal ranges for the free-space position (e.g., to move from one or both of ranges 196 and 197 (FIG. 1C) to one or both of ranges 198 and 199 (FIG. 1C). FIGS. 3A-3D illustrate example indications presented on a display of a wrist-wearable device while adjustments to one or both the communication subsystem(s) and display subsystem are in progress, in accordance with some embodiments. These example indications provide additional messages presented on the display 115 with the indications 113, e.g., as discussed above with reference to FIGS. 2A-2I.

More specifically, FIG. 3A illustrates an indication 113 that can be displayed in conjunction with modifying screen brightness for the wearable device, in accordance with some embodiments. A modification to the display screen of the wearable device may constitute a modification to the first operating characteristic. Reducing screen brightness interface may be referred to as a modification of the display subsystem of the wearable device, and doing so may conserve battery power of the wearable device.

Figure 3B:
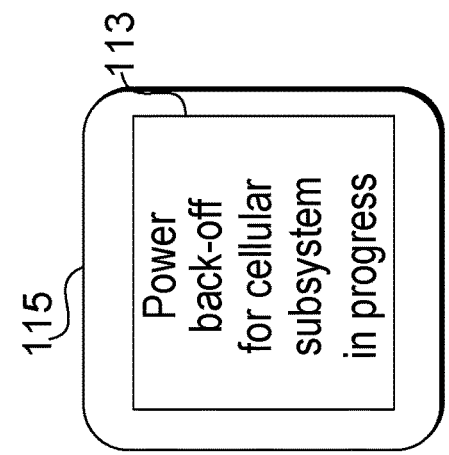
Figure 3A:
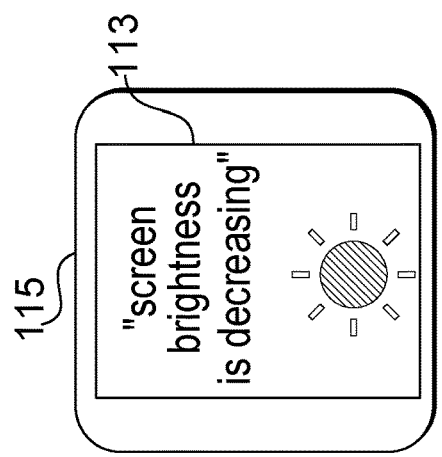

Next, FIG. 3B illustrates an indication 113 that can be displayed in conjunction with a modification to the performance of an antenna of one or more of the communication subsystems, which can cause the antenna(s) to operate using a different frequency. A modification to the antenna of the communication subsystem of the wearable device may constitute a modification to the second operating characteristic. Tuning antenna interface may be referred to as a modification of the communication subsystem of the wearable device, and doing so can allow for restoring a stronger level of cellular connectivity.

Attention is next directed to FIG. 3C, which illustrates an indication 113 that can be displayed in conjunction with an adjustment to the cellular (e.g., long-term evolution (LTE) or 5G, or like network connectivity standards) connectivity of the wearable device. A modification to LTE connectivity may allow for restoring or maintaining a stable network connection at the portion of the wearable device. Adjusting LTE connectivity interface may be referred to as a modification of the communication subsystem of the wearable device and doing so may maintain cellular network connectivity.

Figure 3D:
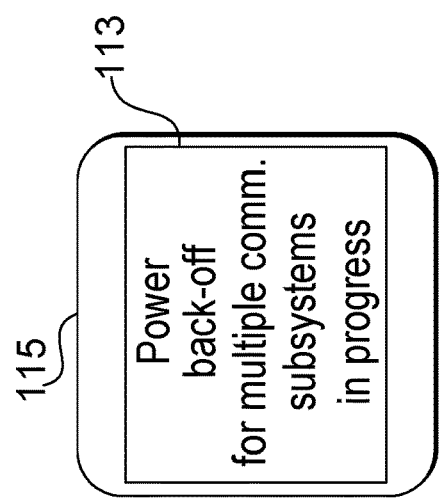

Finally, FIG. 3D shows an indication 113 that can be displayed in conjunction with an adjustment to the second operating characteristic for the communication subsystem. In the illustrated example, a power back-off is performed (which can occur in conjunction with an antenna tuning process) at one or multiple communication subsystems.

In some embodiments, multiple indications 113 shown in FIGS. 2A-2I and 3A-3D can be presented on the display 115 at a same time, e.g., in the example of FIGS. 2F-2G, when both communication and display subsystem adjustments are being made (cell and display adjustments in the illustrated example, but other communication subsystems can also be adjusted), then the indication 113 in FIG. 2G can be presented in addition to indication 113 of FIG. 3A, as well as one of the indications 113 of FIG. 3B-3C depending on which adjustments are being made to the communication subsystem(s), as appropriate, based on the optimal range data from table 102 (FIG. 1C) or another appropriate data structure or model (such as a machine-learning model, as mentioned previously).

Referring now to FIGS. 4A-4F, there is shown a flow chart of a method (400) of optimizing performance for a wearable device, based on a position of the wearable device relative to a user's body 104, in accordance with some embodiments. Operations (e.g., steps) of the method 400 can be performed by one or more processors (e.g., central processing unit 1026 and/or MCU 1052, FIG. 7) of a wearable device (e.g., wearable device 100, FIG. 1A, which is equivalent to and includes the functions and hardware associated with wearable device 950, FIG. 6A, and wearable device 1000, FIG. 7). At least some of the operations shown in FIG. 4 correspond to instructions stored in a computer memory or computer-readable storage medium (e.g., storage 1002 and/or memory 1050 of the wearable device). While the primary example below refers to the wearable device 100 (referred to simply below as device or device 100) performing operations of method 400, one of skill in the art will appreciate that portions of the wearable device can be responsible for executing all (or at least some of) the operations of method 400), e.g., a capsule portion 106 (equivalent to capsule 954, FIG. 6C, and capsule 1004, FIG. 7) can be responsible for executing at least some of (or all of) the operations of method 400.

Turning first to FIG. 4A, the method (400) includes selecting (402), based on (i) first sensor data from a first sensor of a wearable device and (ii) second sensor data from a second sensor of a wearable device, a current position of a portion (e.g., capsule portion 106) of the wearable device relative to a user's body 104 from among at least three predefined positions of the portion of the wearable device.

The at least three predefined positions (referenced in conjunction with operation 402) of the portion of the wearable device include (404): a wrist-worn position (e.g., an example wrist-worn position is shown in FIG. 2A) in which the portion of the wearable device is worn on the wrist of the user; a finger-hold position (e.g., an example finger-hold position is shown in FIGS. 2B-2C) in which the portion of the wearable device is held by the user after being removed from a band portion of the wearable device; and a free-space position (e.g., an example free-space position is shown in FIGS. 2F-2G) in which the portion of the wearable device is not in contact with the user's body 104. Data (e.g., ranges of sensor values) associated with each of the predefined positions can be stored in a data structure and/or data model on the wearable device (such as table 102, FIG. 1C), which can then be used by the device to allow it to make determinations concerning which position the portion of the wearable device is in at various points in time. As discussed above (in conjunction with FIG. 1B), new positional-state determinations can be made after detecting a positional-state-change event (e.g., a change in certain sensor data that exceeds a certain change threshold, such as a change in heart rate data of 20 bpm in less than one second), or the new positional-state determinations can be performed on a regular periodic basis (e.g., once every 20 ms).

In some embodiments, the portion of the wearable device is (406) a capsule portion 106 of the wearable device that is removably coupled with a band portion 108 of the wearable device, the capsule portion including (406) a display and the first and second sensors of the wearable device. This detachable/removable configuration of components of the wearable device is shown in FIGS. 1A and 1n FIGS. 6A-6C.

In some embodiments of the method 400, the first sensor data is (407) a magnitude of a magnetic field at the portion of the wearable device (e.g., illustrated as magnitude of magnetic field 202 in some of FIGS. 2A-2I); and the second sensor data is one of (i) a capacitance value at the portion of the wearable device (e.g., illustrated as magnitude of capacitance 203 in some of FIGS. 2A-2I), (ii) biometric data for the user (e.g., illustrated as heart rate graph 204 in some of FIGS. 2A-2I), or (iii) an antenna return loss value for an antenna of the wearable device (e.g., illustrated as antenna return loss graph 216 in some of FIGS. 2A-2I).

Figure 4B:
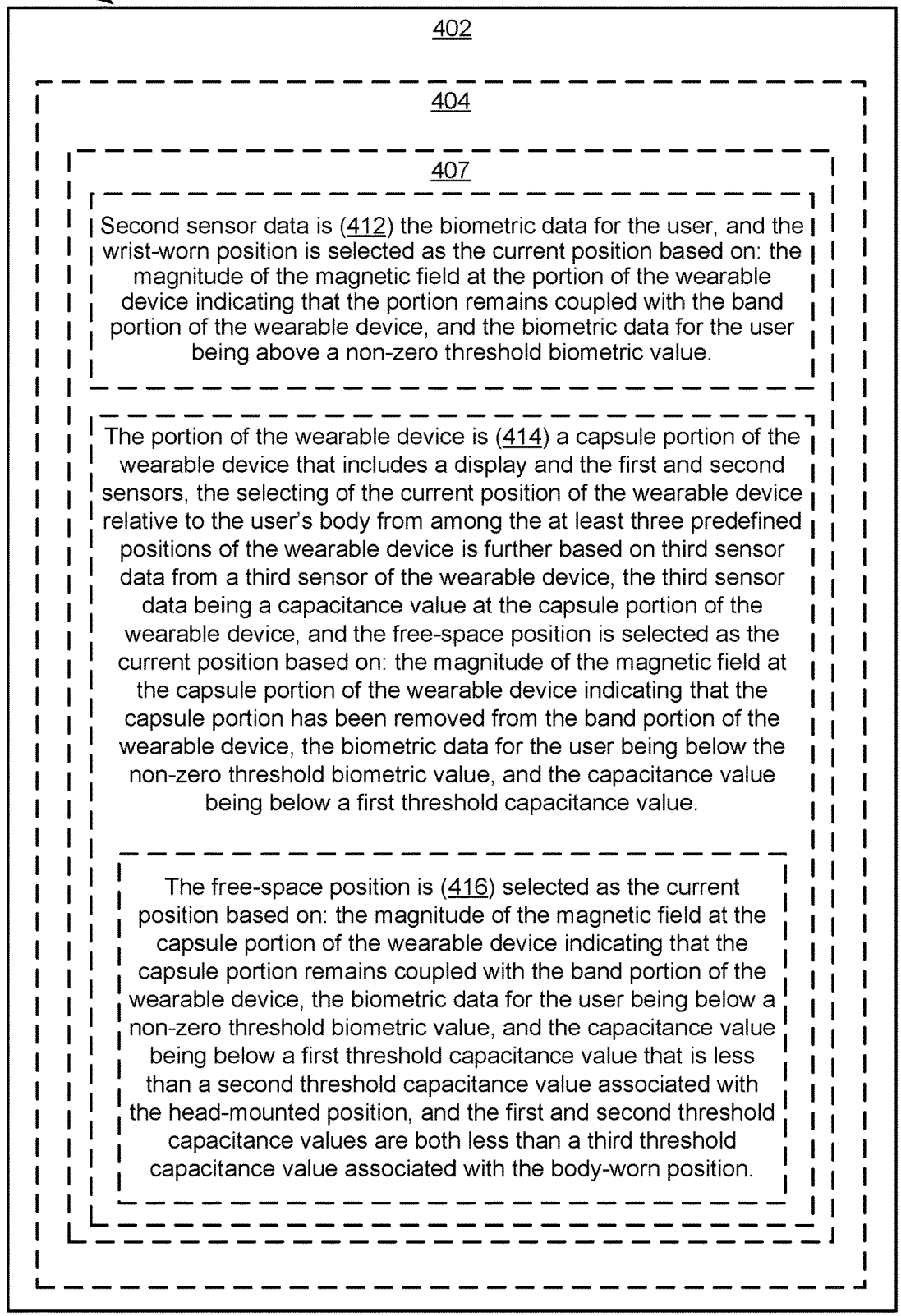

Turning now to FIG. 4B, examples of the positional states that can be determined for the portion of the wearable device in conjunction with the operations 402 and 404 based on various detected sensor data are shown. For example, at operation 412, second sensor data is (412) the biometric data (e.g., detected using a heart rate sensor, such as an optical heart rate sensor) for the user 104 and the wrist-worn position is selected as the current position based on the magnitude of the magnetic field at the portion of the wearable device indicating that the portion remains coupled with the band portion of the wearable device (e.g., the capsule remains magnetically attached to the band portion of the wearable device), and the biometric data for the user being above a non-zero threshold biometric value (e.g., at or above a non-zero threshold value of 45 bpm). In some embodiments, an example sensor for measuring magnitude of magnetic field is a hall-effect sensor. An example showing sensor data associated with the portion of the wearable device while it is in the wrist-worn position is described above with reference to FIG. 2A, and additional example logic showing use of sensor data to reach a determination that the portion is in the wrist-worn position is also show in FIG. 5 (e.g., operations 501, 502, 503, and 506 lead to such a determination).

With continued attention to FIG. 4B, another positional-state determination is also shown. In particular, at operation 414, the portion of the wearable device is a capsule portion 106 of the wearable device that includes a display and the first and second sensors, the selecting of the current position of the wearable device relative to the user's body from among the at least three predefined positions of the wearable device are further based on third sensor data from a third sensor of the wearable device. In some embodiments, the third sensor data is a capacitance value at the capsule portion of the wearable device, and the free-space position is selected as the current position based on the magnitude of the magnetic field at the capsule portion of the wearable device indicating that the capsule portion remains coupled with the band portion of the wearable device, the biometric data for the user being below the non-zero threshold biometric value, and the capacitance value being below a first threshold capacitance value (e.g., below a first capacitance threshold c1 shown in FIGS. 1A and 1n some of FIGS. 2A-21).

In some circumstances, the free-space position can be detected while the capsule portion remains coupled with the band portion of the wearable device, which is shown as operation 416 in FIG. 4B. This operation 416 can be an alternative way to find that the portion of the wearable device is in the free-space position and this operation 416 can occur at different points in time relative to operation 414, such that free-space position determinations can occur both when the capsule is and is not coupled with the band portion 108. More specifically, the free-space position is (416) selected as the current position based on the magnitude of the magnetic field at the capsule portion of the wearable device indicating that the capsule portion remains coupled with the band portion of the wearable device, the biometric data for the user 104 being below a non-zero threshold biometric value, and the capacitance value being below the first threshold capacitance value.

In some embodiments, the first threshold capacitance value is less than a second threshold capacitance value associated with the head-mounted position (e.g., head-mounted position shown in FIG. 2H in which capsule 106 is coupled to user 104 glasses), and the first and second threshold capacitance values are both less than a third threshold capacitance value associated with the body-worn position. Examples of the three different threshold capacitance values were discussed above, e.g., in reference to FIG. 1A, and those descriptions apply as well to use of the various thresholds in conjunction with execution of the method 400.

Figure 4C:
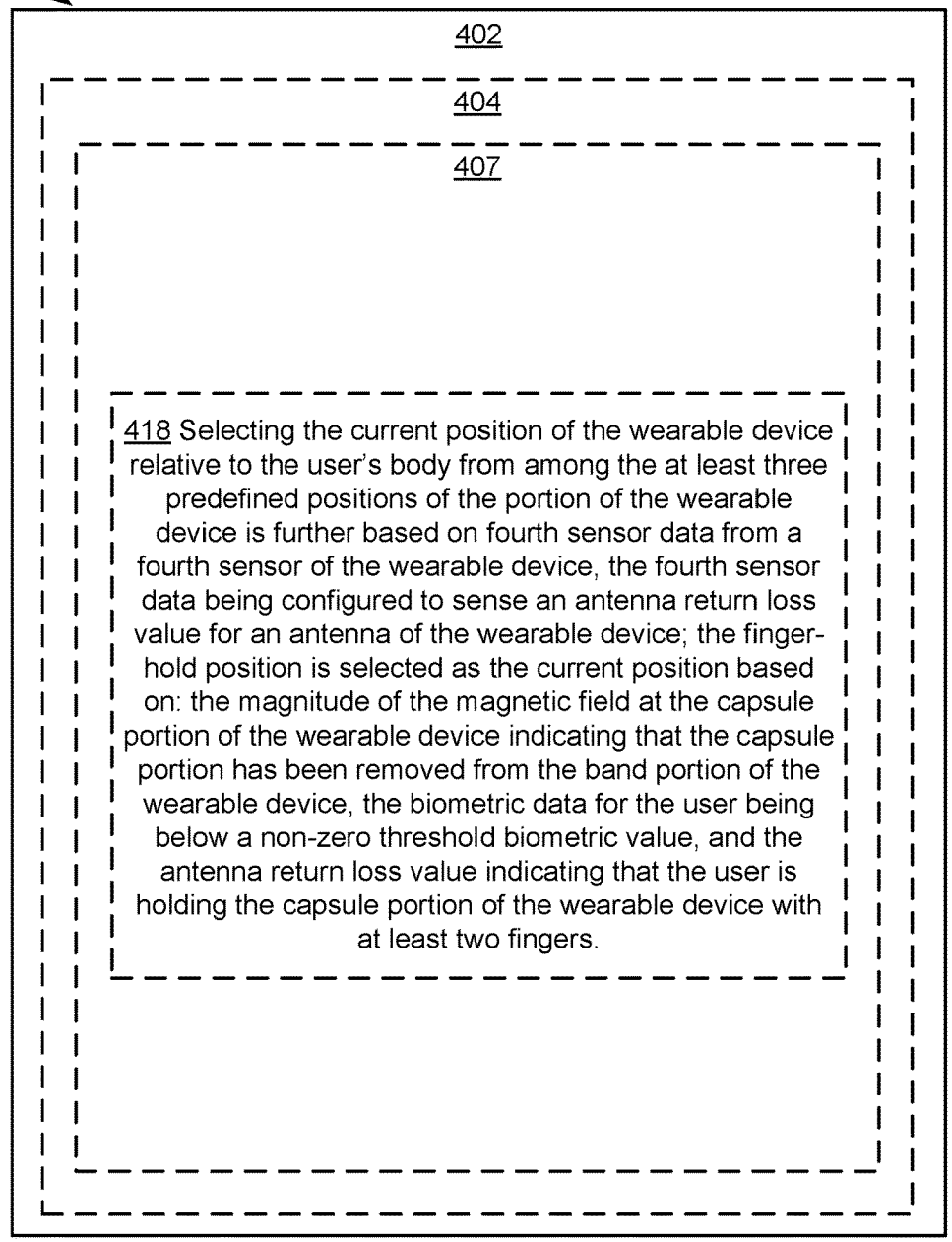

Turning next to FIG. 4C and continuing with various examples of positional-state determinations for the portion of the wearable device, operation 418 provides an example in which the current position is determined to be the finger-hold position. More specifically, at operation 418, selecting the current position of the wearable device relative to the user's body 104 from among the at least three predefined positions of the portion of the wearable device are further based on fourth sensor data from a fourth sensor of the wearable device, the fourth sensor data being configured to sense an antenna return loss value for an antenna of the wearable device (e.g., a voltage standing wave ratio (VSWR) for the antenna). Also at operation 418, the finger-hold position is selected as the current position based on the magnitude of the magnetic field at the capsule portion of the wearable device indicating that the capsule portion has been removed from the band portion of the wearable device, the biometric data for the user 104 being below a non-zero threshold biometric value, and the antenna return loss value indicating that the user 104 is holding the capsule portion 106 of the wearable device with at least two fingers.

Figure 4D:
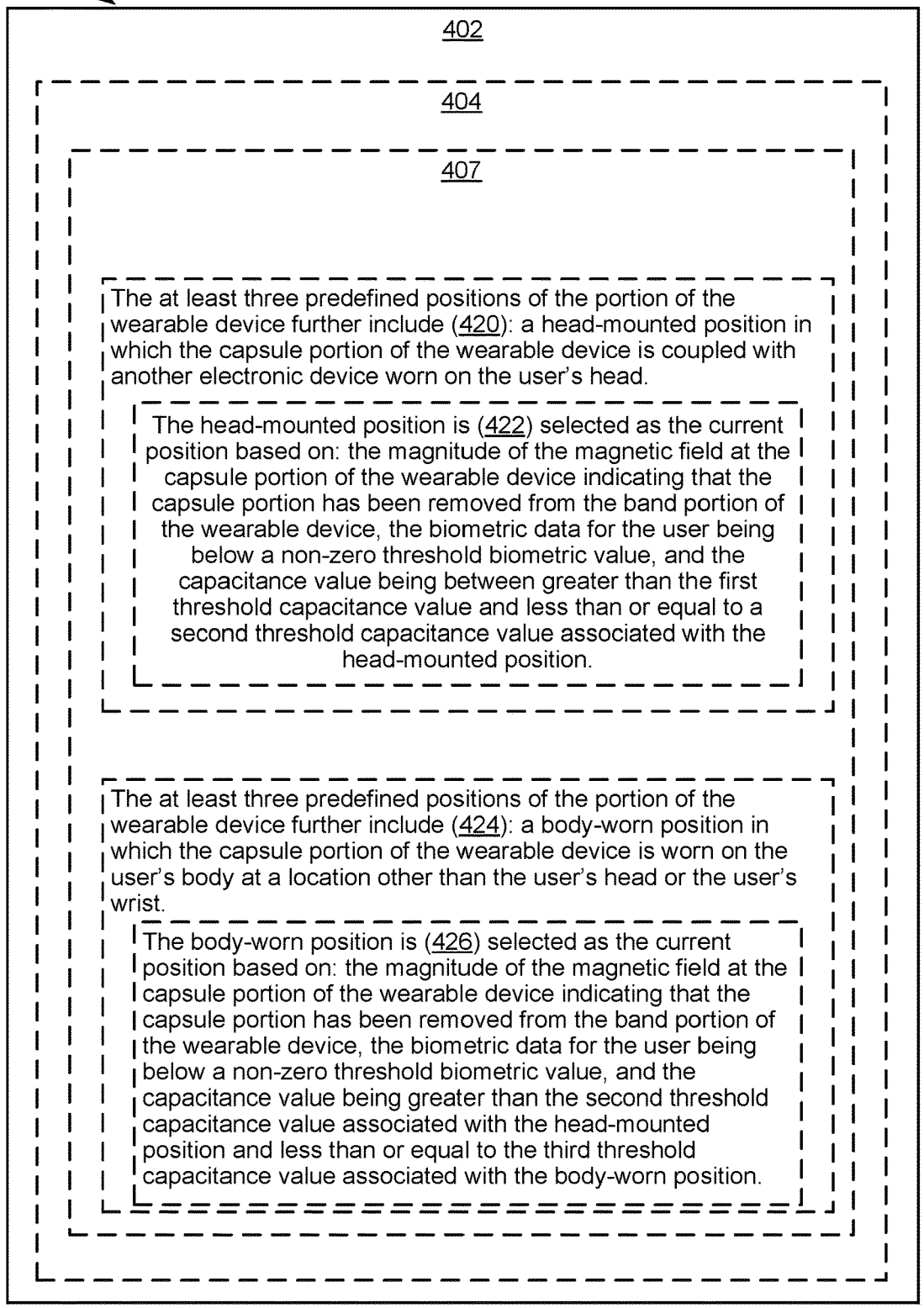

Attention is now directed to FIG. 4D, in which a few more example positional-state determinations are depicted. In particular, at operation 420, at least three predefined positions of the portion of the wearable device further include a head-mounted position in which the capsule portion 106 of the wearable device is coupled with another electronic device worn on the user's head. In some embodiments, the head-mounted position may be a position in which artificial-reality glasses are worn on a user's head and the portion of the wearable device, such as capsule portion 106, is coupled with the artificial-reality glasses (an example of this configuration is shown in FIGS. 2H-21). At operation 422, the head-mounted position is selected as the current position based on the magnitude of the magnetic field at the capsule portion of the wearable device indicating that the capsule portion has been removed from the band portion of the wearable device, the biometric data for the user being below a non-zero threshold biometric value, and the capacitance value being greater than the first threshold capacitance value and less than or equal to the second threshold capacitance value associated with the head-mounted position.

With continued attention to FIG. 4D, the at least three predefined positions of the portion of the wearable device further include (424) a body-worn position in which the capsule portion of the wearable device is worn on the user's body at a location other than the user's head or the user's wrist. In some embodiments, the body-worn position is a position in which the capsule portion of the wearable device is placed in a user's pocket. At operation 426, the body-worn position is selected as the current position based on the magnitude of the magnetic field at the capsule portion of the wearable device indicating that the capsule portion has been removed from the band portion of the wearable device, the biometric data for the user being below a non-zero threshold biometric value, and the capacitance value being greater than the second threshold capacitance value associated with the head-mounted position and less than or equal to the third threshold capacitance value associated with the body-worn position.

In sum, at operation 402, a current position of the portion of the wearable device is selected from among at least three predefined positions of the portion of the wearable device, where the at least three predefined positions include three or more of (i) wrist-worn position, (ii) free-space position, (iii) head-mounted position, (iv) body-worn position, and (v) finger-hold position (and can also include all five different positions, or even more than five positions). While the selection of the current position was described above as choosing one of the positions as the current position at a particular point in time, method 400 can execute as new positional-state-change events (discussed above) are detected, such that current positions are determined at many different points in time (so that changes in the position of the portion of the wearable device can be detected, allowing for making the adjustments to communication subsystem(s) and/or display subsystem based on the various changes in positions over time). Two examples of positional-state changes are illustrated in FIG. 4F, which will be discussed momentarily. Before doing so, attention is directed to FIG. 4E, which provides examples of operations associated with modifications or adjustments to various operation characteristics in conjunction with the various positional states of the portion of the wearable device.

Figure 4E:
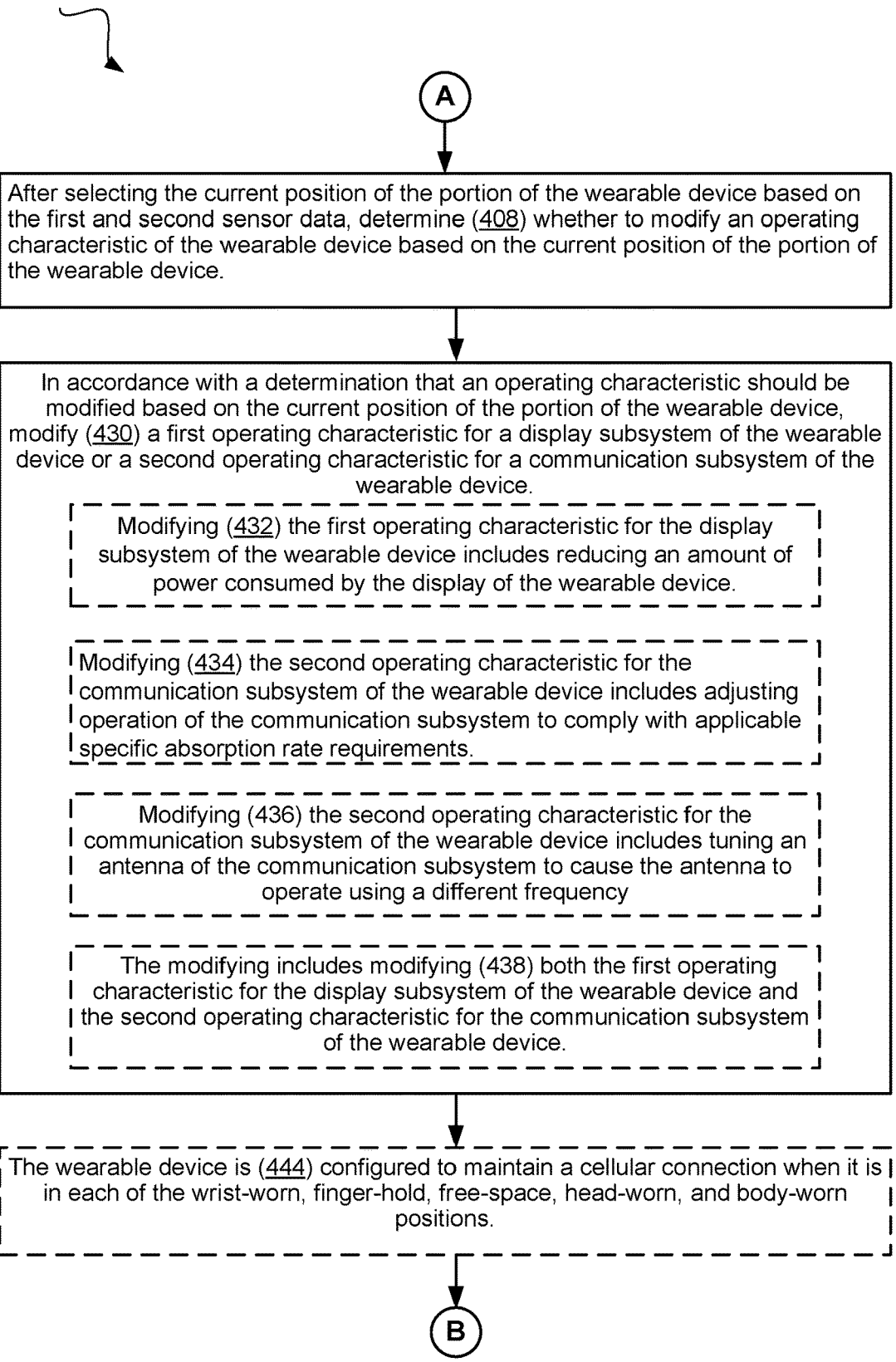

In particular, FIG. 4E shows that at operation 408, after selecting the current position of the portion of the wearable device based on the first and second sensor data (and, in some instances, also third and fourth sensor data as described above), the method includes determining (408) whether to modify an operating characteristic of the wearable device based on the current position of the portion of the wearable device. Examples of approaches and techniques for making modifications to operating characteristics are further shown and described in reference to FIGS. 8-10. As discussed previously, this determination at operation 408 can be based on comparing various optimal ranges of operating characteristics (e.g., stored in a data structure or model, such as table 102 in FIG. 1C) to determine which changes are necessary given that the portion has moved from a prior position and to a new current position.

In accordance with a determination that an operating characteristic should be modified based on the current position of the portion of the wearable device (e.g., that a comparison between optimal ranges (examples shown in FIG. 1C and described above) for the current position of the portion as compared to a prior position of the portion indicates that a modification or adjustment is necessary), operation 430 includes modifying a first operating characteristic for a display subsystem of the wearable device or a second operating characteristic for a communication subsystem of the wearable device. Examples of approaches and techniques for making modifications to operating characteristics are further shown and described in FIGS. 8-10.

In some embodiments, the modifications to the operating characteristic(s) are made to ensure that the wearable device is able to maintain cellular network (e.g., LTE) connectivity even as the wearable device shifts around to different positions. In some embodiments, modifying (432) the first operating characteristic for the display subsystem of the wearable device includes reducing an amount of power consumed by the display of the wearable device. In some embodiments, reducing an amount of power consumed by the display includes reducing a brightness level or turning off the display of the wearable device.

In some embodiments, modifying (434) the second operating characteristic for the communication subsystem of the wearable device includes adjusting operation of the communication subsystem to comply with applicable SAR requirements. In some embodiments, depending on the wearable device's position relative to the user's body, different SAR requirements can be applicable. For instance, in some jurisdictions (such as the United States), if a device is near a user's head, then a stricter SAR requirement can apply (such as 1.6 W/kg). However, if that same device is instead near a user's hands or fingers, then a more relaxed SAR requirement (such as 4 W/kg) can apply. By monitoring the position of the wearable device (and quickly registering changes in the device's position based on various sensor inputs), the techniques described herein can optimize performance of the wearable device as it shifts to different positions relative to different parts of the user's body.

In some embodiments, modifying (436) the second operating characteristic for the communication subsystem of the wearable device includes tuning an antenna of the communication subsystem to cause the antenna to operate using a different frequency (e.g., this can help to maintain a more reliable connection (such as a cellular, WiFi, Bluetooth, or other type of connection) as antenna characteristics can change as position of the portion of the wearable device shifts around).

In some embodiments, the communication subsystem can be a cellular communication subsystem (such as for connecting the wearable device to a cellular network, such as an LTE network), a personal area network communication subsystem (e.g., such as a Bluetooth low-energy (BLE) communication subsystem), or a local area network communication subsystem (e.g., such as WiFi communication subsystem).

In some embodiments, the modifying includes modifying (438) both the first operating characteristic for the display subsystem of the wearable device and the second operating characteristic for the communication subsystem of the wearable device.

In some embodiments, the wearable device is (444) configured to maintain a cellular connection when it is in each of the wrist-worn, finger-hold, free-space, head-worn, and body-worn positions.

Turning now to FIG. 4F, two examples of positional-state changes are illustrated as examples. In particular, a change between the wrist-worn position to a new current position is shown in conjunction with operation 440, and a change from the free-space position to a new current position is shown with operation 442. The changes from one position to another allow the device to make determinations as to appropriate adjustments necessary to the communication subsystem(s) and/or the display subsystem (e.g., by comparing the optimal range values that can be stored in conjunction with table 102, as was described above).

More specifically, at operation 440, the wrist-worn position is (440) selected as the current position and the modifying includes using a stored value for the second operating characteristic for the communication subsystem of the wearable device and the method further comprises: in response to detecting a change in the first sensor data or the second sensor data, selecting a new current position, other than the wrist-worn position, of the portion of the wearable device relative to the user's body from among the at least three predefined positions of the portion of the wearable device; and after selecting the new current position of the portion of the wearable device, modifying the second operating characteristic for the communication subsystem of the wearable device to use a different stored value for the second operating characteristic.

In some embodiments, the method 400 can also include storing, in a memory that is in communication with the wearable device, sets of values for the first operating characteristic and the second operating characteristic, each set of values being associated with one of the at least three predefined positions of the wearable device. An example of this is shown in FIG. 1C, in which optimal ranges of values for operating characteristics are shown as stored in table 102 and associated with each of the predefined positions. The stored optimal ranges can be defined such that one or more of the operations of a communications radio (e.g., cellular radio such as LTE or 5G radio; or a short-range communications radio such as WiFi or Bluetooth) of the wearable device can be maintained even as the wearable device is placed into any one of the at least three predefined positions, applicable SAR requirements are complied with as the devices moves to different positions, and battery utilization is appropriately managed as the device moves to different positions (e.g., display brightness is decreased or the display is turned off entirely when the device is in positions in which the display is not being utilized).

In the second example shown in FIG. 4F, the free-space position is (442) selected as the current position and the modifying includes using a stored value for the first operating characteristic for the display subsystem of the wearable device and the method further includes in response to detecting a change in the first sensor data or the second sensor data, selecting a new current position, other than the free-space position, of the portion of the wearable device relative to the user's body from among the at least three predefined positions of the portion of the wearable device; and after selecting the new current position of the portion of the wearable device, modifying the first operating characteristic for the display subsystem of the wearable device to use a different stored value for the first operating characteristic.

Referring to FIG. 5, there is a diagram showing the use of different sensors to determine a current position of a portion of a wearable device relative to a user's body, in accordance with some embodiments. A description of the operations shown in FIG. 5 was provided above in conjunction with the descriptions for FIG. 1A, so those descriptions, for the sake of brevity, are not repeated again here.

Figure 6A:
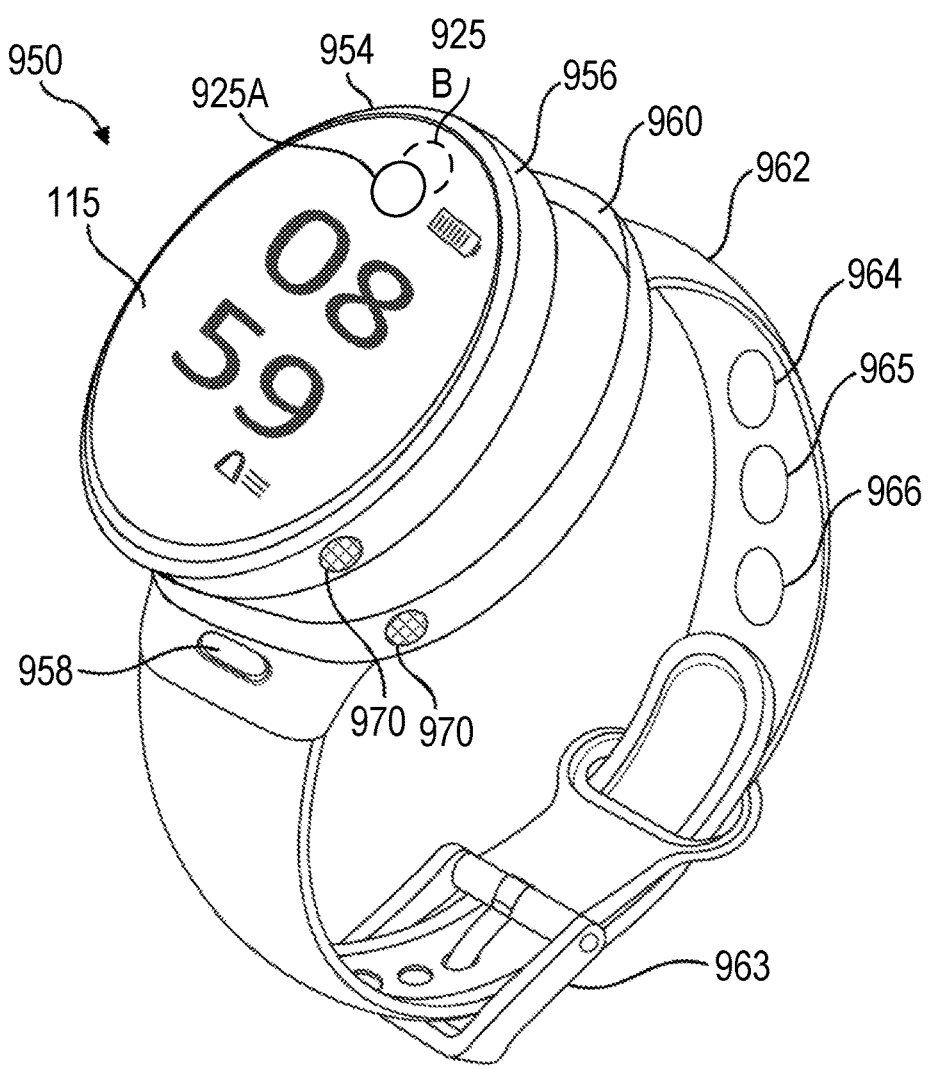
FIGS. 6A-6C illustrate an example wrist-wearable device, in accordance with some embodiments.
Figure 6B:
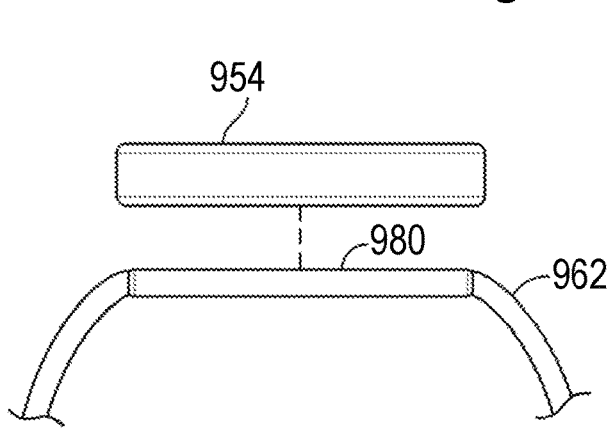
Figure 6C:
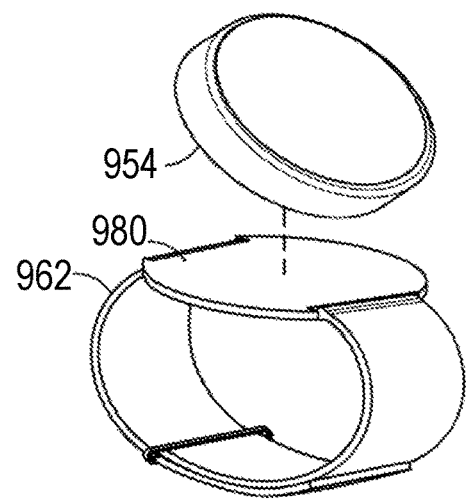

FIGS. 6A-6C illustrate an example wrist-wearable device 950, in accordance with some embodiments. The wearable device 100 shown and described in reference to FIGS. 1-21 can be an instance of the wearable device 950, including capsule portion 106 and band portion 108, such that capsule portion 106 and band portion 108 should be understood to have the features of the capsule portion 954 and band portion 962 of wearable device 950 and vice versa. FIG. 6A illustrates a perspective view of the wrist-wearable device 950 that includes a watch body 954 decoupled from a watch band 962. Watch body 954 and watch band 962 can have a substantially rectangular or circular shape and can be configured to allow a user to wear the wrist-wearable device 950 on a body part (e.g., a wrist). The wrist-wearable device 950 can include a retaining mechanism 963 (e.g., a buckle, a hook-and loop-fastener) for securing watch band 962 to the user's wrist. The wrist-wearable device 950 can also include a coupling mechanism 960 (e.g., a cradle) for detachably coupling watch body (or capsule) 954 (via a coupling surface 956 of the watch body 954) to watch band 962.

Functions executed by the wrist-wearable device 950 can include, without limitation, display of visual content to the user (e.g., visual content displayed on display screen 115), sensing user input (e.g., sensing a touch on button 958, sensing biometric data on sensor 964, sensing neuromuscular signals on neuromuscular sensor 965), messaging (e.g., text, speech, video), image capture, wireless communications (e.g., cellular, near field, WiFi, personal area network), location determination, financial transactions, providing haptic feedback, alarms, notifications, biometric authentication, health monitoring, sleep monitoring, etc. The wrist-wearable device 950 is configured to perform, without limitation, the functions described above in reference to FIGS. 1A-5 (as well as to make use of the techniques shown in and described with reference to FIGS. 8-10) such that the wrist-wearable device is able to make determinations about whether to make modifications to operating characteristics based on sensor data from at least two different sensors (as described above in reference to FIGS. 1A-5) and can then, if it is determined that modifications to operating characteristics are needed, proceed to modify the operating characteristics based on the approaches and techniques described with reference to FIG. 8 and/or FIGS. 9-10. These functions can be executed independently in watch body 954, independently in watch band 962, and/or in communication between watch body 954 and watch band 962. In some embodiments, functions can be executed on the wrist-wearable device 950 in conjunction with an artificial-reality environment that includes, but is not limited to, virtual-reality (VR) environments (including non-immersive, semi-immersive, and fully-immersive VR environments), augmented-reality environments (including marker-based augmented-reality environments, markerless augmented-reality environments, location-based augmented-reality environments, and projection-based augmented-reality environments), hybrid reality, and other types of mixed-reality environments. As the skilled artisan will appreciate upon reading the descriptions provided herein, the novel wearable devices described herein can be used with any of these types of artificial-reality environments.

The watch band 962 can be configured to be worn by a user such that an inner surface of the watch band 962 is in contact with the user's skin. When worn by a user, sensor 964 is in contact with the user's skin. The sensor 964 can be a biosensor that senses a user's heart rate, saturated oxygen level, temperature, sweat level, muscle intentions, or a combination thereof (any of these can be examples of the biometric sensor described above and used in conjunction with the positional-state determinations described herein, and can also be associated with the capsule portion instead of the band portion). The watch band 962 can include multiple sensors 964 that can be distributed on an inside and/or an outside surface of the watch band 962. Additionally, or alternatively, the watch body 954 can include the same or different sensors than the watch band 962 (or the watch band 962 can include no sensors at all in some embodiments). For example, multiple sensors can be distributed on an inside and/or an outside surface of watch body 954. The watch body 954 (e.g., a capsule portion) can include, without limitation, a magnetic field sensor 120 (as shown in FIG. 1A), antenna return loss sensor 124 (as shown in FIG. 1A), front-facing image sensor 925A and/or rear-facing image sensor 925B, a biometric sensor (e.g., biometric sensor 126, as shown in FIG. 1A), an IMU, a heart rate sensor, a saturated oxygen sensor, a neuromuscular sensor(s), an altimeter sensor, a temperature sensor, a bioimpedance sensor, a pedometer sensor, an optical sensor, a touch sensor (e.g., capacitive sensor 122 shown in FIG. 1A), a sweat sensor, etc. The sensor 964 can also include a sensor that provides data about a user's environment including a user's motion (e.g., an IMU), altitude, location, orientation, gait, or a combination thereof. The sensor 964 can also include a light sensor (e.g., an infrared light sensor, a visible light sensor) that is configured to track a position and/or motion of watch body 954 and/or watch band 962. Watch band 962 can transmit the data acquired by the sensor 964 to watch body 954 using a wired communication method (e.g., a UART, a USB transceiver) and/or a wireless communication method (e.g., near field communication, Bluetooth™). Watch band 962 can be configured to operate (e.g., to collect data using sensor 964) independent of whether watch body 954 is coupled to or decoupled from watch band 962.

The watch band 962 and/or watch body 954 can include a haptic device 966 (e.g., a vibratory haptic actuator) that is configured to provide haptic feedback (e.g., a cutaneous and/or kinesthetic sensation) to the user's skin. The sensor 964 and/or haptic device 966 can be configured to operate in conjunction with multiple applications including, without limitation, health monitoring, social media, game playing, and artificial reality (e.g., the applications associated with artificial reality).

In some examples, the watch band 962 can include a neuromuscular sensor 965 (e.g., an electromyography (EMG) sensor, a mechanomyogram (MMG) sensor, a sonomyography (SMG) sensor). Neuromuscular sensor 965 can sense a user's intention to perform certain motor actions (this sensor 965 can be another example of a sensor used as the biometric sensor in conjunction with the positional-state determinations described herein). The sensed muscle intention can be used to control certain user interfaces displayed on the display 115 of the device 102 and/or can be transmitted to device responsible for rendering an artificial-reality environment (e.g., a head-mounted display) to perform an action in an associated artificial-reality environment, such as to control the motion of a virtual device displayed to the user.

Signals from neuromuscular sensor 965 can be used to provide a user with an enhanced interaction with a physical object and/or a virtual object in an artificial-reality application generated by an artificial-reality system (e.g., user interface objects presented on the display 115, or another computing device (e.g., a head-mounted display)). Signals from neuromuscular sensor 965 can be obtained (e.g., sensed and recorded) by one or more neuromuscular sensors 965 of watch band 962. Although FIG. 6A shows one neuromuscular sensor 965, watch band 962 can include a plurality of neuromuscular sensors 965 arranged circumferentially on an inside surface of watch band 962 such that the plurality of neuromuscular sensors 965 contact the skin of the user. Watch band 962 can include a plurality of neuromuscular sensors 965 arranged circumferentially on an inside surface of watch band 962. Neuromuscular sensor 965 can sense and record neuromuscular signals from the user as the user performs muscular activations (e.g., movements, gestures). The muscular activations performed by the user can include static gestures, such as placing the user's hand palm down on a table; dynamic gestures, such as grasping a physical or virtual object; and covert gestures that are imperceptible to another person, such as slightly tensing a joint by co-contracting opposing muscles or using submuscular activations. The muscular activations performed by the user can include symbolic gestures (e.g., gestures mapped to other gestures, interactions, or commands, for example, based on a gesture vocabulary that specifies the mapping of gestures to commands).

The wrist-wearable device 950 can include a coupling mechanism (also referred to as a cradle) for detachably coupling watch body 954 to watch band 962. A user can detach watch body 954 from watch band 962 in order to reduce the encumbrance of the wrist-wearable device 950 to the user. The wrist-wearable device 950 can include a coupling surface 956 on the watch body 954 and/or coupling mechanism(s) 960 (e.g., a cradle, a tracker band, a support base, a clasp). A user can perform any type of motion to couple watch body 954 to watch band 962 and to decouple watch body 954 from watch band 962. For example, a user can twist, slide, turn, push, pull, or rotate watch body 954 relative to watch band 962, or a combination thereof, to attach watch body 954 to watch band 962 and to detach watch body 954 from watch band 962.

As shown in the example of FIG. 6A, watch band coupling mechanism 960 can include a type of frame or shell that allows watch body 954 coupling surface 956 to be retained within watch band coupling mechanism 960. Watch body 954 can be detachably coupled to watch band 962 through a friction fit, magnetic coupling, a rotation-based connector, a shear-pin coupler, a retention spring, one or more magnets, a clip, a pin shaft, a hook-and-loop fastener, or a combination thereof. In some examples, watch body 954 can be decoupled from watch band 962 by actuation of release mechanism 970. The release mechanism 970 can include, without limitation, a button, a knob, a plunger, a handle, a lever, a fastener, a clasp, a dial, a latch, or a combination thereof.

The wrist-wearable device 950 can include a single release mechanism 970 or multiple release mechanisms 970 (e.g., two release mechanisms 970 positioned on opposing sides of the wrist-wearable device 950 such as spring-loaded buttons). As shown in FIG. 6A, the release mechanism 970 can be positioned on watch body 954 and/or watch band coupling mechanism 960. Although FIG. 6A shows release mechanism 970 positioned at a corner of watch body 954 and at a corner of watch band coupling mechanism 960, the release mechanism 970 can be positioned anywhere on watch body 954 and/or watch band coupling mechanism 960 that is convenient for a user of wrist-wearable device 950 to actuate. A user of the wrist-wearable device 950 can actuate the release mechanism 970 by pushing, turning, lifting, depressing, shifting, or performing other actions on the release mechanism 970. Actuation of the release mechanism 970 can release (e.g., decouple) the watch body 954 from the watch band coupling mechanism 960 and the watch band 962 allowing the user to use the watch body 954 independently of watch band 962. For example, decoupling the watch body 954 from the watch band 962 can allow the user to capture images using rear-facing image sensor 925B.

FIG. 6B is a side view and FIG. 6C is a perspective view of another example of the wrist-wearable device 950. The wrist-wearable devices 950 of FIGS. 6B and 6C can include a watch body interface 980 (another example of a cradle for the capsule portion of the device 102). The watch body 954 can be detachably coupled to the watch body interface 980. Watch body 954 can be detachably coupled to watch body interface 980 through a friction fit, magnetic coupling, a rotation-based connector, a shear-pin coupler, a retention spring, one or more magnets, a clip, a pin shaft, a hook-and-loop fastener, or a combination thereof.

In some examples, watch body 954 can be decoupled from watch body interface 980 by actuation of a release mechanism. The release mechanism can include, without limitation, a button, a knob, a plunger, a handle, a lever, a fastener, a clasp, a dial, a latch, or a combination thereof. In some examples, the wristband system functions can be executed independently in watch body 954, independently in watch body interface 980, and/or in communication between watch body 954 and watch body interface 980. Watch body interface 980 can be configured to operate independently (e.g., execute functions independently) of watch body 954. Additionally, or alternatively, watch body 954 can be configured to operate independently (e.g., execute functions independently) of watch body interface 980. Watch body interface 980 and/or watch body 954 can each include the independent resources required to independently execute functions. For example, watch body interface 980 and/or watch body 954 can each include a power source (e.g., a battery), a memory, data storage, a processor (e.g., a CPU), communications, a light source, and/or input/output devices.

In this example, watch body interface 980 can include all of the electronic components of watch band 962. In additional examples, one or more electronic components can be housed in watch body interface 980 and one or more other electronic components can be housed in portions of watch band 962 away from watch body interface 980.

FIG. 7 is a block diagram of a wrist-wearable device system 1000, according to at least one embodiment of the present disclosure. The device 100 described in detail above is an example wrist-wearable device system 1000, so device 100 will be understood to include the components shown and described for system 1000 below. The wrist-wearable device system 1000 can have a split architecture (e.g., a split mechanical architecture, a split electrical architecture) between a watch body 1004 (e.g., a capsule 954/capsule 106) and a watch band 1012 (e.g., a band portion 962/band portion 108), which was described above in reference to FIGS. 6A-6C. Each of watch body 1004 and watch band 1012 can have a power source, a processor, a memory, sensors, a charging device, and a communications device that enables each of watch body 1004 and watch band 1012 to execute computing, controlling, communication, and sensing functions independently in watch body 1004, independently in watch band 1012, and/or in communication between watch body 1004 and watch band 1012.

For example, watch body 1004 can include capacitive sensor 122, magnetic field sensor 120, antenna return-loss (RL) sensor 124, biometric sensor 126, battery 1028, CPU 1026, storage 1002, heart rate sensor 1058, electromyography (EMG) sensor 1046, SpO$_2$ sensor 1054, altimeter 1048, IMU 1042, random-access memory (RAM) 1003, charger input 1030 and communication devices NFC 1015, LTE 1018, and WiFi/Bluetooth (BT) 1020. Similarly, watch band 1012 can include battery 1038, MCU unit 1052, memory 1050, heart rate sensor 1058, EMG sensor 1046, SpO$_2$ sensor 1054, altimeter 1048, IMU 1042, charger input 1034 and wireless transceiver 1040. Memory 1050 (and/or storage 1002) may further include device state table 102, an example of which is shown in FIG. 1C. In some examples, a level of functionality of at least one of watch band 1012 or watch body 1004 can be modified when watch body 1004 is detached from watch band 1012. The level of functionality that can be modified can include the functionality of at least one sensor (e.g., heart rate sensor 1058, EMG sensor 1046). Each of watch body 1004 and watch band 1012 can execute instructions stored in storage 1002 and memory 1050 respectively that enables at least one sensor (e.g., heart rate sensor 1058, EMG sensor 1046) in watch band 1012 to acquire data when watch band 1012 is detached from watch body 1004 and when watch band 1012 is attached to watch body 1004.

Watch body 1004 and watch band 1012 can further execute instructions stored in storage 1002 and memory 1050 respectively that enables watch band 1012 to transmit the acquired data to watch body 1004 (or other computing device such as a head-mounted display or other computing device) using wired communications 1027 and/or wireless transceiver 1040. For example, watch body 1004 can display visual content to a user on touchscreen display 1013 (e.g., an instance of display 105) and play audio content on speaker 105. Watch body 1004 can receive user inputs such as audio input from microphone 107 and touch input from buttons 1024. Watch body 1004 can also receive inputs associated with a user's location and/or surroundings. For example, watch body 1004 can receive location information from GPS 1016 and/or altimeter 1048 of watch band 1012.

Watch body 1004 can receive image data from at least one image sensor 135 (e.g., a camera). Image sensor 135 can include front-facing image sensor 925A (FIG. 9A) and/or rear-facing image sensor 925B (FIG. 6B). Front-facing image sensor 925A and/or rear-facing image sensor 925B can capture wide-angle images of the area surrounding front-facing image sensor 925A and/or rear-facing image sensor 925B such as hemispherical images (e.g., at least hemispherical, substantially spherical), 180-degree images, 360-degree area images, panoramic images, ultra-wide area images, or a combination thereof. In some examples, front-facing image sensor 925A and/or rear-facing image sensor 925B can be configured to capture images having a range between 45 degrees and 360 degrees. Certain input information received by watch body 1004 (e.g., user inputs) can be communicated to watch band 1012. Similarly, certain input information (e.g., acquired sensor data, neuromuscular sensor data) received by watch band 1012 can be communicated to watch body 1004.

Watch body 1004 and watch band 1012 can receive a charge using a variety of techniques. In some embodiments, watch body 1004 and watch band 1012 can use a wired charging assembly (e.g., power cords) to receive the charge. Alternatively, or in addition, watch body 1004 and/or watch band 1012 can be configured for wireless charging. For example, a portable charging device can be designed to mate with a portion of watch body 1004 and/or watch band 1012 and wirelessly deliver usable power to a battery of watch body 1004 and/or watch band 1012.

Watch body 1004 and watch band 1012 can have independent power and charging sources to enable each to operate independently. Watch body 1004 and watch band 1012 can also share power (e.g., one can charge the other) via power management (PM) IC 1032 in watch body 1004 and PM IC 1036 in watch band 1012. PM IC 1032 and PM IC 1036 can share power over power/ground conductors and/or over wireless charging antennas.

Wrist-wearable device system 1000 can operate in conjunction with a health-monitoring application that acquires biometric and activity information associated with the user. The health-monitoring application can be designed to provide information to a user that is related to the user's health. For example, wrist-wearable device system 1000 can monitor a user's physical activity by acquiring data from IMU 1042 while simultaneously monitoring the user's heart rate via heart rate sensor 1058 and saturated blood oxygen levels via SpO$_2$ sensor 1054. CPU 1026 can process the acquired data and display health-related information to the user on touchscreen display 1013.

Wrist-wearable device system 1000 can detect when watch body 1004 and watch band 1012 are connected to one another (e.g., mechanically connected and/or electrically or magnetically connected) or detached from one another. For example, power/ground connections 1060, wireless transceiver 1040, and/or wired communications 1027, can detect whether watch body 1004 and watch band 1012 are mechanically and/or electrically or magnetically connected to one another (e.g., detecting a disconnect between the one or more electrical contacts of power/ground connections 1060 and/or wired communications 1027). In some examples, when watch body 1004 and watch band 1012 are mechanically and/or electrically disconnected from one another (e.g., watch body 1012 has been detached from watch band 1012 as described with reference to FIGS. 6A-6C), watch body 1004 and/or watch band 1012 can operate with a modified level of functionality (e.g., reduced functionality) as compared to when watch body 1004 and watch band 1012 are mechanically and/or electrically connected to one another. The modified level of functionality (e.g., switching from full functionality to reduced functionality and from reduced functionality to full functionality) can occur automatically (e.g., without user intervention) when wrist-wearable device system 1000 determines that watch body 1004 and watch band 1012 are mechanically and/or electrically disconnected from one another and connected to each other, respectively.

Modifying the level of functionality (e.g., reducing the functionality in watch body 1004 and/or watch band 1012) can reduce power consumption in battery 1028 and/or battery 1038. For example, any of the sensors (e.g., heart rate sensor 1058, EMG sensor 1046, SpO$_2$ sensor 1054, altimeter 1048), processors (e.g., CPU 1026, microcontroller unit 1052), communications elements (e.g., NFC 1015, GPS 1016, LTE 1018, WiFi/BT 1020), or actuators (e.g., haptics 1022, 1049) can reduce functionality and/or power consumption (e.g., enter a sleep mode) when watch body 1004 and watch band 1012 are mechanically and/or electrically disconnected from one another. Watch body 1004 and watch band 1012 can return to full functionality when watch body 1004 and watch band 1012 are mechanically and/or electrically connected to one another. The level of functionality of each of the sensors, processors, actuators, and memory can be independently controlled.

As described above, wrist-wearable device system 1000 can detect when watch body 1004 and watch band 1012 are coupled to one another (e.g., mechanically connected and/or electrically connected) or decoupled from one another. In some examples, watch body 1004 can modify a level of functionality (e.g., activate and/or deactivate certain functions) based on whether watch body 1004 is coupled to watch band 1012. For example, CPU 1026 can execute instructions that detect when watch body 1004 and watch band 1012 are coupled to one another and activate front-facing image sensor 925A. CPU 1026 can activate front-facing image sensor 925A based on receiving user input (e.g., a user touch input from touchscreen display 1013, a user voice command from microphone 107, a user gesture recognition input from EMG sensor 1046).

When CPU 1026 detects that watch body 1004 and watch band 1012 are decoupled from one another, CPU 1026 can modify a level of functionality (e.g., activate and/or deactivate additional functions). For example, CPU 1026 can detect when watch body 1004 and watch band 1012 are decoupled from one another and activate rear-facing image sensor 925B. CPU 1026 can activate rear-facing image sensor 925B automatically (e.g., without user input) and/or based on receiving user input (e.g., a touch input, a voice input, an intention detection). Automatically activating rear-facing image sensor 925B can allow a user to take wide-angle images without having to provide user input to activate rear-facing image sensor 925B.

In some examples, rear-facing image can be activated based on an image-capture criterion (e.g., an image quality, an image resolution, etc.). For example, rear-facing image sensor 925B can receive an image (e.g., a test image). CPU 1026 and/or rear-facing image sensor 925B can analyze the received test image data and determine whether the test image data satisfies the image-capture criterion (e.g., the image quality exceeds a threshold, the image resolution exceeds a threshold, etc.). Rear-facing image sensor 925B can be activated when the test image data satisfies the image-capture criterion. Additionally, or alternatively, rear-facing image sensor 925B can be deactivated when the test image data fails to satisfy the image capture criterion.

In some examples, CPU 1026 can detect when watch body 1004 is coupled to watch band 1012 and deactivate rear-facing image sensor 925B. CPU 1026 can deactivate rear-facing image sensor 925B automatically (e.g., without user input) and/or based on receiving user input (e.g., a touch input, a voice input, an intention detection, etc.). Deactivating rear-facing image sensor 925B can automatically (e.g., without user input) reduce the power consumption of watch body 1004 and increase the battery charge time in watch body 1004. In some examples, wrist-wearable device system 1000 can include a coupling sensor 1007 that senses whether watch body 1004 is coupled to or decoupled from watch band 1012. Coupling sensor 1007 can be included in any of watch body 1004, watch band 1012, or watch band coupling mechanism 960 of FIGS. 6A-6C. Coupling sensor 1007 (e.g., a proximity sensor) can include, without limitation, an inductive proximity sensor, a limit switch, an optical proximity sensor, a capacitive proximity sensor, a magnetic proximity sensor, an ultrasonic proximity sensor, or a combination thereof. CPU 1026 can detect when watch body 1004 is coupled to watch band 1012 or decoupled from watch band 1012 by reading the status of coupling sensor 1007.

Examples of Adjusting Operating Characteristics

As noted above, some embodiments adjust operational characteristics to maintain reliable subsystem performance as a portion of a wearable device is moved around to different positions relative to a user's body. As illustrative, non-limiting examples, the descriptions below provide techniques related to certain adjustments that can be made to operational characteristics associated with a communication subsystem (e.g., when the wearable device is determined to move from one position relative to the user's body to a different position relative to the user's body, then the adjustment to the operational characteristics can be made, in non-limiting examples, using the techniques described below in reference to FIGS. 8-10).

FIG. 8 is a flowchart showing a process 8-500 of a device establishing a communication link according to a time-averaged SAR and Quality of Service (QoS), according to an example implementation of the present disclosure. In some embodiments, the process 8-500 is performed by the wearable device 100 or the wearable device 950. In some embodiments, the process 8-500 is performed by other entities. In some embodiments, the process 8-500 includes more, fewer, or different steps than shown in FIG. 5.

In one approach, the wearable device receives 8-510 sensor measurements indicating proximity of a user relative to the wearable device or its antennas. The wearable device may include sensors (e.g., sensors referred to in FIG. 1A) that can detect a proximity of the user with respect to the wearable device. For example, the sensors may detect whether the user is wearing/holding the wearable device. For example, the sensors may detect whether the computing device is attached to the cradle portion 107. The sensors may generate the sensor measurements indicating the detected proximity (e.g., distance or amount of contact) of the user. Details concerning using sensor data for detecting positions of the wearable device were provided above in reference to FIGS. 1-5.

In one approach, the wearable device determines 8-520 a QoS indicating a target performance of a wireless communication link. For example, QoS may specify throughput, transit delay, priority, or protection, etc. QoS may be determined based on a type of content (e.g., voice-over IP, artificial reality (e.g., augmented reality, virtual reality, mixed reality)) to be transmitted or a process to be performed (e.g., hand over, cell search, etc.). QoS may also be determined based on a frequency band or a protocol for transmission, or other network condition (e.g., traffic or congestion).

In one approach, the wearable device determines 8-530 radio resource information. Radio resource information may indicate power headroom for different frequency bands of the wireless link, remaining power level of a power source of the wearable device, etc. For example, the wireless device may determine, from available radio resources, one or more frequency bands and output power levels to support the QoS and can determine a time-averaged SAR according to transmission at the determined output power levels for the determined one or more frequency bands. In one example, output power levels and/or frequency bands may be time varying, and the wearable device may store or accumulate a history of output power levels of different frequency bands and/or different wireless communication interfaces.

In one approach, the wearable device predicts 8-540 an amount of radiation exposure of the user. The wearable device may predict/project/estimate the amount of radiation exposure, according to the detected proximity of the user, QoS, and/or radio resource information. For example, the wearable device determines or predicts the amount of radiation exposure, according to the detected proximity of the user. The predicted amount of radiation exposure may be inversely proportional to the detected proximity of the user. The wearable device may determine one or more frequency bands and output power levels to support the QoS (e.g., of each communication link), and can predict an amount of radiation exposure due to transmission at the determined frequency bands and output power levels for a time period.

In one approach, the wearable device compares 8-550 the predicted amount of radiation exposure against a time-averaged threshold amount of radiation exposure. In one approach, the wearable device allocates 8-560 radio resources according to the comparison. For example, if the wireless device determines that time-averaged SAR for a first time period (e.g., 59 seconds) within a time period (e.g., 60 seconds) is less than the time-averaged threshold amount of radiation exposure, the wireless device may allow transmission at a high power level (e.g., over 5 dBm) for a second time period (e.g., 1 s) within the time period (e.g., 60 seconds) in a manner that the time-averaged SAR for the time period (e.g., 60 seconds) is less than the time-averaged threshold amount of radiation exposure, so as to support a desired QoS. For example, if the wireless device determines that time-averaged SAR for the time period (e.g., 60 seconds) may exceed the time-averaged threshold amount of radiation exposure, the wireless device may increase a portion of radio resources of a first wireless communication interface (e.g., cellular network such as 3G, 4G, 5G, etc.) to support QoS of the first wireless communication interface, while decreasing a portion of radio resources of a second wireless communication interface (e.g., Bluetooth). Accordingly, the time-averaged SAR for the time period (e.g., 60 seconds) according to allocation of radio resources can be less than the time-averaged threshold amount of radiation exposure. In some embodiments or circumstances, the approaches described above for modifying operational characteristics are used in response to a determination (made using the techniques of FIGS. 1-5) that a portion of the wearable device has moved from one position relative to the user's body to a different position relative to the user's body.

Additional examples for adjusting operational characteristics to account for different positions of a portion of a wearable relative to a user's body are provided below in reference to FIGS. 9 and 10 (e.g., other examples of making adjustments to radio usage by way of managing and adjusting components impacting QoS and SAR values).

Referring to FIG. 9, depicted is a block diagram of one example embodiment of a system 9-700 for adjusting, modifying, and/or updating radio usage of one or more wireless links based on a time-averaged SAR near a user, according to an example implementation. The system 9-700 may include a scheduler, one or more sensors, a SAR/PD engine, and/or a SAR/PD controller (not shown in FIG. 9, but these components can be optionally included as components of the wearable device 100 described with reference to FIGS. 1-5 and the sensors can be the various types of sensors discussed above in reference to FIGS. 1-5). In some embodiments, the scheduler may receive, obtain, and/or acquire a quality (e.g., a channel/link quality) of at least one wireless link, such as a first wireless link and/or a second wireless link. The scheduler can receive information of a traffic buffer, such as a configuration of a traffic buffer of at least one wireless link. According to the received quality of at least one wireless link, the scheduler may determine a maximum throughput (and/or other radio usage) for each wireless link. As such, the scheduler may determine and/or generate a proposed/preferred radio usage of each wireless link over a time period. The scheduler may schedule and/or prioritize one or more transmissions according to the proposed radio usage(s) (e.g., according to a QoS) and/or other information. For instance, the scheduler may use a determined power margin (e.g., minimum power to meet specified performance, such as QoS) for each wireless link (e.g., power margin(s) determined by an SAR/PD engine) to allocate one or more transmissions.

In some embodiments, the SAR/PD engine may receive and/or obtain sensor information from one or more sensors (e.g., sensors shown and described for FIG. 1A) of a device (e.g., wearable device 100). The SAR/PD engine may receive information from the scheduler, such as the proposed radio usage determined by the scheduler and/or an amount of traffic of one or more wireless links (e.g., a first wireless link and/or a second wireless link). In certain embodiments, the SAR/PD engine may allocate one or more SAR resources, according to the information provided by the scheduler. In a scenario with concurrent radios, the SAR/PD engine may select and/or determine a proposed subset of antennas to use. The SAR/PD engine may determine and/or identify a state of a device according to the sensor information (e.g., a position of a portion of a wearable device relative to a user's body, based on the techniques described above in reference to FIGS. 1-5) and/or the proposed radio usage. The SAR/PD engine may provide, specify, and/or indicate the state of the device to the SAR/PD controller. In some embodiments, the SAR/PD engine may store and/or maintain an antenna index and/or an associated wireless link (e.g., in a scenario with concurrent radios). The SAR/PD engine may update a table with a preferred/proposed antenna grouping per QoS of a wireless link. In some embodiments, the SAR/PD engine may use beam identification (ID), horizontal/vertical (HN) polarization and/or module switching to update the table. The SAR/PD engine can maintain an aggregated exposure table for each wireless link associated with a particular antenna, beam, polarization, module, and/or or beam.

In some embodiments, the SAR/PD controller may determine, compute, and/or configure a defined time window for performing and/or determining a time-averaged SAR of a user. The SAR/PD controller may determine an amount of RF energy emitted by the device (e.g., RF exposure to a user) within the defined time window. Therefore, the SAR/PD controller may determine a time-averaged SAR according to the defined time window and/or other information. In some embodiments, the SAR/PD controller 236 may apply a policy (e.g., limit transmission power and/or change an antenna/module) to satisfy a threshold level of the time-averaged SAR (or other SAR parameters, such as an accumulated SAR). For example, the SAR/PD controller may use a look-up table to adjust and/or modify a radio usage of one or more wireless links (e.g., to control an amount of RF radiation), such as a first wireless link (e.g., intralink radios) and/or a second wireless link (e.g., interlink radios). In one example, the SAR/PD controller may select, change, and/or modify one or more Tx antennas, modules, and/or beams to modify a radio usage of one or more wireless links (e.g., interlink radios and/or intralink radios). In certain scenarios, the first device may be configured to have and/or maintain a first wireless link (e.g., intralink) with a second device (e.g., wireless device), for example, as well as a second wireless link with an access point of a network (e.g., interlink), for example, concurrently for at least a portion of time.

Figure 10:
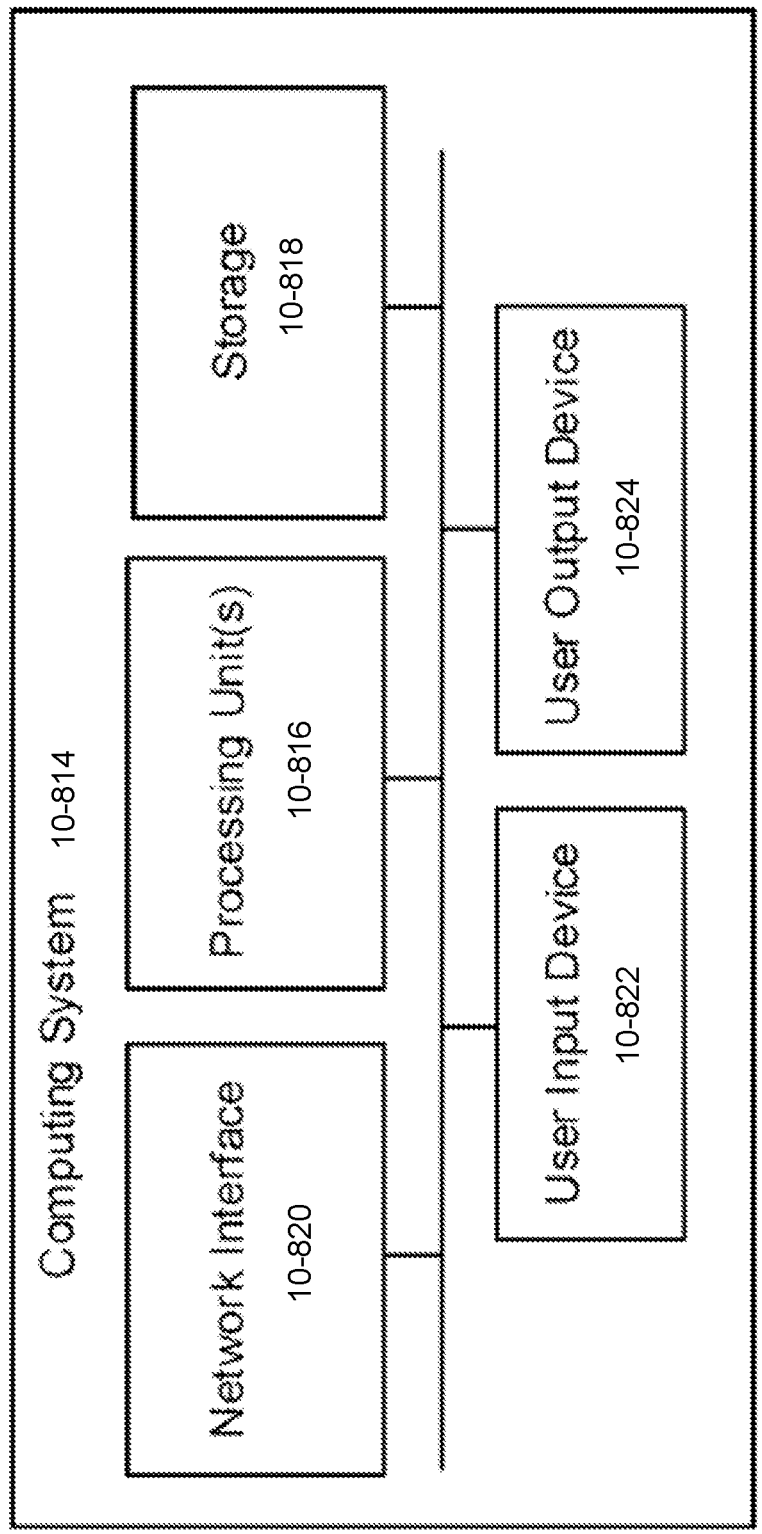

FIG. 10 is a flow diagram of one embodiment of a process 9-700 for adapting, adjusting, modifying, and/or updating a radio usage of one or more wireless links based on a time-averaged SAR of a user due to a device (e.g., due to the position of a portion of the device, as described above in reference to FIGS. 1-5 above, relative to the user's body), according to one example. The functionalities of the process 700 may be implemented using or performed by aspects of wearable device 100 described above (also referred to as a "first device" below in the description for FIG. 10). In some embodiments, the process 700 may include more, fewer, or different steps than shown in FIG. 10.

In brief overview, a first device may determine a proposed radio usage of a first wireless link and/or a second wireless link (9-702). The first device may acquire sensor information (9-704). The first device may determine a state/condition/configuration of the first device (9-706), e.g., which can reflect a position of a portion of the first device relative to a user's body in accordance with the techniques described with reference to FIGS. 1-5. The first device may determine a time-averaged SAR to adjust the proposed radio usage (9-708).

Referring now to operation (9-702), and in some embodiments, a first device (e.g., a first UE, a wearable device, and/or other wireless devices) may determine, calculate, and/or establish a proposed radio usage of at least one wireless link, such as a first wireless link (e.g., intralink and/or other communication links) and/or a second wireless link (e.g., interlink and/or other communication links). For instance, a scheduler (e.g., a radio scheduler) of the first device may determine the proposed radio usage according to (or based on) a quality and/or QoS of the link(s). In some embodiments, the first device may determine the proposed radio usage according to (or by using) a quality of at least one wireless link (e.g., a channel quality and/or other channel properties, such as channel bandwidth or signal-to-noise ratio) and/or a QoS (e.g., a bit rate and/or a packet loss rate) of at least one wireless link. For instance, a scheduler of the first device may determine and/or allocate a proposed usage of one or more radio links (e.g., a maximum throughput per wireless link) according to a QoS (e.g., reliability, as measured by an amount of dropped packets) and/or channel quality of the link(s). In some embodiments, the first device may determine the proposed radio usage according to a configuration of a traffic buffer of at least one wireless link and/or a power headroom corresponding to at least one wireless link. The power headroom may indicate and/or specify an amount/margin of transmission power left/available for a first device to use in addition to the power being used by a current transmission. In one example, a scheduler of the first device may determine and/or allocate a proposed radio usage (e.g., a predicted radio usage over time) of one or more wireless links according to a size and/or memory of a traffic buffer (and/or other traffic buffer configurations) of the one or more wireless links.

In some embodiments, a proposed radio usage may comprise at least one of a data rate (e.g., data blocks per unit time passing through a wireless link), an RF emission level (e.g., SAR in W/kg), and/or a transmission power (e.g., energy used by the first device to transmit information) of the first device for at least the first wireless link and/or the second wireless link. In certain embodiments, a proposed radio usage may comprise at least one of a transmission schedule (e.g., transmission time and/or power level for transmitting one or more packets in a given amount of time), a ranking or selection of radio devices (e.g., a preferred usage of the radio devices), and/or use of one or more antennas of the first device (e.g., antenna/module/beam selection for intralink and/or interlink radios) for at least the first wireless link and/or the second wireless link. In some embodiments, the first device may be configured to concurrently/simultaneously maintain and/or establish at least two wireless links (e.g., the first wireless link and/or the second wireless link), e.g., for a period of time or intermittently. The first wireless link may include or correspond to a wireless link with a second device (e.g., intralink between a UE and an HWD). The second wireless link may include or correspond to a wireless link with an access point of a network and/or other network devices (e.g., interlink between a first device and the access point). In some embodiments, at least one sensor of the first device (e.g., proximity sensors and/or motion sensors) may acquire and/or obtain sensor information (9-704). The sensor information may include at least one of a proximity of the first device to the user (e.g., the proximity of the first device to the head of the user), whether there is contact between the first device and the user (e.g., the first device is touching the user), and/or a motion of the first device (additional details for determination positions of a portion of the first device relative to a user's body were provided above in reference to FIGS. 1-5.

Referring now to operation (9-706), and in some embodiments, the first device may determine and/or identify a state (e.g., DSI and/or other indicators) of the first device. For instance, the SAR/PD engine of the first device may use the proposed radio usage (e.g., determined by the scheduler) and/or sensor information (e.g., from at least one sensor of the first device) to determine the state of the first device. In some embodiments, the first device (e.g., SAR/PD engine) may determine the state of the first device further according to at least one of traffic (e.g., wireless/network traffic) information of the first wireless link, and/or traffic information of the second wireless link. For example, the first device may determine the state of the first device according to an amount of traffic and/or a type of traffic (e.g., control traffic, data traffic, and/or other types of traffic) in at least one wireless link. In some embodiments, the first device (e.g., SAR/PD engine) may determine the state of the first device according to a proposed subset of antennas to use. For instance, the first device may determine and/or identify the proposed subset of antennas according to sensor information (e.g., information from proximity/motion sensors) and/or the proposed radio usage. In one example, the sensor information from at least one proximity sensor (or other sensors) may indicate/specify that a user is in close proximity (e.g., in contact with, or within a defined distance) to a first antenna and a second antenna of the first device (e.g., the first and second antennas are blocked/obstructed by the user). Therefore, the first device may determine to use a third antenna and/or a fourth antenna (e.g., proposed subset of antennas) for transmissions, according to the sensor information. Responsive to determining the proposed subset of antennas to use (e.g., third antenna and/or a fourth antenna, according to sensor information), the first device may determine that an entity is blocking an antenna of the device (e.g., the state of the first device).

Referring now to operation (9-708), and in some embodiments, the first device may determine, calculate, and/or compute a time-averaged SAR of a user due to the first device. For instance, a user may be exposed to RF energy emitted/generated by the first device over/during a defined time window (e.g., 100 seconds and/or other time instances). As such, the first device may determine the time-averaged SAR of the user, due to the RF energy emitted by the first device over the defined time window (e.g., an averaged SAR over the defined time window). Responsive to determining the time-averaged SAR of the user, the first device may adjust and/or modify the proposed radio usage (e.g., determined by the scheduler) of at least one wireless link (e.g., to comply with RF emission standards/regulations). As such, the first device (e.g., SAR/PD control entity) may determine the time-averaged SAR to adjust the proposed radio usage of the first wireless link and/or the second wireless link to satisfy/meet/comply with a threshold level of the time-averaged SAR. For example, the first device may adjust the proposed radio usage of at least one wireless link to maintain the determined time-averaged SAR below the threshold level (e.g., and/or maintain the determined time-averaged SAR at a certain percentage of the threshold level) of the time-averaged SAR (e.g., to limit RF emissions/exposure). In some embodiments, the first device may determine the time-averaged SAR according to (or based on) a defined time window (e.g., predetermined by a wireless system and/or wireless specifications) and/or the determined state of the first device (e.g., determined by the SAR/PD engine). For instance, the SAR/PD engine may determine that a first device is in close proximity to a user of the first device over a defined time window (e.g., 60 seconds). Given the determined state of the first device (e.g., in close proximity to a user) and/or the defined time window (e.g., 60 seconds), the SAR/PD control entity may determine that the time-averaged SAR does not satisfy (e.g., exceeds) the threshold level of the time-averaged SAR. As such, the SAR/PD control entity of the first device may adjust and/or modify the proposed radio usage to satisfy the threshold level of the time-averaged SAR.

In some embodiments, the first device may operate, control and/or manage at least one radio device of the first device for the first wireless link according to the adjusted radio usage. For instance, a first UE (e.g., first device) may operate a first radio interface/device (e.g., at least one radio device) for an intralink (and/or communication links) according to an adjusted radio usage (e.g., to satisfy a threshold level of a time-averaged SAR). Furthermore, the first device may operate at least one radio device of the first device for the second wireless link (e.g., according to the adjusted radio usage), concurrent with the operating of the at least one radio device for the first wireless link. For example, concurrent with operating the first radio interface/device for the intralink, the first UE may operate or communicate with a second device for an interlink based on the modified radio usage of the interlink. As such, responsive to operating at least one radio device of the first device according to the adjusted radio usage (e.g., for the intralink and/or the interlink), the first device (and/or a system that includes the first device) may comply with and/or satisfy a threshold level (and/or other levels/specifications) of the time-averaged SAR of the user.

Various operations described herein can be implemented on computer systems. FIG. 10 shows a block diagram of a representative computing system 10-814 usable to implement the present disclosure. In some embodiments, the wearable device 100 are implemented by the computing system 10-814. Computing system 10-814 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 10-814 can be implemented to provide VR, AR, MR experience. In some embodiments, the computing system 10-814 can include conventional computer components such as processors 10-816, storage device 10-818, network interface 10-820, user input device 10-822, and user output device 10-824.

Network interface 10-820 can provide a connection to a wide area network (e.g., the Internet) to which WAN interface of a remote server system is also connected. Network interface 10-820 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 10-822 can include any device (or devices) via which a user can provide signals to computing system 10-814; computing system 10-814 can interpret the signals as indicative of particular user requests or information. User input device 10-822 can include any or all of a keyboard, touch pad, touchscreen, mouse or other pointing device, scroll wheel, click wheel, dial, button, switch, keypad, microphone, sensors (e.g., a motion sensor, an eye tracking sensor, etc.), and so on.

User output device 10-824 can include any device via which computing system 10-814 can provide information to a user. For example, user output device 10-824 can display images generated by or delivered to computing system 10-814 using a display. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that functions as both an input and output device can be used. Output device 10-824 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operations indicated in the program instructions. Examples of program instructions or computer code include machine code, such as is produced by a compiler, and files including higher-level codes that are executed by a computer, an electronic component, or a microprocessor using an interpreter. Through suitable programming, processor 10-816 can provide various functionalities for computing system 10-814, including any of the functionalities described herein as being performed by a server or client, or other functionality associated with message management services.

It will be appreciated that computing system 10-814 is illustrative and that variations and modifications are possible. Computer systems used in connection with the present disclosure can have other capabilities not specifically described here. Further, while computing system 814 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

In some embodiments or circumstances, the adjustments to aspects of radio usage (e.g., SAR and QoS) described above with reference to FIGS. 9-10 to modify operational characteristics are employed in response to a determination (made using the techniques of FIGS. 1-5) that a portion of the wearable device has moved from one position relative to the user's body to a different position relative to the user's body.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of optimizing performance for a wearable device, the method comprising:
    selecting, based on (i) first sensor data from a first sensor of a wearable device donned by a user and (ii) second sensor data from a second sensor of the wearable device, a current position of a portion of the wearable device relative to the user's body from among at least three predefined positions of the portion of the wearable device, wherein the at least three predefined positions of the portion of the wearable device include:
        a wrist-worn position in which the portion of the wearable device is worn on a wrist of the user;
        a finger-hold position in which the portion of the wearable device is held by the user after being removed from a band portion of the wearable device; and
        a free-space position in which the portion of the wearable device is not in contact with the user's body; and
    after selecting the current position of the portion of the wearable device based on the first sensor data and the second sensor data, determining whether to modify an operating characteristic of the wearable device based on the current position of the portion of the wearable device; and
    in accordance with a determination that an operating characteristic should be modified based on the current position of the portion of the wearable device, modifying a first operating characteristic for a display subsystem of the wearable device or a second operating characteristic for a communication subsystem of the wearable device.

2. The method of claim 1, wherein modifying the first operating characteristic for the display subsystem of the wearable device includes reducing an amount of power consumed by the display subsystem of the wearable device.

3. The method of claim 1, wherein modifying the second operating characteristic for the communication subsystem of the wearable device includes adjusting operation of the communication subsystem to comply with applicable specific absorption rate requirements.

4. The method of claim 1, wherein modifying the second operating characteristic for the communication subsystem of the wearable device includes tuning an antenna of the communication subsystem to cause the antenna to operate using a different frequency.

5. The method of claim 1, wherein, after selecting the current position of the wearable device based on the first sensor data and the second sensor data, the modifying includes modifying both the first operating characteristic for the display subsystem of the wearable device and the second operating characteristic for the communication subsystem of the wearable device.

6. The method of claim 1, wherein the wrist-worn position is selected as the current position and the modifying includes using a stored value for the second operating characteristic for the communication subsystem of the wearable device and the method further comprises:
    in response to detecting a change in the first sensor data or the second sensor data, selecting a new current position, other than the wrist-worn position, of the portion of the wearable device relative to the user's body from among the at least three predefined positions of the portion of the wearable device; and
    after selecting the new current position of the portion of the wearable device, modifying the second operating characteristic for the communication subsystem of the wearable device to use a different stored value for the second operating characteristic.

7. The method of claim 1, wherein the free-space position is selected as the current position and the modifying includes using a stored value for the first operating characteristic for the display subsystem of the wearable device and the method further comprises:
    in response to detecting a change in the first sensor data or the second sensor data, selecting a new current position, other than the free-space position, of the portion of the wearable device relative to the user's body from among the at least three predefined positions of the portion of the wearable device; and
    after selecting the new current position of the portion of the wearable device, modifying the first operating characteristic for the display subsystem of the wearable device to use a different stored value for the first operating characteristic.

8. The method of claim 1, wherein:
the first sensor data is a magnitude of a magnetic field at the portion of the wearable device; and
the second sensor data is one of (i) a capacitance value at the portion of the wearable device, (ii) biometric data for the user, or (iii) an antenna return loss value for an antenna of the wearable device.

9. The method of claim 8, wherein:
the second sensor data is the biometric data for the user, and
the wrist-worn position is selected as the current position based on:
  the magnitude of the magnetic field at the portion of the wearable device indicating that the portion remains coupled with a band portion of the wearable device, and
  the biometric data for the user being above a non-zero threshold biometric value.

10. The method of claim 9, wherein:
the portion of the wearable device is a capsule portion of the wearable device that includes a display and the first and second sensors,
the selecting of the current position of the wearable device relative to the user's body from among the at least three predefined positions of the wearable device is further based on third sensor data from a third sensor of the wearable device, the third sensor data being a capacitance value at the capsule portion of the wearable device, and
the free-space position is selected as the current position based on:
  the magnitude of the magnetic field at the capsule portion of the wearable device indicating that the capsule portion remains coupled with the band portion of the wearable device,
  the biometric data for the user being below the non-zero threshold biometric value, and
  the capacitance value being below a threshold capacitance value.

11. The method of claim 10, wherein the selecting of the current position of the wearable device relative to the user's body from among the at least three predefined positions of the portion of the wearable device is further based on fourth sensor data from a fourth sensor of the wearable device, the fourth sensor data being configured to sense an antenna return loss value for an antenna of the wearable device;
the finger-hold position is selected as the current position based on:
  the magnitude of the magnetic field at the capsule portion of the wearable device indicating that the capsule portion has been removed from the band portion of the wearable device,
  the biometric data for the user being below a non-zero threshold biometric value, and
  the antenna return loss value indicating that the user is holding the capsule portion of the wearable device with at least two fingers.

12. The method of claim 11, wherein the at least three predefined positions of the portion of the wearable device further include:
a head-mounted position in which the capsule portion of the wearable device is coupled with another electronic device worn on the user's head.

13. The method of claim 12, wherein the at least three predefined positions of the portion of the wearable device further include:
a body-worn position in which the capsule portion of the wearable device is worn on the user's body at a location other than the user's head or the user's wrist.

14. The method of claim 13, wherein:
the free-space position is selected as the current position based on:
  the magnitude of the magnetic field at the capsule portion of the wearable device indicating that the capsule portion has been removed from the band portion of the wearable device,
  the biometric data for the user being below a non-zero threshold biometric value, and
  the capacitance value being below a first threshold capacitance value that is less than a second threshold capacitance value associated with the head-mounted position, and the first and second threshold capacitance values are both less than a third threshold capacitance value associated with the body-worn position.

15. The method of claim 14, wherein:
the head-mounted position is selected as the current position based on:
  the magnitude of the magnetic field at the capsule portion of the wearable device indicating that the capsule portion has been removed from the band portion of the wearable device,
  the biometric data for the user being below a non-zero threshold biometric value, and
  the capacitance value being between greater than the first threshold capacitance value and less than or equal to the second threshold capacitance value associated with the head-mounted position.

16. The method of claim 15, wherein:
the body-worn position is selected as the current position based on:
  the magnitude of the magnetic field at the capsule portion of the wearable device indicating that the capsule portion has been removed from the band portion of the wearable device,
  the biometric data for the user being below a non-zero threshold biometric value, and
  the capacitance value being greater than the second threshold capacitance value associated with the head-mounted position and less than or equal to the third threshold capacitance value associated with the body-worn position.

17. The method of claim 16, wherein the wearable device is configured to maintain a reliable cellular connection when it is in each of the wrist-worn, finger-hold, free-space, head-worn, and body-worn positions.

18. A wearable device for optimizing subsystem performance, the wearable device configured to:
select, based on (i) first sensor data from a first sensor of a wearable device donned by a user and (ii) second sensor data from a second sensor of the wearable device, a current position of a portion of the wearable device relative to the user's body from among at least three predefined positions of the portion of the wearable device, wherein the at least three predefined positions of the portion of the wearable device include: and
a wrist-worn position in which the portion of the wearable device is worn on a wrist of the user;

a finger-hold position in which the portion of the wearable device is held by the user after being removed from a band portion of the wearable device; and a free-space position in which the portion of the wearable device is not in contact with the user's body; and after selecting the current position of the portion of the wearable device based on the first sensor data and the second sensor data, determine whether to modify an operating characteristic of the wearable device based on the current position of the portion of the wearable device; and in accordance with a determination that an operating characteristic should be modified based on the current position of the portion of the wearable device, modify a first operating characteristic for a display subsystem of the wearable device or a second operating characteristic for a communication subsystem of the wearable device.

19. A non-transitory, computer-readable storage medium including instructions that, when executed by one or more processors of a wearable device, cause the wearable device to:

select, based on (i) first sensor data from a first sensor of a wearable device donned by a user and (ii) second sensor data from a second sensor of the wearable device, a current position of a portion of the wearable device relative to the user's body from among at least three predefined positions of the portion of the wearable device, wherein the at least three predefined positions of the portion of the wearable device include:

a wrist-worn position in which the portion of the wearable device is worn on a wrist of the user;

a finger-hold position in which the portion of the wearable device is held by the user after being removed from a band portion of the wearable device; and a free-space position in which the portion of the wearable device is not in contact with the user's body; and after selecting the current position of the portion of the wearable device based on the first sensor data and the second sensor data, determine whether to modify an operating characteristic of the wearable device based on the current position of the portion of the wearable device; and in accordance with a determination that an operating characteristic should be modified based on the current position of the portion of the wearable device, modify a first operating characteristic for a display subsystem of the wearable device or a second operating characteristic for a communication subsystem of the wearable device.

20. The wearable device of claim 18, wherein modifying the first operating characteristic for the display subsystem of the wearable device includes reducing an amount of power consumed by the display subsystem of the wearable device.

21. The wearable device of claim 18, wherein modifying the second operating characteristic for the communication subsystem of the wearable device includes adjusting operation of the communication subsystem to comply with applicable specific absorption rate requirements.

22. The wearable device of claim 18, wherein modifying the second operating characteristic for the communication subsystem of the wearable device includes tuning an antenna of the communication subsystem to cause the antenna to operate using a different frequency.

23. The wearable device of claim 18, wherein, after selecting the current position of the wearable device based on the first sensor data and the second sensor data, the modifying includes modifying both the first operating characteristic for the display subsystem of the wearable device and the second operating characteristic for the communication subsystem of the wearable device.

24. The wearable device of claim 18, wherein the wrist-worn position is selected as the current position and the modifying includes using a stored value for the second operating characteristic for the communication subsystem of the wearable device and the wearable device is further configured to:

in response to detecting a change in the first sensor data or the second sensor data, select a new current position, other than the wrist-worn position, of the portion of the wearable device relative to the user's body from among the at least three predefined positions of the portion of the wearable device; and after selecting the new current position of the portion of the wearable device, modify the second operating characteristic for the communication subsystem of the wearable device to use a different stored value for the second operating characteristic.

25. The wearable device of claim 18, wherein the free-space position is selected as the current position and the modifying includes using a stored value for the first operating characteristic for the display subsystem of the wearable device and the wearable device is further configured to:

in response to detecting a change in the first sensor data or the second sensor data, select a new current position, other than the free-space position, of the portion of the wearable device relative to the user's body from among the at least three predefined positions of the portion of the wearable device; and after selecting the new current position of the portion of the wearable device, modify the first operating characteristic for the display subsystem of the wearable device to use a different stored value for the first operating characteristic.

26. The wearable device of claim 18, wherein:

the first sensor data is a magnitude of a magnetic field at the portion of the wearable device; and the second sensor data is one of (i) a capacitance value at the portion of the wearable device, (ii) biometric data for the user, or (iii) an antenna return loss value for an antenna of the wearable device.

27. The wearable device of claim 26, wherein:

the second sensor data is the biometric data for the user, and the wrist-worn position is selected as the current position based on:

the magnitude of the magnetic field at the portion of the wearable device indicating that the portion remains coupled with a band portion of the wearable device, and the biometric data for the user being above a non-zero threshold biometric value.

28. The wearable device of claim 27, wherein:

the portion of the wearable device is a capsule portion of the wearable device that includes a display and the first and second sensors, the selecting of the current position of the wearable device relative to the user's body from among the at least three predefined positions of the wearable device is further based on third sensor data from a third sensor of the wearable device, the third sensor data being a capacitance value at the capsule portion of the wearable device, and
the free-space position is selected as the current position based on:
the magnitude of the magnetic field at the capsule portion of the wearable device indicating that the capsule portion remains coupled with the band portion of the wearable device,
the biometric data for the user being below the non-zero threshold biometric value, and
the capacitance value being below a threshold capacitance value.

29. The wearable device of claim 28, wherein the selecting of the current position of the wearable device relative to the user's body from among the at least three predefined positions of the portion of the wearable device is further based on fourth sensor data from a fourth sensor of the wearable device, the fourth sensor data being configured to sense an antenna return loss value for an antenna of the wearable device, and
the finger-hold position is selected as the current position based on:
the magnitude of the magnetic field at the capsule portion of the wearable device indicating that the capsule portion has been removed from the band portion of the wearable device,
the biometric data for the user being below a non-zero threshold biometric value, and
the antenna return loss value indicating that the user is holding the capsule portion of the wearable device with at least two fingers.

30. The wearable device of claim 29, wherein the at least three predefined positions of the portion of the wearable device further include:
a head-mounted position in which the capsule portion of the wearable device is coupled with another electronic device worn on the user's head.

31. The wearable device of claim 30, wherein the at least three predefined positions of the portion of the wearable device further include:
a body-worn position in which the capsule portion of the wearable device is worn on the user's body at a location other than the user's head or the user's wrist.

32. The wearable device of claim 31, wherein:
the free-space position is selected as the current position based on:
the magnitude of the magnetic field at the capsule portion of the wearable device indicating that the capsule portion has been removed from the band portion of the wearable device,
the biometric data for the user being below a non-zero threshold biometric value, and
the capacitance value being below a first threshold capacitance value that is less than a second threshold capacitance value associated with the head-mounted position, and the first and second threshold capacitance values are both less than a third threshold capacitance value associated with the body-worn position.

33. The wearable device of claim 32, wherein:
the head-mounted position is selected as the current position based on:
the magnitude of the magnetic field at the capsule portion of the wearable device indicating that the capsule portion has been removed from the band portion of the wearable device,
the biometric data for the user being below a non-zero threshold biometric value, and
the capacitance value being between greater than the first threshold capacitance value and less than or equal to the second threshold capacitance value associated with the head-mounted position.

34. The wearable device of claim 33, wherein:
the body-worn position is selected as the current position based on:
the magnitude of the magnetic field at the capsule portion of the wearable device indicating that the capsule portion has been removed from the band portion of the wearable device,
the biometric data for the user being below a non-zero threshold biometric value, and
the capacitance value being greater than the second threshold capacitance value associated with the head-mounted position and less than or equal to the third threshold capacitance value associated with the body-worn position.

35. The wearable device of claim 34, wherein the wearable device is configured to maintain a reliable cellular connection when it is in each of the wrist-worn, finger-hold, free-space, head-worn, and body-worn positions.

36. The non-transitory, computer-readable storage medium of claim 19, wherein the instructions that cause the wearable device to modify the first operating characteristic for the display subsystem of the wearable device include instructions for causing the wearable device to reduce an amount of power consumed by the display subsystem of the wearable device.

37. The non-transitory, computer-readable storage medium of claim 19, wherein the instructions that cause the wearable device to modify the second operating characteristic for the communication subsystem of the wearable device include instructions for causing the wearable device to adjust operation of the communication subsystem to comply with applicable specific absorption rate requirements.

38. The non-transitory, computer-readable storage medium of claim 19, wherein the instructions that cause the wearable device to modify the second operating characteristic for the communication subsystem of the wearable device include instructions for causing the wearable device to tune an antenna of the communication subsystem to cause the antenna to operate using a different frequency.

39. The non-transitory, computer-readable storage medium of claim 19, wherein, after selecting the current position of the wearable device based on the first sensor data and the second sensor data, the instructions that cause the wearable device to modify include instructions for causing the wearable device to modify both the first operating characteristic for the display subsystem of the wearable device and the second operating characteristic for the communication subsystem of the wearable device.

40. The non-transitory, computer-readable storage medium of claim 19, wherein the wrist-worn position is selected as the current position and the modifying includes using a stored value for the second operating characteristic for the communication subsystem of the wearable device and the instructions, when executed by the one or more processors of the wearable device, further cause the wearable device to:
in response to detecting a change in the first sensor data or the second sensor data, select a new current position, other than the wrist-worn position, of the portion of the wearable device relative to the user's body from among the at least three predefined positions of the portion of the wearable device; and after selecting the new current position of the portion of the wearable device, modify the second operating characteristic for the communication subsystem of the wearable device to use a different stored value for the second operating characteristic.

41. The non-transitory, computer-readable storage medium of claim 19, wherein the free-space position is selected as the current position and the instructions that cause the wearable device to modify include instructions for causing the wearable device to use a stored value for the first operating characteristic for the display subsystem of the wearable device, and the instructions, when executed by the one or more processors of wearable device further cause the wearable device to:

in response to detecting a change in the first sensor data or the second sensor data, select a new current position, other than the free-space position, of the portion of the wearable device relative to the user's body from among the at least three predefined positions of the portion of the wearable device; and after selecting the new current position of the portion of the wearable device, modify the first operating characteristic for the display subsystem of the wearable device to use a different stored value for the first operating characteristic.

42. The non-transitory, computer-readable storage medium of claim 19, wherein:

the first sensor data is a magnitude of a magnetic field at the portion of the wearable device; and the second sensor data is one of (i) a capacitance value at the portion of the wearable device, (ii) biometric data for the user, or (iii) an antenna return loss value for an antenna of the wearable device.

43. The non-transitory, computer-readable storage medium of claim 42, wherein:

the second sensor data is the biometric data for the user, and the wrist-worn position is selected as the current position based on:

the magnitude of the magnetic field at the portion of the wearable device indicating that the portion remains coupled with a band portion of the wearable device, and the biometric data for the user being above a non-zero threshold biometric value.

44. The non-transitory, computer-readable storage medium of claim 43, wherein:

the portion of the wearable device is a capsule portion of the wearable device that includes a display and the first and second sensors, the instructions that cause the wearable device to select the current position of the wearable device relative to the user's body from among the at least three predefined positions of the wearable device include instructions for causing the wearable device to select the current position further based on third sensor data from a third sensor of the wearable device, the third sensor data being a capacitance value at the capsule portion of the wearable device, and the free-space position is selected as the current position based on:

the magnitude of the magnetic field at the capsule portion of the wearable device indicating that the capsule portion remains coupled with the band portion of the wearable device, the biometric data for the user being below the non-zero threshold biometric value, and the capacitance value being below a threshold capacitance value.

45. The non-transitory, computer-readable storage medium of claim 44, wherein the instructions that cause the wearable device to select the current position of the wearable device relative to the user's body from among the at least three predefined positions of the portion of the wearable device includes instructions for causing the wearable device to select the current position further based on fourth sensor data from a fourth sensor of the wearable device, the fourth sensor data being configured to sense an antenna return loss value for an antenna of the wearable device;

the finger-hold position is selected as the current position based on:

the magnitude of the magnetic field at the capsule portion of the wearable device indicating that the capsule portion has been removed from the band portion of the wearable device, the biometric data for the user being below a non-zero threshold biometric value, and the antenna return loss value indicating that the user is holding the capsule portion of the wearable device with at least two fingers.

46. The non-transitory, computer-readable storage medium of claim 45, wherein the at least three predefined positions of the portion of the wearable device further include:

a head-mounted position in which the capsule portion of the wearable device is coupled with another electronic device worn on the user's head.

47. The non-transitory, computer-readable storage medium of claim 46, wherein the at least three predefined positions of the portion of the wearable device further include:

a body-worn position in which the capsule portion of the wearable device is worn on the user's body at a location other than the user's head or the user's wrist.

48. The non-transitory, computer-readable storage medium of claim 47, wherein:

the free-space position is selected as the current position based on:

the magnitude of the magnetic field at the capsule portion of the wearable device indicating that the capsule portion has been removed from the band portion of the wearable device, the biometric data for the user being below a non-zero threshold biometric value, and the capacitance value being below a first threshold capacitance value that is less than a second threshold capacitance value associated with the head-mounted position, and the first and second threshold capacitance values are both less than a third threshold capacitance value associated with the body-worn position.

49. The non-transitory, computer-readable storage medium of claim 48, wherein:

the head-mounted position is selected as the current position based on:

the magnitude of the magnetic field at the capsule portion of the wearable device indicating that the capsule portion has been removed from the band portion of the wearable device, the biometric data for the user being below a non-zero threshold biometric value, and the capacitance value being between greater than the first threshold capacitance value and less than or equal to the second threshold capacitance value associated with the head-mounted position.

50. The non-transitory, computer-readable storage medium of claim 49, wherein:

the body-worn position is selected as the current position based on:

the magnitude of the magnetic field at the capsule portion of the wearable device indicating that the capsule portion has been removed from the band portion of the wearable device, the biometric data for the user being below a non-zero threshold biometric value, and the capacitance value being greater than the second threshold capacitance value associated with the head-mounted position and less than or equal to the third threshold capacitance value associated with the body-worn position.

51. The non-transitory, computer-readable storage medium of claim 50, wherein the wearable device is configured to maintain a reliable cellular connection when it is in each of the wrist-worn, finger-hold, free-space, head-worn, and body-worn positions.

* * * * *